(12) United States Patent
Karis et al.

(10) Patent No.: US 11,500,891 B2
(45) Date of Patent: Nov. 15, 2022

(54) GENERATING DATA VISUALIZATIONS WITH DISPLAYED VISUAL DATA MARKS REPRESENTING AGGREGATED DATA AT MULTIPLE LEVELS OF DETAIL

(71) Applicant: Tableau Software, LLC, Seattle, WA (US)

(72) Inventors: Dirk Karis, Seattle, WA (US); Rodion Degtyar, Sammamish, WA (US); Allison Anne Whilden, Redmond, WA (US); Vidya Raghavan Setlur, Portola Valley, CA (US); Jonathan D. Que, Seattle, WA (US); Filippos Lymperopoulos, Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/589,718

(22) Filed: Jan. 31, 2022

(65) Prior Publication Data

US 2022/0318237 A1    Oct. 6, 2022

Related U.S. Application Data

(60) Provisional application No. 63/169,139, filed on Mar. 31, 2021, provisional application No. 63/291,335, (Continued)

(51) Int. Cl.
*G06F 3/048* (2013.01)
*G06F 16/248* (2019.01)
(Continued)

(52) U.S. Cl.
CPC .......... *G06F 16/248* (2019.01); *G06F 3/0482* (2013.01); *G06F 3/04817* (2013.01); *G06F 8/34* (2013.01)

(58) Field of Classification Search
None
See application file for complete search history.

(56) References Cited

U.S. PATENT DOCUMENTS

| 7,461,077 | B1 * | 12/2008 | Greenwood | ........ G06F 16/2428 707/999.102 |
| 11,269,871 | B1 * | 3/2022 | Bigdelu | ............. G06F 16/2428 |

(Continued)

*Primary Examiner* — Thanh T Vu
(74) *Attorney, Agent, or Firm* — Morgan, Lewis & Bockius LLP

(57) ABSTRACT

At a computer system a number of interrelated block object specifications are generated according to user placement of data field icons on a canvas region. Each block object specification includes a layout type, a mark type, and one or more visual encodings. For each block object specification, a respective query is generated according to the user-selected data field icons that specify the visual encodings for the respective block object specification. Each query is executed to retrieve a respective set of tuples from the data source. Each tuple comprises data values for data fields corresponding to the user-selected data field icons. A data visualization is generated in accordance with the layout type, the mark type, and the visual encodings specified in each of the block object specifications, wherein each tuple in each of the respective set of tuples is represented as a visual mark in the data visualization.

20 Claims, 36 Drawing Sheets

Related U.S. Application Data filed on Dec. 17, 2021, provisional application No. 63/304,611, filed on Jan. 29, 2022.

(51) Int. Cl.
  *G06F 8/34* (2018.01)
  *G06F 3/04817* (2022.01)
  *G06F 3/0482* (2013.01)

(56) References Cited

U.S. PATENT DOCUMENTS

| | | | |
|---|---|---|---|
| 2017/0052747 A1* | 2/2017 | Cervelli | G06T 11/001 |
| 2018/0260450 A1* | 9/2018 | Wang | G06F 16/248 |
| 2020/0019546 A1* | 1/2020 | Luo | G06F 16/245 |
| 2020/0233559 A1* | 7/2020 | Rueter | G06F 16/26 |

* cited by examiner block := (block-name, layout-type, mark-type, encoding, children)

children := {(child-group)} child-group := {block-name} layout-type := "rows" | "columns" | "inline"

mark-type := "text" | "shape" | "circle" | "line" | "bar"

encoding := ({encoding-type}, field-instance)

encoding-type := "color" | "size" | "shape" | "text" | "x-axis" | "y-axis" | "sort-asc" | "sort-desc" | "detail"

field-instance := ([aggregation], field-name)

602 Display a graphical user interface on the display, including (a) a schema region displaying a plurality of data field icons, where each data field icon represents a respective data field from a user-selected data source, and (b) a canvas region.

604 Receive a first user input to select a first data field icon from the schema region and to place the first data field icon onto the canvas region.

606 In response to receiving the first user input:

(A)

608 Display a block card on the canvas region, the block card including a plurality of user interface affordances to designate (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail, according to data values for a first data field represented by the first data field icon.

(B)

610 Generate and display a data visualization for the data source according to the layout type, the mark type, and the visual encodings specified on the block card.

612 Generating and displaying the data visualization for the data source according to the layout type, the mark type, and the visual encodings specified on the block card comprises: (1) defining a level of detail according to dimension data fields specifying the visual encodings on the block card; (2) generating a query, for the block card, which specifies aggregation of each measure data field according to the dimension data fields in the level of detail; (3) executing the query to retrieve a set of tuples from the data source, each tuple including each of the data fields whose data field icon specifies a visual encoding, where each of the measure data fields is aggregated according to the level of detail; and (4) generating the data visualization in which each visual mark corresponds to a retrieved tuple.

614 The block card is a first block card. Receive a second user input selecting a second data field icon from the schema region.
 In response to receiving the second user input:
  Display drop targets on the first block card, each drop target on the first block card specifying a respective visual encoding that may be selected for association with the second data field icon;
  Display drop targets adjacent to the first block card, each adjacent drop target specifying a distinct option to create a child block card or parent block card related to the block card;
  In response to user placement of the second data field icon onto (i) one of the drop targets for the first block card or (ii) one of the adjacent drop targets, generating and displaying an updated data visualization. The layout type, mark type, and visual encodings are determined according to the user placement of the second data field icon.

(C)

Figure 6B 606 (continued) In response to receiving the first user input:

610 (continued) Generate and display a data visualization for the data source according to the layout type, the mark type, and the visual encodings specified on the block card.

614 (continued) ... In response to user placement of the second data field icon onto (i) one of the drop targets for the first block card or (ii) one of the adjacent drop targets, generating and displaying an updated data visualization, wherein layout type, mark type, and visual encodings are determined according to the user placement of the second data field icon.

(C)

616 The second data field icon is placed onto one of the drop targets on the first block card, thereby adding a visual encoding based on a second data field corresponding to the second data field icon.

618 The second data field icon is placed onto one of the adjacent drop targets, thereby forming a second block card that is a parent or a child of the first block card, and generating the updated data visualization comprises generating a data visualization according to the layout type, the mark type, and the visual encodings specified on the first block card and a layout type, a mark type, and visual encodings specified on the second block card.

(D)

620 The drop targets displayed adjacent to the block card are determined based on whether the second data field icon represents a dimension data field or a measure data field.

622 When the second data field icon represents a dimension data field, the drop targets adjacent to the block card include a first drop target that specifies a row layout type and a second drop target that specifies a column layout type.

624 When the second data field icon represents a measure data field, display a drop target that specifies an inline layout type.

Figure 6C

618 The second data field icon is placed onto one of the adjacent drop targets, thereby forming a second block card that is a parent or a child of the first block card. Generating the updated data visualization comprises generating a data visualization according to the layout type, the mark type, and the visual encodings specified on the first block card and a layout type, a mark type, and visual encodings specified on the second block card.

626 The second block card is a child of the first block card. Generating the updated data visualization comprises:
    defining a first level of detail according to (i) dimension data fields specifying the visual encodings on the first block card;
    defining a second level of detail according to (i) dimension data fields specifying the visual encodings on the first block card and (ii) dimension data fields specifying the visual encodings on the second block card;
    generating a first query, for the first block card, which specifies aggregation of each measure data field associated with the first block card according to the dimension data fields in the first level of detail;
    generating a second query, for the second block card, which specifies aggregation of each measure data field associated with the second block card according to the dimension data fields in the second level of detail;
    executing the first query to retrieve a first set of tuples from the data source;
    executing the second query to retrieve a second set of tuples from the data source; and
    generating the updated data visualization, including a respective first visual mark representing each of the first set of tuples and a respective second visual mark representing each of the second set of tuples.

628 Upon user placement of the second data field icon onto one of the adjacent drop targets, display a visual indicator representing a hierarchical relationship between the first block card and the second block card.

630 Visual positioning of the first block card and the second block card in relation to one another on the canvas region determines relative placement of visual marks for the first and second block cards in the data visualization.

632 When the adjacent drop target onto which the second data field icon was placed is located to the right of the first block card or below the first block card, automatically aggregate measure data fields associated with the second block card according to (i) dimension data fields associated with the first block card and (ii) dimension data fields associated with the second block card.

634 When the adjacent drop target onto which the second data field was placed is located to the left of the first block card or above the first block card, automatically aggregate measure data fields associated with the first block card according to (i) dimension data fields associated with the second block card and (ii) dimension data fields associated with the first block card.

636 Generating the updated data visualization comprises generating a first data visualization portion based on the first block card and generating a second data visualization portion based on the second block card. The updated data visualization comprises a concatenation of the first data visualization portion and the second data visualization portion.

Figure 6D 606 (continued) In response to receiving the first user input:

(A)

638 The first user input is a drag-and-drop gesture.

640 The first user input includes a first portion and a second portion. The first portion selects the first data field icon, and the second portion places the first data field icon onto the canvas region.

608 (continued) Display a block card on the canvas region, the block card including a plurality of user interface affordances to designate (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail, according to data values for a first data field represented by the first data field icon.

(B)

642 The block card is automatically assigned a default layout type, a default mark type, and one or more default visual encodings.

644 The plurality of user interface affordances include: a first user selectable user interface element indicating the layout type of the block card; a second user selectable user interface element indicating the mark type of the block card; and a plurality of additional user interface elements, each indicating a respective visual encoding.

646 The block card is a first block card. Receive a third user input selecting a third data field icon from the schema region. In response to receiving the third user input: display drop targets on the first block card, where each drop target on the first block card specifies a respective visual encoding that may be selected for association with the third data field icon; and display drop targets adjacent to the first block card, where each adjacent drop target specifies a distinct option to create a child block card or parent block card related to the block card. In response to user placement of the third data field icon onto an unoccupied area on the canvas region, outside of any of the displayed drop targets: generate a third block card, which is independent of any other block card (including the first block card) using a third data field represented by the third data field icon; and generate and display a second data visualization according to the layout type, the mark type, and the visual encodings specified on the third block card. The second data visualization is separate from the first data visualization, and is displayed concurrently with the first data visualization.

702 Display a graphical user interface on the display, including (a) a schema region displaying a plurality of data field icons, where each data field icon represents a respective data field from a user-selected data source, and (b) a canvas region including a plurality of block cards, where each block card specifies a respective layout type. The layout type is one of (i) a row-based arrangement, (ii) a column-based arrangement, or (iii) an inline arrangement. Each block card is generated in response to user placement of one or more respective data field icons onto the canvas region.

704 For each block card, generate and execute a respective database query to retrieve tuples of data for data fields associated with the respective block card.

706 For each retrieved tuple, compute a respective two-dimensional grid position, including a respective row index and a respective column index.

710 Computing the respective two-dimensional grid position for each retrieved tuple comprises forming a directed acyclic graph of block objects, where each block object corresponds to (i) a respective displayed block card, (ii) the root row object, or (iii) the root column object. Each link in the graph represents either a respective hierarchical relationship between a respective pair of block cards, as determined by spatial positions of the respective pair of block cards on the canvas region, or a relationship between a block card and the root row object or the root column object.

712 Computing the respective two-dimensional grid position for each retrieved tuple comprises generating a row block tree from the directed acyclic graph by removing the root column object and retaining only links from the root row object and links from block objects corresponding to block cards having the row-based arrangement. It further comprises generating a row tuple tree whose nodes include a single root row node and a respective node corresponding to each of the retrieved tuples. The process forms a respective link between each pair of nodes $N_1$ and $N_2$ in the row tuple tree when $N_1$ is the root row node and $N_2$ corresponds to a tuple retrieved for a block object that is a child of the root row object or: $N_1$ and $N_2$ correspond to retrieved tuples $T_1$ and $T_2$; the tuples $T_1$ and $T_2$ are retrieved for block objects $B_1$ and $B_2$; block object $B_1$ is a parent of block object $B_2$ in the row block tree; and the tuples $T_1$ and $T_2$ have the same data values for each of their shared dimension data fields. The process assigns a row index to each tuple by traversing the row tuple tree structure in a depth-first order.

714 Traversing the row tuple tree in the depth-first order further comprises sorting the retrieved tuples according to ordering of block objects in the row block tree, ordering of data values for dimension data fields within each tuple, and any user-specified sort-order.

706 (continued) For each retrieved tuple, compute a respective two-dimensional grid position, including a respective row index and a respective column index.

716 Computing the respective two-dimensional grid position for each retrieved tuple comprises generating a column block tree from the directed acyclic graph by removing the root row object and retaining only links from the root column object and links from block objects corresponding to block cards having the column-based arrangement. It further comprises generating a column tuple tree whose nodes include a single root column node and a respective node corresponding to each of the retrieved tuples. The process forms a respective link between each pair of nodes $N_1$ and $N_2$ in the column tuple tree when $N_1$ is the root column node and $N_2$ corresponds to a tuple retrieved for a block object that is a child of the root column object or: $N_1$ and $N_2$ correspond to retrieved tuples $T_1$ and $T_2$; the tuples $T_1$ and $T_2$ are retrieved for block objects $B_1$ and $B_2$; block object $B_1$ is a parent of block object $B_2$ in the column block tree; and the tuples $T_1$ and $T_2$ have the same data values for each of their shared dimension data fields. The process assigns a column index to each tuple by traversing the column tuple tree in a depth-first order.

718 Traversing the column tuple tree in the depth-first order further comprises sorting the retrieved tuples according to ordering of block objects in the column block tree, ordering of data values for dimension data fields within each tuple, and any user-specified sort-order.

708 Generate and Display a data visualization in which each retrieved tuple is represented as a visual mark displayed at the respective computed grid position.

720 Generating the data visualization in which each tuple is represented as a visual mark further comprises for each block card with a layout type of the row-based arrangement or the column-based arrangement, assigning each tuple retrieved, for the respective block card, to a different grid position.

722 Generating the data visualization in which each tuple is represented as a visual mark further comprises: for each block card with a layout type of the inline arrangement, assigning all of the tuples retrieved, for the respective block card, to a respective single grid position.

724 Each block card generates a query that retrieves data for one respective visual component of the data visualization.

726 Receive user input to place a data field icon onto the canvas region, thereby updating or creating a first block card. In response to the user input, execute a generated query corresponding to the first block card, without executing queries corresponding to block cards other than the first block card.

728 In response to executing the generated query corresponding to the first block card, generating a new visual component in the data visualization or updating a currently displayed visual component in the data visualization without updating visual components that have already been generated for block cards other than the first block card.

730 A first block card specifies a mark-type and one or more visual encodings that specify color, size, shape, text, x-axis, y-axis, ascending sort, descending sort, or level of detail, and each retrieved tuple for the first block card corresponds to a visual mark that has the specified mark-type.

732 For each block card of the plurality of block cards: determine a first level of detail for the block card according to dimension data fields specifying the one or more visual encodings in the block card; and determine a second level of detail for the block card according to (i) dimension data fields specifying the one or more visual encodings in the block card and (ii) dimension data fields specifying visual encodings in any ancestor block card of the block card.

734 Executing the respective database query for each block card comprises aggregating each measure data field associated with the respective block card according to the dimension data fields in the second level of detail.

736 Placement of the plurality of block cards in relation to one another on the canvas determines hierarchical relationships between the plurality of block cards.

738 Placement of the plurality of block cards in relation to one another on the canvas forms an adjacency graph. The directed acyclic graph of block objects is based on the adjacency graph

802 Generate a plurality of interrelated block object specifications according to user placement of data field icons on a canvas region. Each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons.

---

804 For each block object specification: generate a respective query according to the user-selected data field icons that specify the visual encodings for the respective block object specification; and execute the respective query to retrieve a respective set of tuples from the data source, each tuple comprising data values for data fields corresponding to the user-selected data field icons that specify the visual encodings for the respective block object specification.

> 808 Generating the respective query comprises defining a level of detail according to dimension data fields that are associated with visual encodings in the respective block object specification. Executing the respective query comprises aggregating each measure data field in the respective block object specification according to the dimension data fields in the level of detail.

> 810 A first query corresponds to a first block object specification. A second query corresponds to a second block object specification. The first block object specification corresponds to a first block object that is a parent block object of a second block object that corresponds to the second block object specification. Generating a respective query for each of the first and second block object specifications comprises: defining a first level of detail according to dimension data fields that are associated with visual encodings in the first block object specification; defining a second level of detail according to (i) dimension data fields that are associated with visual encodings in the first block object specification and (ii) dimension data fields that are associated with visual encodings in the second block object specification; generating a first query, for the first block object specification, which specifies aggregation of each measure data field associated with the first block object specification according to the dimension data fields in the first level of detail; and generating a second query, for the second block object specification, which specifies aggregation of each measure data field associated with the second block object specification according to the dimension data fields in the second level of detail.

---

806 Generate a data visualization in accordance with the layout type, the mark type, and the visual encodings specified in each of the block object specifications. Each tuple in each of the respective set of tuples is represented as a visual mark in the data visualization.

---

812 Generating the plurality of interrelated block object specifications comprises: generating a first block object specification according to user placement of a first data field icon onto the canvas region. The layout type, mark type, and the one or more visual encodings specified in the first block object specification are initially determined by the computer system according to values of a first data field associated with the first data field icon. Generate a second block object specification according to user placement of a second data field icon onto the canvas region. The layout type, mark type, and the one or more visual encodings specified in the second block object specification are initially determined by the computer system according to values of a second data field associated with the second data field icon.

---

814 Each block object specification is represented by a respective user interface block card in the canvas region, and the respective user interface block card displays: a selectable user interface element to designate a layout type of the respective user interface block card; a selectable user interface element to designate a mark type of the respective user interface block card; and a plurality of user interface elements indicating the one or more visual encodings of the respective block object specification.

---

816 Each block object specification determines a respective visual component in the data visualization. The respective visualization component can be updated independently from other visual components in the data visualization.

---

818 For each block object specification: determine a first level of detail for the block object specification (e.g., local LOD) according to dimension data fields specifying one or more visual encodings in the block object specification; and determine a second level of detail for the block object specification according to (i) dimension data fields specifying the one or more visual encodings in the block object specification and (ii) dimension data fields specifying visual encodings in any ancestor block object specification.

820 Identify each measure data field that specifies one or more visual encodings in the respective block object specification. Executing the respective query comprises aggregating each of the identified measure data fields according to the dimension data fields in the second level of detail.

---

822 The data visualization has a type that is one of: a table-based chart, a Sankey diagram, or a map-based diagram.

GENERATING DATA VISUALIZATIONS WITH DISPLAYED VISUAL DATA MARKS REPRESENTING AGGREGATED DATA AT MULTIPLE LEVELS OF DETAIL

RELATED APPLICATIONS

This application claims priority to U.S. Provisional Patent Application No. 63/169,139, filed Mar. 31, 2021, entitled "Blocks: Creating Expressive Charts Through Direct manipulation," which is incorporated by reference herein in its entirety.

This application claims priority to U.S. Provisional Patent Application No. 63/291,335, filed Dec. 17, 2021, entitled "Generating Expressive Data Visualization by Interacting With Data Fields Representations," which is incorporated by reference herein in its entirety.

This application claims priority to U.S. Provisional Patent Application No. 63/304,611, filed Jan. 29, 2022, entitled "Data Visualization Analytical Canvas with Functionally Independent Visual Containers," which is incorporated by reference herein in its entirety.

This application is related to U.S. Utility patent application Ser. No. 17/589,690, filed Jan. 31, 2022, entitled "Data Visualization Analytical Canvas with Functionally Independent Visual Containers Generating," which is incorporated by reference herein in its entirety.

This application is related to U.S. Utility patent application Ser. No. 17/589,696, filed Jan. 31, 2022, entitled "Generating Data Visualizations with Visual Data Marks Having Individually Calculated Grid Positions," which is incorporated by reference herein in its entirety.

TECHNICAL FIELD

The disclosed embodiments relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex and include many data fields. Analytical workflows for analyzing large data sets typically involve exploring data iteratively by incrementally refining data views, thereby discovering various trends and patterns within the data. Various visual analysis tools exist that can be used to help users express and execute analytical workflows for visually exploring and analyzing data.

Despite the existence of such tools, creating expressive data visualizations still remains a challenging task. For example, users typically must have sufficient knowledge in data visualization and/or statistics. Most of the tools are difficult to use by non-experts. Some of these tools are more expressive and allow users to programmatically create charts (e.g., declarative grammars allow developers to specify target visualizations using libraries and APIs), while others are easier to learn and more efficient to use for creating simple charts (e.g., chart pickers) but may provide limited support for expressiveness or may require tedious workarounds for building more complex visualization (e.g., the desired charts and/or analytical workflows may conflict with the system defaults).

SUMMARY

Accordingly, there is a need for visual data analysis tools that are easy to use by non-experts while providing ability to create expressive charts via a simple drag and drop technique. For example, there is a need to analyze data at various levels of granularity while maintaining the ease of use of the direct manipulation model (e.g., drag-and-drop of user interface objects, such as "pills", that represent data fields). As users strive to build richer visualizations, the need arises for more control over showing information at multiple levels of detail while at the same time maintaining ease of use provided by the drag and drop interface. Further, there is a need for layout and encoding flexibility.

The above identified needs associated with data visual analysis tools are addressed by the disclosed herein devices, methods, and systems.

In accordance with some embodiments, a method executes at an electronic device with a display. For example, the electronic device can be a smart phone, a tablet, a notebook computer, or a desktop computer. The method includes, displaying a graphical user interface on the display. The display includes (a) a schema region displaying a plurality of data field icons, each data field icon representing a respective data field from a user-selected data source, and (b) a canvas region. The method further includes, receiving a first user input to select a first data field icon from the schema region and to place the first data field icon onto the canvas region. The method further includes, in response to receiving the first user input: displaying a block card on the canvas region, the block card including a plurality of user interface affordances to designate (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail, according to data values for a first data field represented by the first data field icon. The method further includes, generating and displaying a data visualization for the data source according to the layout type, the mark type, and the visual encodings specified on the block card In accordance with some embodiments, a method executes at an electronic device with a display. The method includes, displaying a graphical user interface on the display, including (a) a schema region displaying a plurality of data field icons, each data field icon representing a respective data field from a user-selected data source, and (b) a canvas region including a plurality of block cards, each block card specifying a respective layout type that is one of (i) a row-based arrangement, (ii) a column-based arrangement, or (iii) an inline arrangement, wherein each block card is generated in response to user placement of one or more respective data field icons onto the canvas region. The method further includes, for each block card, generating and executing a respective database query to retrieve tuples of data for data fields associated with the respective block card. The method further includes, for each retrieved tuple, computing a respective two-dimensional grid position, including a respective row index and a respective column index. The method further includes, generating and displaying a data visualization in which each retrieved tuple is represented as a visual mark displayed at the respective computed grid position.

In accordance with some embodiments, a method executes at an electronic device with a display. The method includes, generating a plurality of interrelated block object specifications according to user placement of data field icons on a canvas region, wherein each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons. The method further includes, for each block object specification: generating a respective query according to the user-selected data field icons that specify the visual encodings for the respective block object specification, and executing the respective query to retrieve a respective set of tuples from the data source, each tuple comprising data values for data fields corresponding to the user-selected data field icons that specify the visual encodings for the respective block object specification. The method further includes, generating a data visualization in accordance with the layout type, the mark type, and the visual encodings specified in each of the block object specifications, wherein each tuple in each of the respective set of tuples is represented as a visual mark in the data visualization.

In accordance with some embodiments, an electronic device includes a display generation component (e.g., a touch-screen, a display, a display of a head mounted device, etc.), one or more input devices, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display generation component (e.g., a display, a touch-screen, a display of a head mounted device, etc.) cause the device to perform or cause performance of the operations of any of the methods described herein. In accordance with some embodiments, a graphical user interface on an electronic device with a display, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component (e.g., a display, a touch-screen display, a display of a head mounted device, etc.), optionally a touch-sensitive surface; and means for performing or causing performance of the operations of any of the methods described herein. In accordance with some embodiments, an information processing apparatus, for use in an electronic device with a display generation component (e.g., a display, a touch-screen, a display of a head mounted device, etc.), includes means for performing or causing performance of the operations of any of the methods described herein.

Thus methods, systems, and graphical user interfaces are disclosed that enable users to easily interact with multiple related data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Embodiments below, in conjunction with the following drawings in which like reference numerals refer to corresponding parts throughout the figures.

FIG. 1B illustrates a block specification for a block object, according to some embodiments.

FIGS. 5A-5J illustrate example user interfaces for building and displaying data visualizations in an interactive graphical user interface, including two or more data visualizations in the same user interface, in accordance with some embodiments.

FIGS. 6A-6D, 7A-7C, 8A, and 8B provide flowcharts of systems, methods, and user interfaces for generating and displaying data visualizations, in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

One tool for visual analysis is Tableau provided by Tableau Software, Inc. Tableau provides a high-level formalism VizQL™ for specifying components and attributes of data visualizations. Tableau's graphical user interface for interactive analysis is illustrated in FIG. 1A.

Figure 1A:
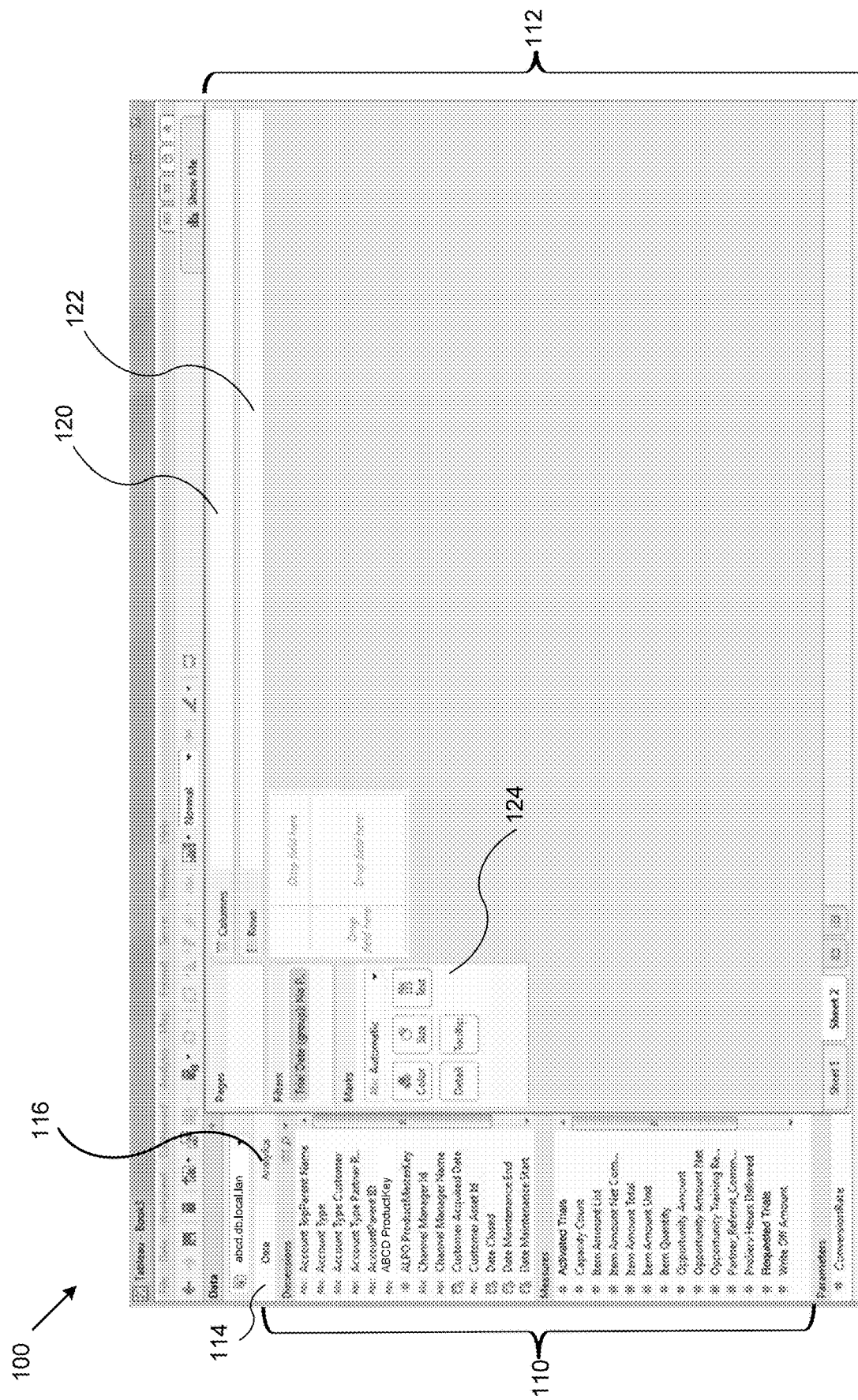
FIG. 1A illustrates a graphical user interface for interactive data analysis and chart creation.

FIG. 1A illustrates a graphical user interface 100 for interactive data analysis and chart creation. The user interface 100 includes a Data tab 114 and an Analytics tab 116 in accordance with some embodiments. When the Data tab 114 is selected, the user interface 100 displays a schema information region 110, which is also referred to as a data pane. The schema information region 110 provides named data elements (e.g., field names) that may be selected and used to build a data visualization. In some embodiments, the data fields included in the schema information region 110 are defaulted to one of a measure or a dimension. For example, data fields that represent categorical data, e.g., string data fields, are treated as dimensions, where various values for the data field are used as categories. And, data fields that represent numerical data, such as profit or sales, are treated as measures, which are fields that are aggregated by the system, optionally using functions such as SUM, average, mean, etc. However, a user could switch a string field to a measure from what would normally be defaulted to a dimension or vise versa. For example, to analyze sales transactions within ranges, a user may create categories of numerical ranges such as <$1000, $1000-$10,000, $10,000-$20,000, . . . , and >$50,000. Also, a user may treat each individual value as a category on its own. Another example of switching a data field to a measure is by changing the string data field Customer Name by applying function MIN to it. Some embodiments also include a list of parameters. When the Analytics tab 116 is selected, the user interface displays a list of analytic functions instead of data elements (not shown).

The underlying formalism VizQL™ supports expression of chart creation through user interaction or direct manipulation of user interface objects in the graphical user interface 100, where visibility of an object of interest (e.g., a named data field in schema information region 110) is translated automatically into a complex language syntax, thereby promoting expressiveness and ease of use. For example, users can build charts by mapping named data fields representations in region 110 to visual attributes of a data visualization via a drag-and-drop operation. As illustrated here, the graphical user interface 100 includes a data visualization region 112, which has a large space for displaying a visual graphic. Because no data elements have been selected yet, the space initially has no visual graphic.

The data visualization region 112 further includes a plurality of shelf regions, such as a columns shelf region 120 and a rows shelf region 122. In addition to columns shelf region 120 and the rows shelf region 120, the graphical user interface 100 also includes a shelf for visual encodings, which are grouped into a marks card region 124. The visual encodings specify mark types and encode data fields into visual properties for a specified mark. Examples of such visual encodings include, but are not limited to, shape, size, color, hue, texture, etc. Mark types include, but are not limited to, lines, bars, areas, squares, circles, text, map, pie, gantt bar, polygon, density mark, and other shapes that illustrate tuples of retrieved data.

In the graphical user interface 100, a user is selecting and placing user interface elements, e.g., "pills", that represent data fields onto one or more of the shelf regions, 120, 122, and marks region 124 that are specific targets in the graphical user interface 100. This process of user interaction is referred to as direct manipulation. Selecting and placing various "pills" on the shelf regions 120 and 121 and the marks region 124 controls the data used (e.g., what data is retrieved from data sources) and the structure and visual attributes of the final visualization.

In terms of the data used for the visualization, the underlying formalism VizQL™, uses the presence or absence of an aggregation in generating queries based on selection and placement of data fields onto shelves 120 and 122, and marks region 124. Data fields without an aggregation are referred to as dimensions (e.g., such as different categories), while measures are fields that are aggregated within groups defined by a set of all dimensions, also referred to as a level of detail (LOD). For example, measures are quantitative values, such as profits or sales across all categories. In VizQL™, queries are defined by using placement of data fields on all three: (1) row shelf 120 and (2) column shelf 122, and (3) marks region 124. For example, measures are aggregated within groups defined by all dimensions as opposed to determining a value of a measure at a level of detail including only dimensions from the rows shelf 122. Thus, there is a need for aggregating measures and applying visual encodings at different level of details for specific portions of a data visualization as opposed to globally for the entire visualization. Accordingly, there is a need to display, in a single visualization, answers to queries involving aggregates at multiple levels of granularity that also may require different visual encodings. Tableau and VizQL™ provide an ability to control the level of detail at which a measure aggregates to via so called LOD expressions. However, the user needs to define LOD calculated fields via a calculation editor that takes the user out of their analytical workflow. Using a calculation editor deviates from the direct manipulation model and also requires understanding of the formulae used in the calculation editor. Thus, there is a need to analyze data at various levels of granularity while maintaining the ease of use of the direct manipulation model (e.g., drag-and-drop of user interface objects, such as "pills", that represent data fields).

In terms of the structure of the data visualization, the row shelf 120 and the column shelf 122 are global. In other words, when a data field representation from schema region 110 is placed on a rows shelf 122, a horizontal band is created across the entire visualization, and when a data field representation is placed on a columns shelf 120, a vertical band is created also across the entire visualization. Such formalism provides limited support for creating expressive visualizations with embedded micro-charts, where nested relationships are required, such as rich tables with sparklines. Due to the global nature of the row shelf 120 and the column shelf 12, there is limited support for building nested relationships though direct manipulation (e.g., displaying a sparkline within a cell of a tabular data visualization).

Further, in terms of the layout of the final visualization, data fields placed on the rows shelf region 120 and the column shelf region 122 define "headers" in the final visualization if discrete or "axes" if continuous. Marks card 124 specifies the type of marks for the visualization and corresponding visual encodings, such as size, shape, and color. The headers define the overall layout of the visualization but cannot be visually encoded in Tableau as only fields placed in marks card 124 participate in creating marks. However, in Tableau, the marks must be arranged within grids formed by the headers. For example, it is not possible to have a hierarchical table where the top-level hierarchy is denoted with a symbol rather than text (e.g., headers are not marks and, thus, cannot be encoded into various shapes). Thus, there is a need for layout and encoding flexibility, such as ability to encode headers and/or apply encodings at different levels of detail.

Accordingly, as explained above, while VizQL™ formalism enable users to create charts through direct manipulation, there is a need for creating nested relationships, aggregating and encoding at different levels of detail, providing more control to users over layout of the final visualization (e.g., providing ability for more expressiveness by creating different charts from the system defaults), while at the same time maintaining ease of use of the direct manipulation model that enables interactive, iterative, and expressive chart creation. Currently, users implement workarounds that are inconvenient, cumbersome, and/or violate the direct manipulation model. These methods include, but are not limited to, (i) composing multiple visualizations on a dashboard so they appear as one; (ii) writing complex calculations to determine layout, or formatting of elements of the final visualization; (iii) creating axes with only a single value; (iv) creating LOD expressions via calculations editors, etc. While LOD expressions provide more control to a user to display answer questions involving multiple levels of granularity in a single visualization, LOD calculated fields typically need to be defined by the user in a calculation editor and require some understanding of the syntax of Tableau formulae. Thus, the user is required to open menus, editors, and/or understand technical information, which is cumbersome and/or interrupts the interactive and iterative visual analysis by means of direct manipulation. As a result, users often spend significant time in generating complex visualizations, including rich tables. While Tableau supports calculations to control the level of detail a measure aggregates to, creating these calculations does not provide the ability to visually encode at any level of detail and takes users out of their analytic workflow. Accordingly, as users strive to build richer visualizations, the need arises for more control over showing information at multiple levels of detail while at the same time maintaining ease of use provided by the drag and drop interface and data-driven flow.

The limitations described above are addressed with a new system (referred to as a Blocks system) that is based on a new formalism (referred to as Blocks formalism), which builds upon VizQL and is consistent with the direct manipulation paradigm, where new analytical entities (referred to as block objects or blocks), are directly manipulated in the interface (e.g., data fields are selected and placed on the canvas region via, e.g., a drag-and-drop operation). Blocks are represented as block cards on an analytical canvas region of an interactive user interface and translated into expressions according to the Blocks formalism.

The core unit of the formalism is the analytical entity referred to as a block or a block object. FIG. 1B illustrates a block specification 150 for a block object 160, according to some embodiments. In some embodiments, each block object conforms to block specification 150. In some embodiments, each block object includes attributes block name 162; layout type 164; mark type 166; encoding 167; and, optionally, children 168. In some embodiments, a number of block objects are connected in, optionally, a hierarchical structure (e.g., a tree structure formed by child-parent relationships between the block objects). The connected block objects are translated into local expressions rather than global Rows and Columns expressions.

In some embodiments, block object 160 is associated with block name 162, layout type value 164, mark type value 166, one or more encodings 167, and, optionally, children block objects 168. Block name 162 is a unique identifier for block object 160. In some embodiments, block-name 162 can include numbers, letters, or both numbers and letters, and has an arbitrary unique value. In some embodiments, block object 160 is associated with instances of one or more data fields that conform to field instance specification 170. For example, each field instance 109*b* conforms to field instance specification 170. Each field instance 109*b* that is used in encoding 167 conforms to encoding specification 190 and as such is associated with encoding type 190*a*. Encoding type 190*a* conforms to encoding type specification 186.

In some embodiments, different instances of the same data field can be associated with different block objects or the same block object. In some embodiments, instances of the same data field can be associated with different encodings, which conform to encoding specification 190. Each data field instance of block object 160 is associated with a particular field name 174, and, optionally, aggregation 172. Values for field name 174 are based on corresponding data fields in the data source. Values for aggregation 172 are defined by or depend on the aggregation functions that are supported by the data source for the respective data field. In some embodiments, a data field instance for which an aggregation 172 is specified is used as a measure. Other field instances that are without an aggregation are used as dimensions.

In some embodiments, block object 160 represents a single query of the data source at a level of detail defined by block object 160, where the respective query of block object 160 results in a visual component being generated in a final data visualization. In some embodiments, a local level of detail of block object 160 is defined by one or more encodings 167. In particular, a local level of detail of block object 160 is a union of a set of all dimensions used by one or more encodings 167 of block object 160. A complete level of detail for block object 160 is a union of its local LOD and the local LOD of all of its ancestors. Accordingly, the level of detail defined by block object 160 is not globally defined for the entire visualization (e.g., based on the rows and columns shelves that apply for the entire visualization). In some embodiments, all of the measures used by block object 160 are aggregated/evaluated at the full LOD of the particular block object 160 (e.g., as opposed to level of detail that is defined for the entire data visualization). This allows for greater flexibility in generating queries and visualization at various levels of detail.

In some embodiments, the parent-child relationships between the block objects form a directed acyclic graph (DAG). In some embodiments, block object 160 can be a parent block object of one or more child block objects as defined by attribute children blocks 180. A child block object that is assigned to children 168 conforms to children specification 180, which specifies one or more child groups 180*a* to which the corresponding child block belongs. A particular group of child block objects to which the respective child object belongs conforms to child group specification 182. Accordingly, Blocks formalism defines data visualizations that are based on a single, connected, directed acyclic graph (DAG) of blocks objects, and this allows for nested relationships between attributes in the visualization.

In some embodiments, in addition to defining the LOD for block object 160, one or more encodings 167 map query results to visual and spatial encodings. Each field-instance 109*b* that is encoded on the particular block may be mapped to one or more encodings of different types such as color 186*a*, size 186*b*, shape 186*c*, text 186*d*, x-axis 186*e*, y-axis 186*f*, sort ascending 186*g*, sort descending 186*h*, and data details 186*i*. In some embodiments, except for encoding types sort ascending 186*g*, sort descending 186*h*, and data details 186*i*, each encoding type 186*a*-186*f* occur at most once within block object 160. In some embodiments, sort ascending 186*g* and sort descending 186*h* control the order of the query results of block object 160 and ultimately the order in which the query results are rendered in the final visualization. Further, by providing a means to encode measure data fields on x-axis 186*e* and y-axis 186*f* at the visualization component level (e.g., as opposed to as part of a global table expression as in VizQL), the Blocks formalism provides an ability to use visual encodings and evaluate measures at any level of detail (e.g., building sparklines and other micro charts within a table visualization without the necessity of workarounds that interrupt the analytical flow).

In some embodiments, block object 160 renders one mark of its mark type 166 per tuple in its corresponding query result set. Values for mark type 166 conform to mark type specification 185. In some embodiments, mark types include various types such as text mark type 185*a*, shape mark type 185*b*, circle mark type 185*c*, line mark type 185*d*, and bar mark type 185*e*. In some embodiments, a mark type specifies a shape for visual data marks.

In some embodiments, layout type 164 determines how marks associated with block object 160 are spatially laid out in the data visualization (e.g., positions of the marks in the data visualization). In some embodiments, layout type 164 conforms to layout type specification 175. Values for layout type 164 includes Rows layout type 175*a*, Columns layout type 175*b*, and Inline layout type 175*c*. In some embodiments, block object 160 with the Rows layout type 175*a* creates a row for each value in its domain, with each row containing a single mark. For example, a block object with Rows layout type 175*a* and text mark type 185*a* generates a row displaying a text string for each value in the respective associated domain. In some embodiments, block object 160 with Columns layout type 175*b* creates a column for each value in its domain, each column containing a single mark per column. In some embodiments, block object 160 with Inline layout type 175*c* renders of its marks in a single shared space, such as a cell. In some embodiments, Inline layout type 175 facilitates the creation of scatter plots, line graphs, area charts, maps, embedded micro charts, etc. In some embodiments, the blocks formalism is not limited to the creation of charts in a tabular form, and can support other forms of complex visualizations, such as Sankey diagrams and composite maps.

Figure 1C:
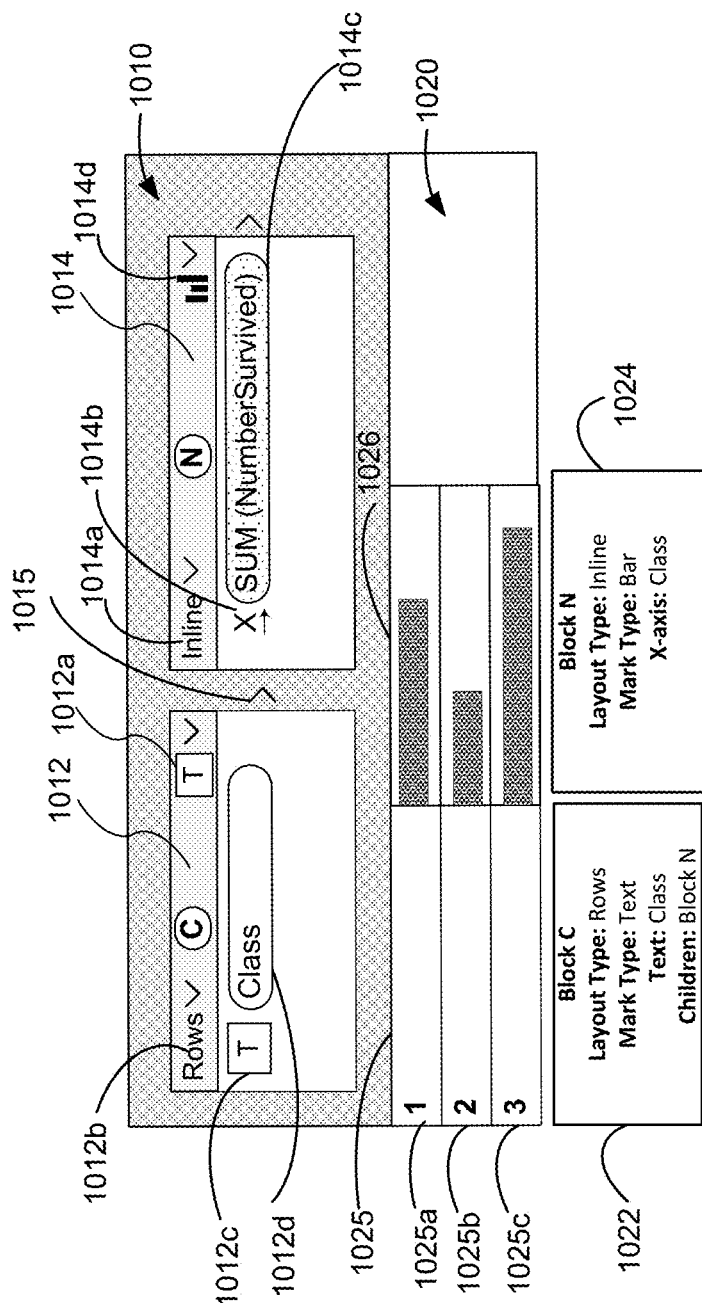
FIG. 1C illustrates an example of two connected block objects and respective block object specifications, in accordance with some embodiments.

FIG. 1C illustrates examples of connected block objects "C" and "N" and respective block specifications 1022 and 1024, in accordance with some embodiments. Block objects "C" and "N" are represented by block cards 1012 and 1014 in an interactive user interface 1010, in accordance with some embodiments. Block cards 1012 and 1014 are interactive graphical user interface objects that are generated in response to placing representations of data fields, selected from a data pane, onto an analytical canvas region 1010. Data visualization 1020 is generated based on specified properties of the block objects "C" and "N". Block cards 1012 and 1014 visually represent selected properties and encodings for block objects "C" and "N." For example, block card 1012 illustrates that block object "C" has "Rows" layout type 1012*b*, e.g., attribute layout type 164 is assigned value Rows 175*a* in FIG. 1B. Thus, block object "C" generates a visual component 1025 that has a row-based arrangement as illustrated in data visualization 1020. Further, block card 1012 shows that block object "C" has "Text" mark type 1012*a*, e.g., attribute mark type 166 is assigned value "Text" 185*a* in FIG. 1B. Thus, for each value in the respective domain of block object "C", one row of textual string is displayed in data visualization 1020. For example, dimension "Class" 1012*d* representing the respective domain, which is encoded visually on "Text" 1012*c* includes three values in the domain of data field Class 1012*d*, i.e., class value "1", "2", and "3", and thus one row is generated per each class value (e.g., row 1025*a*; row 1025*b*; and row 1025*c*), where each row includes a corresponding textual string that represents each of the three marks retrieved and generated for block "C".

In some embodiments, an arrow 1015 (or chevron icon) between block card 1012 and block card 1014 represents relationship between block "C" and block "N". For example, the arrow 1015 represents that block object "C" is a parent of block object "N". Block specification 1022 similarly illustrates that block "C" is associated in a parent child-relationship with one child block, which is block "N", e.g., block "N" is assigned to children 168.

In some embodiments, block card 1014 visually represents attributes of block "N". For example, block card 1014 illustrates that block object "N" has "Inline" layout type 1014*a*, e.g., attribute layout type 164 is assigned value "Inline" 175*c* in FIG. 1B. In some embodiments, since each block object generates a visual component, block object "N" generates visual component 1026. Since block "N" is a child block that is of the Inline layout type, marks for block "N" are nested into rows 1025*a*-1025*c*, respectively. For example, since the parent block "C" defines a row-based arrangement, marks generated for block "N" follow the row-based arrangement. Further, block card 1014 shows that block object "N" has "Bar" mark type 1014*d*, e.g., attribute mark type 166 is assigned value "Bar" 185*e* inn FIG. 1B. Thus, a bar chart is created for each row 1025*a*-1025*c*. A data field "NumberSurvived" (e.g., a number of persons that survived), which is a measure, is encoded onto X-axis. In other words, an instance of the field "NumberSurvived" is assigned encoding type "X-axis" 186*e*, as illustrated in FIG. 1B. Since no additional dimensions are added to block object "N", the measure "NumberSurvived" is aggregated to a level of detail defined by the dimension "Class" 1012*d*, and a single bar is rendered per row as illustrated in data visualization 1020, e.g., one bar is rendered per each class, e.g., one bar is rendered per each class value.

In some embodiments, the layout of block objects and respective block cards in the interactive user interface (e.g., positions of the block objects relative to one another), not only determines the relationship between the block objects but also determines the layout of visual components in the data visualization. For example, a block object "A" represented by corresponding block card that is placed above another block card that represents block object "B" generates and renders a visual component corresponding to block object "A" that is placed or displayed above another visual component that is generated based on block object "B." In some embodiments, block objects placed to the right or below a respective block object are automatically determined to be child blocks of the respective block objects. For example, since block object "N' is placed at the right of block object "C", block object "N" is determined child of block "C." In some embodiments, chevron icon or arrow 1015 that is displayed between block objects "C" and "N" denotes the direction of the nested relationship between the Blocks "C" and "N." Further, visual component 1026 is displayed adjacent to and on the right side of visual component 1025. In some embodiments, block object that have Inline layout type cannot have related blocks that are children. Thus, block objects that are placed below or to the right of a block object with Inline layout type, are defined or determined to be child blocks of the parent block of the respective block object with the Inline layout type.

In some embodiments, child block objects are laid out in the interface in relation to the positions of their parent blocks. For example, when a parent block object of a respective block is of the Rows layout type, a set of child blocks that share the same row in belong to the same child group (such as child group 182 in FIG. 1B). Similarly, when a parent block object of a respective block object is of the Columns layout type, a set of child blocks that share the same column belong to the same child group.

The Blocks formalism and the methods described herein, provide increased user control (e.g., expressiveness) and increased flexibility with layout and conditional formatting through the direct manipulation of block objects in the user interface. Further, the Blocks system and formalism provide more granular control over the structure of the final visualization without the need to interrupt the analytical workflow, e.g., in order to open editors and calculate fields.

Figure 2:
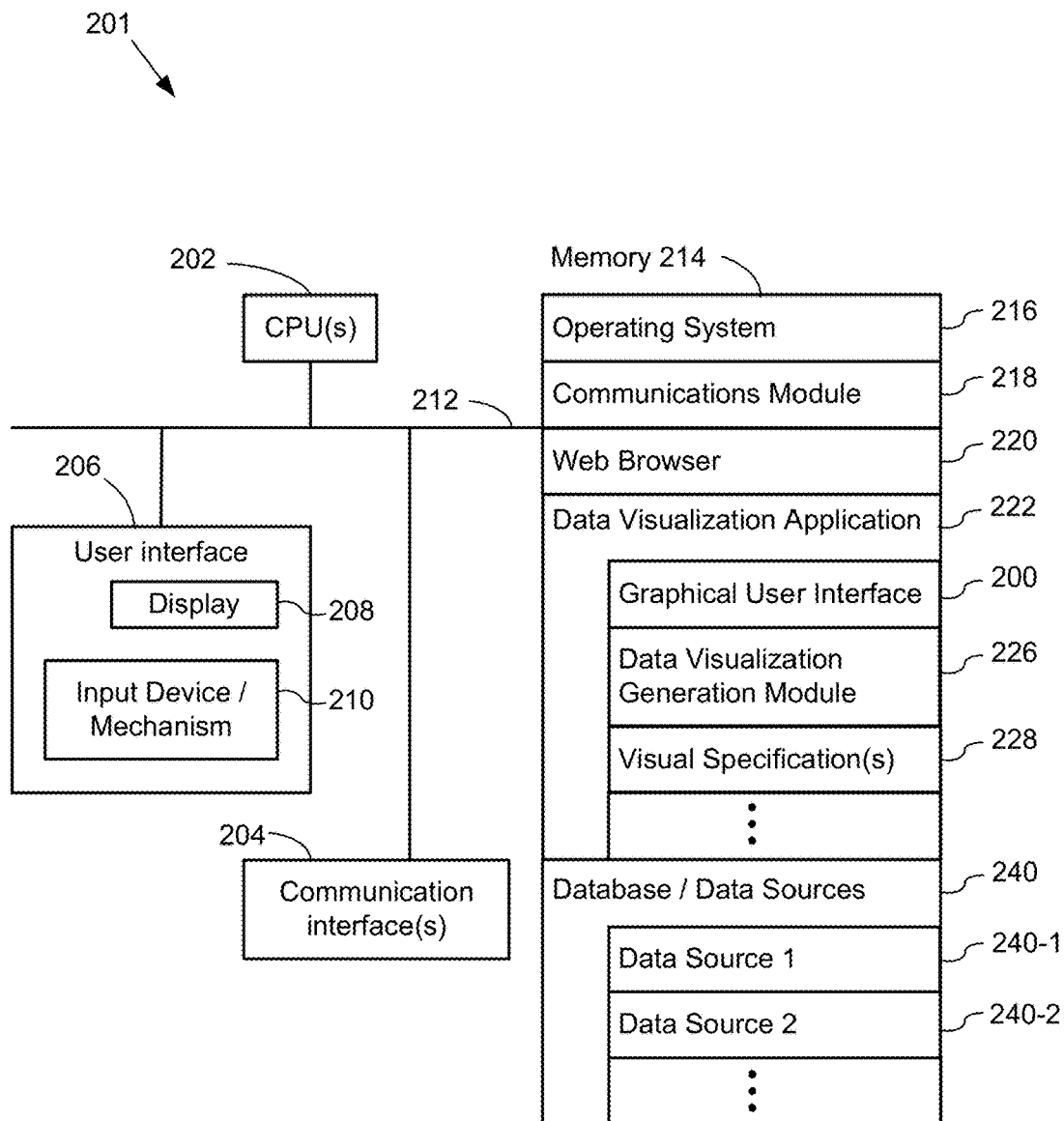
FIG. 2 is a block diagram illustrating a computing device that can display a blocks graphical user interface, including generated data visualizations, in accordance with some embodiments.

FIG. 2 is a block diagram illustrating a computing device 200 that can display the graphical user interface 2060 in accordance with some embodiments. Various examples of the computing device 200 include a desktop computer, a laptop computer, a tablet computer, and other computing devices that have a display and a processor capable of running a data visualization application 222. The computing device 200 typically includes one or more processing units/ cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some embodiments, the input device/mechanism includes a keyboard. In some embodiments, the input device/mechanism includes a "soft" keyboard, which is displayed as needed on the display device 208, enabling a user to "press keys" that appear on the display 208. In some embodiments, the display 208 and input device/mechanism 310 comprise a touch screen display (also called a touch sensitive display).

In some embodiments, the memory 214 includes high-speed random access memory, such as DRAM, SRAM, DDR RAM or other random access solid state memory devices. In some embodiments, the memory 214 includes non-volatile memory, such as one or more magnetic disk storage devices, optical disk storage devices, flash memory devices, or other non-volatile solid state storage devices. In some embodiments, the memory 214 includes one or more storage devices remotely located from the CPU(s) 302. The memory 214, or alternately the non-volatile memory device(s) within the memory 214, comprises a non-transitory computer readable storage medium. In some embodiments, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 206 for a user to construct visual graphics. For example, a user selects one or more data sources 240 (which may be stored on the computing device 200 or stored remotely), selects data fields from the data source(s), and uses the selected fields to define a visual graphic. In some embodiments, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 206. In some embodiments, the data visualization application 222 executes as a standalone application (e.g., a desktop application). In some embodiments, the data visualization application 222 executes within the web browser 20 or another application using web pages provided by a web server; and
- zero or more databases or data sources 240 (e.g., a first data source 240-1 and a second data source 240-2), which are used by the data visualization application 222. In some embodiments, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 214 stores a subset of the modules and data structures identified above. Furthermore, the memory 214 may store additional modules or data structures not described above.

Although FIG. 2 shows a computing device 300, FIG. 2 is intended more as a functional description of the various features that may be present rather than as a structural schematic of the embodiments described herein. In practice, and as recognized by those of ordinary skill in the art, items shown separately could be combined and some items could be separated.

Figure 3A:
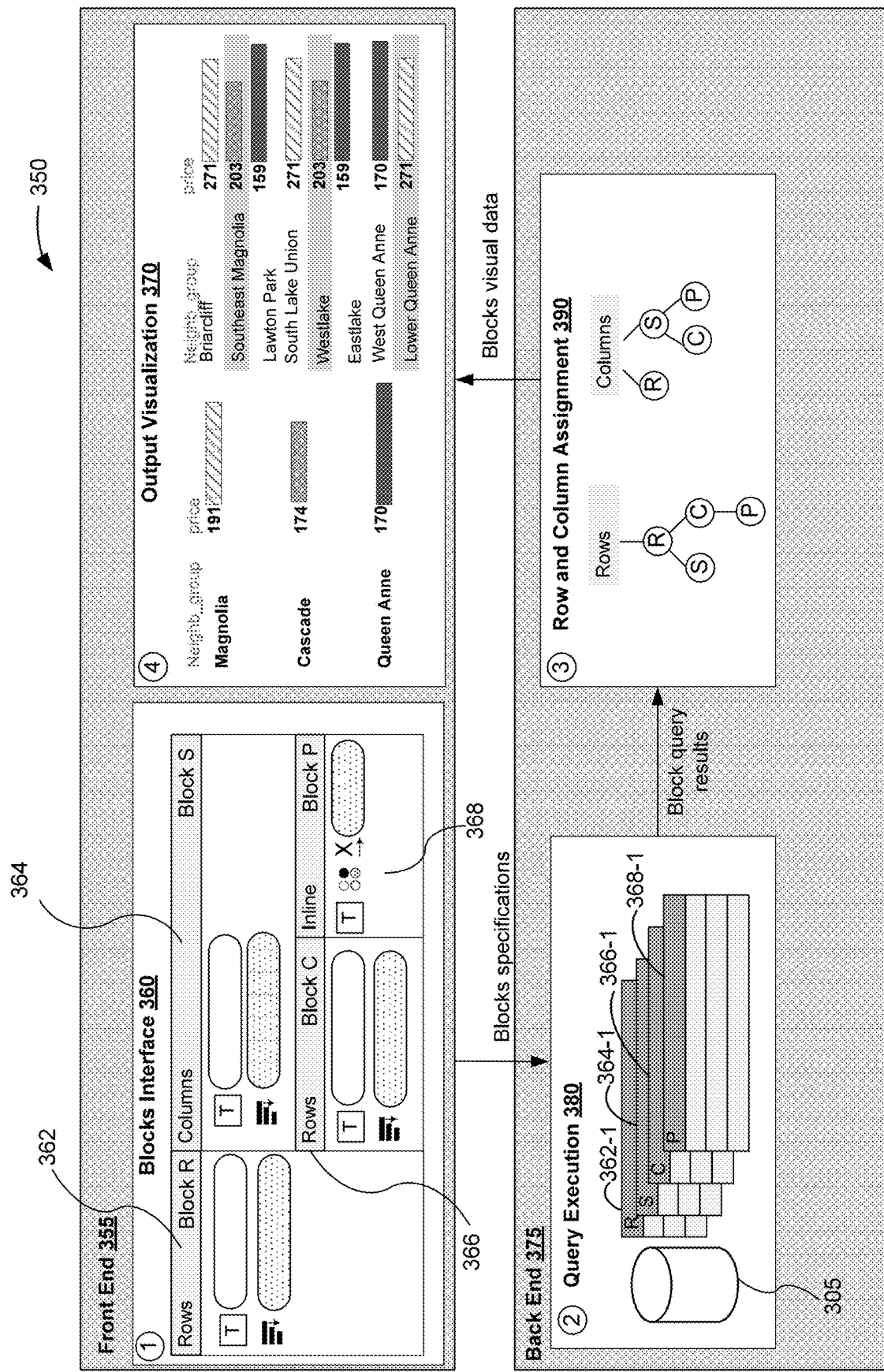
FIG. 3A illustrates example blocks system, in accordance with some embodiments.

FIG. 3 illustrates blocks system 350, in accordance with some embodiments. Front end 355 of blocks system 350 includes blocks interface 360 (e.g., interactive graphical user interface 206) for building an analytical workflow based on connected block objects represented by block cards in blocks interface 360. In some embodiments, the blocks system 450 provides an interface at the front end 355 for creating block objects, including corresponding block specification represented by corresponding block cards, and to display (or view) resulting data visualizations such as output visualization 370. In some embodiments, the blocks interface 360 and the output visualization 370 are implemented using React-based TypeScript modules that run in a web browser. In other embodiments, different libraries and programming languages are used. In some embodiments, the front end 355, including blocks interface 360 and the output visualization 370 communicate with over Hypertext Transfer Protocol Secure (HTTPS) with backend 375 that implements a query execution process 380 and row and column assignment process 390. In other embodiments, a different communication protocol may be used for communication between the front end 355 and the backend 375. In some embodiments, the backend 375 is implemented using a data analysis library based on Python programming framework. In other embodiments, different libraries and programming languages may be used. In some embodiments, backend 375 can connect to a Tableau Server Data Source, thereby gaining access to a rich data model.

In some embodiments, a user builds an analytical workflow by adding and connecting a number of block cards by placing data field representations onto an analytical canvas. For example, block interface 360 includes an analytical canvas region, which includes a number of block cards 362-368, each block card is translated into a respective block specification, such as block specification 150 in FIG. 1B. Block card 362 represents block object "R"; block card 362 represents block object "S"; block card 366 represents block object "C"; and block card 362 represent block object "P". In some embodiments, each block card of block cards 362-368 is used to define multiple data fields encodings at a single level of detail (LOD). In some embodiments, a block specification includes one or more dimensions and/or one or more measures aggregated to a level of detail determined by the respective block object (e.g., a union of the local level of detail of the respective block object and the local level of detail of all ancestors of the respective block object); one or more visual encodings; a layout type that specifies one of a row-based arrangement, a column-based arrangement, or an inline arrangement; optionally, one or more filters; and optionally, a sorting order.

In some embodiments, during a query execution phase 380, which is performed at back end 375, a query is issued for each block object based on the corresponding block specifications. For example, a block query is issued for block object "R" represented by block card 362; a block query is issued for block object "C" represented by block card 366; a block query is issued for block object "P" represented by block card 368. The block queries are executed over data source 305, which may be remote or stored on the same computer system. An output of each of block queries is a block result set, which includes corresponding tuples retrieved from data source 305 and respective encoding results. For example, a table with a different schema is generated based on each query, such as result table 362-1 is generated for block object "R"; result table 364-1 is generated for block object "S"; a result table 366-1 is generated for block object "C"; and a result table 368-1 is generated for block object "P".

In a next phase, a structure and layout of a final data visualization is determined by executing a Row and Column assignment process 390 at the backend 375, according to some embodiments. Row and Column assignment process 390 assigns a row index and a column index from a single grid to each tuple that is included in result tables 362-1; 364-1; 366-1; and 368-1. In some embodiments, the row indexes and the column indexes form a grid (e.g., a collection of cells each having a unique position in the grid) that represents the layout of the data visualization. In some embodiments there are two implicitly created root block objects that are not visible in the blocks interface 360, e.g., there is no block card that visually represents the two root blocks in the blocks interface 360. In some embodiments, the two root blocks are a Rows root block object (e.g., a root block object that has layout type Rows) and a Columns root block object (e.g., a root block object that has layout type Columns). In some embodiments, any block object that is not a child of an explicit (as opposed to implicit) block object that is of Row layout type is a child of the Rows root block object. Any Block that is not a child of an explicit block object that is of Column layout type is a is a child of the Columns root block object. In other words, any block object that has no parents is a child of the rows root block object and the columns root block object. In some embodiments, the implicitly created root block objects are used as the starting point for calculating Row and Column indexes.

An output visualization 370 is generated in which each tuple is represented as a visual mark according to the assigned row and column index. In some embodiments, the grid Row and Column assignment process 390 distributes a number of marks that correspond to tuples included in tables 362-1; 364-1; 366-1; and 368-1. In some embodiments, output visualization 370 is displayed in the same user interface at the frontend 355, e.g., location adjacent to or near blocks interface 360.

Figure 3B:
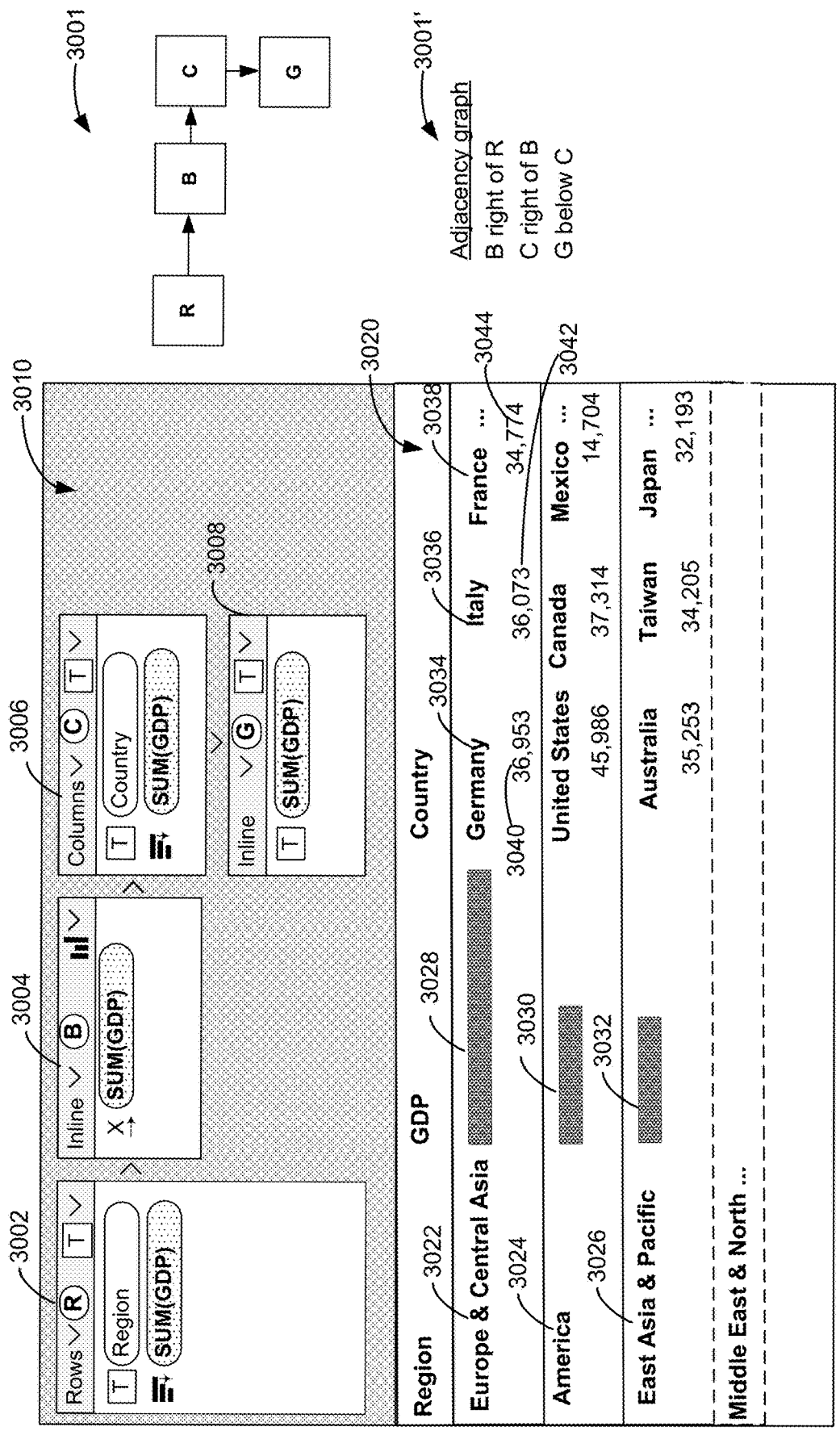
FIG. 3B represents an example blocks user interface, including connected block cards and corresponding partial output visualization, in accordance with some embodiments.

FIG. 3B represents an example blocks user interface 3010, including connected block cards 3002-3008 and corresponding partial output visualization 3020 that is generated in accordance with the query execution process 380 and the rows and columns assignment process 390 (described in relation to FIG. 3A), in accordance with some embodiments. The blocks system 350 performs the query execution process 380 prior rows and columns assignment process 390. In some embodiments, queries are sorted by their inherited LOD first, so that all tuples that have the same parents are kept together in the respective query result. Afterwards, optionally, any sorting that is specified by a user is applied. In some embodiments, each tuple that is returned is assigned a global unique tuple identifier. Respective queries are generated based on the level of detail (local and inherited dimensions), and the measures and sorting defined in each block specification for each block card in the blocks user interface. For example, Table 1 below illustrates the level of detail (local and inherited dimensions), and the measures and sorting defined for each block card 3002-3008 in blocks user interface 3010.

TABLE 1

|  | Block R | Block B | Block C | Block G |
| --- | --- | --- | --- | --- |
| Inherited LOD | none | Region | Region | Region |
| Local LOD | Region | none | Country | Country |
| Measures | SUM(GDP) | SUM(GDP) | SUM(GDP) | SUM(GDP) |
| Sort | SUM(GDP) (user) | Region (inherited LOD) | Region (inherited LOD) | Region (inherited LOD), SUM(GDP)(user) |

In some embodiments, tuples returned for each query generated based on block R (represented by block card 3002), block B (represented by block card 3004), block C (represented by block card 3006), and block G (represented by block card 3008), respectively, are illustrated in Tables 2, 3, 4, and 5 below. For example, Table 2 below represents tuples returned based on a query generated for block R. The dimension Region is encoded in text, where the resulting tuples return a textual mark for each region in the dimension Regions (e.g., "Europe & Central Asia," "America," "East Asia & Pacific," "Middle East & North Africa," "Sub-Saharan Africa," and "South Asia") as illustrated in data visualization 3020 shown in FIG. 3B. For example, a row is displayed for each region such as textual mark 3022 for region "Europe & Central Asia," textual mark 3024 for region "America," and textual mark 3026 for region "East Asia & Pacific" (the rest of the regions listed in Table 2 are not shown in FIG. 3B for simplicity). Further, GDP per Region is calculated, since the user has applied a sorting order based on GDP per Region. For example, resulting tuples (e.g., R1-R6) are sorted by GDP per Region, e.g., Europe & Central Asia have the highest GDP (R1) and are therefore first in the sorting order, where South Asia has the lowest GDP (R6) and is last in the sorting order as illustrated in Table 2. In some embodiments, the resulting position of each tuple R1-R6 is determined in accordance with the row and column assignment process 390.

TABLE 2

| Region | GDP | Tuple ID |
| --- | --- | --- |
| Europe & Central Asia | 229003 | R1 |
| America | 150329 | R2 |
| East Asia & Pacific | 144803 | R3 |
| Middle East & North Africa | 83136 | R4 |
| Sub-Saharan Africa | 23121 | R5 |
| South Asia | 15031 | R6 |

Table 3 below represents tuples returned based on a query generated for block B, where the measure GDP is also aggregated (e.g., summarized) by the dimension Region. The resulting tuples are encoded as bar chart mark, and a bar corresponding to each Region displayed in data visualization 3020 in FIG. 3B. For example, a bar that represents the GDP per Region is displayed for each Region, such as bar 3028 is a mark representing the GDP per Region for Region "Europe & Central Asia," bar 3030 is a mark representing the GDP per Region for "America," and mark 3032 representing the GDP per Region for "East Asia & Pacific." Since Block B, as a child of block R, inherits R dimensionality, each bar is displayed for each row that represents the region. Further, since Block B, as a child of block R inherits dimensionality of block R, the sorting order applied to block R is also the order in which the bars for each GDP per Region are displayed in data visualization 3020. In some embodiments, the resulting position of each tuple B1-B6 is determined in accordance with the row and column assignment process 390.

TABLE 3

| Region | GDP | Tuple ID |
| --- | --- | --- |
| America | 150329 | B1 |
| East Asia & Pacific | 144803 | B2 |
| Europe & Central Asia | 229003 | B3 |
| Middle East & North Africa | 83136 | B4 |
| South Asia | 15031 | B5 |
| Sub-Saharan Africa | 23121 | B6 |

Table 4 below represents tuples returned based on a query generated for block C, where the measure GDP is aggregated (e.g., summarized) by Country, where Country is encoded on text, and the tuples are ordered by a user defined sort that sorts all tuples based on a Country's GDP for all countries within a given Region. Since the dimension Country is encoded on text, the resulting tuples that are returned are represented as a textual mark for each Country within a given Region as illustrated in data visualization 3020 shown in FIG. 3B. For example, a column is displayed for each country, e.g., textual mark 3034 for country Germany, textual mark 3036 for country Italy, and textual mark 3038 for country France for region "Europe & Central Asia") (the rest of the countries listed in Table 4 are not shown in FIG. 3B for simplicity). Further, the GDP of each country is calculated, since the user has applied a sorting order based on each country's GDP. For example, resulting tuples (e.g., C1-C50) are sorted by the GDP of each country within a given region, e.g., United States has the highest GDP for America (C1) and is therefore first in the sorting order for America, where Peru has the lowest GDP (C8) and is last in the sorting order for America as illustrated in Table 2 (e.g., sorting of tuples C1-C8; Australia has the highest GDP for East Asia & Pacific (C9) and is and is therefore first in the sorting order for East Asia & Pacific and Myanmar has the lowest GDP (C18) and is therefore last in the sorting order for East Asia & Pacific as illustrated in Table 2 (sorting of tuples C9-C18). In some embodiments, the resulting position of each tuple C1-C50 is determined in accordance with the row and column assignment process 390.

TABLE 4

| Region | Country | GDP | Tuple ID |
| --- | --- | --- | --- |
| America | United States | 45986 | C1 |
| America | Canada | 37314 | C2 |
| America | Mexico | 14704 | C3 |
| America | Venezuela | 14461 | C4 |
| America | Argentina | 11504 | C5 |
| America | Brazil | 11461 | C6 |
| America | Colombia | 8414 | C7 |
| America | Peru | 6485 | C8 |
| East Asia & Pacific | Australia | 35253 | C9 |
| East Asia & Pacific | Taiwan | 34205 | C10 |
| East Asia & Pacific | Japan | 32193 | C11 |
| East Asia & Pacific | Malaysia | 15695 | C12 |
| East Asia & Pacific | Thailand | 8939 | C13 |
| East Asia & Pacific | Indonesia | 5878 | C14 |
| East Asia & Pacific | Philippines | 4243 | C15 |
| East Asia & Pacific | China | 3678 | C16 |
| East Asia & Pacific | Vietnam | 2650 | C17 |
| East Asia & Pacific | Myanmar | 2069 | C18 |
| Europe & Central Asia | Germany | 36953 | C19 |
| Europe & Central Asia | Italy | 36073 | C20 |
| Europe & Central Asia | France | 34774 | C21 |
| Europe & Central Asia | United Kingdom | 32543 | C22 |
| Europe & Central Asia | Spain | 30647 | C23 |
| Europe & Central Asia | Poland | 14565 | C24 |
| Europe & Central Asia | Russia | 13173 | C25 |
| Europe & Central Asia | Turkey | 13025 | C26 |
| Europe & Central Asia | Romania | 9970 | C27 |
| Europe & Central Asia | Ukraine | 4809 | C28 |
| Europe & Central Asia | Uzbekistan | 2471 | C29 |
| Middle East & North Africa | Saudi Arabia | 37531 | C30 |
| Middle East & North Africa | Iraq | 11764 | C31 |
| Middle East & North Africa | Iran | 11719 | C32 |
| Middle East & North Africa | Algeria | 9885 | C33 |
| Middle East & North Africa | Egypt | 7807 | C34 |
| Middle East & North Africa | Morocco | 4430 | C35 |
| South Asia | SriLanka | 4946 | C36 |
| South Asia | Pakistan | 3366 | C37 |
| South Asia | India | 2548 | C38 |
| South Asia | Bangladesh | 1632 | C39 |
| South Asia | Nepal | 1577 | C40 |
| South Asia | Afghanistan | 962 | C41 |
| Sub-Saharan Africa | South Africa | 9927 | C42 |
| Sub-Saharan Africa | Nigeria | 2836 | C43 |
| Sub-Saharan Africa | Ghana | 2273 | C44 |
| Sub-Saharan Africa | Sudan | 2258 | C45 |
| Sub-Saharan Africa | Kenya | 2143 | C46 |
| Sub-Saharan Africa | Tanzania | 1488 | C47 |
| Sub-Saharan Africa | Uganda | 1042 | C48 |
| Sub-Saharan Africa | Ethiopia | 623 | C49 |
| Sub-Saharan Africa | Dem. Rep. Congo | 531 | C50 |

Table 5 below represents tuples returned based on a query generated for block G, where the measure GDP is aggregated (e.g., summarized) by Country, where GDP per Country is encoded on text. Since the measure GDP calculated per Country is encoded on text, the resulting tuples are represented as a textual mark for each Country within a given Region as illustrated in data visualization 3020 shown in FIG. 3B. For example, for each Country represented by a column, the calculated GDP is displayed as a textual mark, e.g., textual mark 3040 ("36,953") is displayed for country Germany, textual mark 3042 ("36,073") is displayed for country Italy, and textual mark 3044 ("34,774") is displayed for country France (the rest of the countries' GDP listed in Table 5 are not shown in FIG. 3B for simplicity). In some embodiments, the resulting position of each tuple G1-G50 is determined in accordance with the row and column assignment process 390.

TABLE 5

| Region | Country | GDP | Tuple ID |
| --- | --- | --- | --- |
| America | Argentina | 11504 | G1 |
| America | Brazil | 11461 | G2 |
| America | Canada | 37314 | G3 |
| America | Colombia | 8414 | G4 |
| America | Mexico | 14704 | G5 |
| America | Peru | 6485 | G6 |
| America | United States | 45986 | G7 |
| America | Venezuela | 14461 | G8 |
| East Asia & Pacific | Australia | 35253 | G9 |
| East Asia & Pacific | China | 3678 | G10 |
| East Asia & Pacific | Indonesia | 5878 | G11 |
| East Asia & Pacific | Japan | 32193 | G12 |
| East Asia & Pacific | Malaysia | 15695 | G13 |
| East Asia & Pacific | Myanmar | 2069 | G14 |
| East Asia & Pacific | Philippines | 4243 | G15 |
| East Asia & Pacific | Taiwan | 34205 | G16 |
| East Asia & Pacific | Thailand | 8939 | G17 |
| East Asia & Pacific | Vietnam | 2650 | G18 |
| Europe & Central Asia | France | 34774 | G19 |
| Europe & Central Asia | Germany | 36953 | G20 |
| Europe & Central Asia | Italy | 36073 | G21 |
| Europe & Central Asia | Poland | 14565 | G22 |
| Europe & Central Asia | Romania | 9970 | G23 |
| Europe & Central Asia | Russia | 13173 | G24 |
| Europe & Central Asia | Spain | 30647 | G25 |
| Europe & Central Asia | Turkey | 13025 | G26 |
| Europe & Central Asia | Ukraine | 4809 | G27 |
| Europe & Central Asia | United Kingdom | 32543 | G28 |
| Europe & Central Asia | Uzbekistan | 2471 | G29 |
| Middle East & North Africa | Algeria | 9885 | G30 |
| Middle East & North Africa | Egypt | 7807 | G31 |
| Middle East & North Africa | Iran | 11719 | G32 |
| Middle East & North Africa | Iraq | 11764 | G33 |
| Middle East & North Africa | Morocco | 4430 | G34 |
| Middle East & North Africa | Saudi Arabia | 37531 | G35 |
| South Asia | Afghanistan | 962 | G36 |
| South Asia | Bangladesh | 1632 | G37 |
| South Asia | India | 2548 | G38 |
| South Asia | Nepal | 1577 | G39 |
| South Asia | Pakistan | 3366 | G40 |
| South Asia | SriLanka | 4946 | G41 |
| Sub-Saharan Africa | Dem. Rep. Congo | 531 | G42 |
| Sub-Saharan Africa | Ethiopia | 623 | G43 |
| Sub-Saharan Africa | Ghana | 2273 | G44 |
| Sub-Saharan Africa | Kenya | 2143 | G45 |
| Sub-Saharan Africa | Nigeria | 2836 | G46 |
| Sub-Saharan Africa | South Africa | 9927 | G47 |
| Sub-Saharan Africa | Sudan | 2258 | G48 |
| Sub-Saharan Africa | Tanzania | 1488 | G49 |
| Sub-Saharan Africa | Uganda | 1042 | G50 |

In some embodiments, after queries generated for each block card is executed and the resulting tables with tuples are returned (e.g., Tables 2-5), the block system assigns each tuple to a respective position in the final data visualization in accordance with the row and column assignment process 390.

In some embodiments, block cards in the blocks interface such as block cards 3002-3008 in FIG. 3B form an adjacency graph. For example, adjacency graph 3001 and 3001' represent the same adjacency graph for blocks user interface 3010, where 3001 is a graphical representation and 3001' is a textual representation. In some embodiments, the adjacency graph is used transformed into a parent-child graph that represents the relationship between the blocks in the blocks user interface 3010, where the implicit row and column Root blocks that are implicitly created by the system ensure that the parent-child graph is a directed acyclic graph. The parent-child graph is used in the row and column assignment process 390. For example, the adjacency graph 3001 determined based on positions of blocks 3002-3008 in blocks interface 3010 is transformed into parent-child graph 3050 illustrated in FIG. 3C. In some embodiments, creating the parent-child graph 3050 is a preliminary step in the row and column assignment process. In some embodiments, each block has a row and a column parent. In some embodiments, if there is no user defined parent, the implicit rows or columns block is assigned as a respective parent. For example, block R has no parents, and thus rows and columns root blocks are assigned as parents to block R. In some embodiments, the children are ordered. In some embodiments, there are multiple children in the same ordinal position.

Figure 3C:
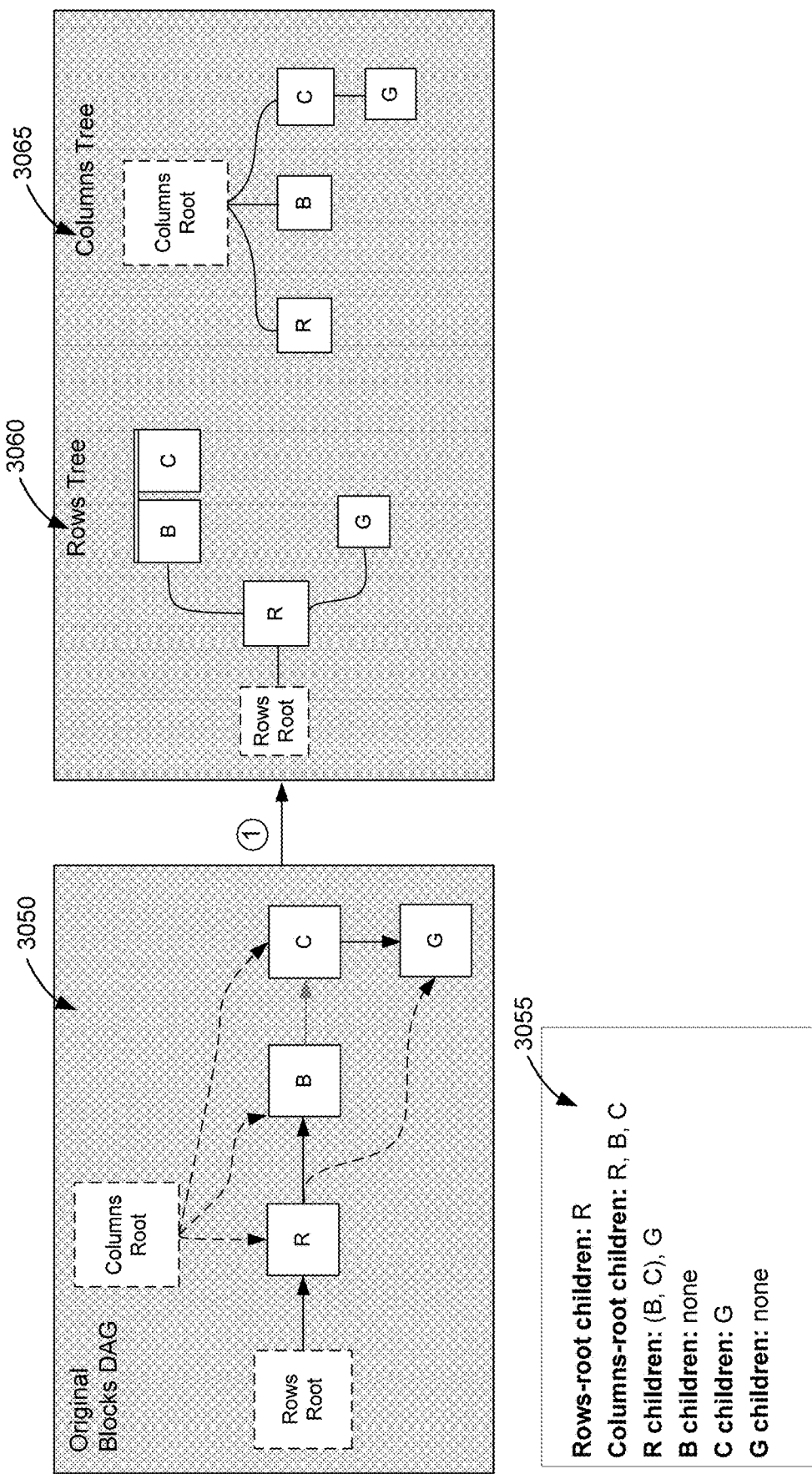
FIG. 3C illustrates a parent-child graph transformed from an adjacency and a rows block tree and a columns block tree generated based on the patent-child graph, in accordance with some embodiments.

FIG. 3C illustrates a parent-child graph 3050 transformed from adjacency graph 3001 or 3001'. In some embodiments, the transformation proves begins at the top-left of the adjacency graph and proceeds in breadth-first search. For example, the transformation algorithm starts with assign block R as a child block to the two implicitly created root blocks (which are invisible in the user interface), e.g., the rows root and the columns root blocks, each of the row and column layout type, respectively. The transformation algorithm proceeds to building the parent-child graph by performing the following steps. For a link in the right-of direction between two blocks, a first block B1 and a second block B2 (e.g., from left to right, where B1 is on the left of B2), if block B1 is an inline block, add the second block B2 as a child of the first block B1's rows parent, where the second block B2 shares the ordinal position occupied by the first block B1, and also add the second block B1 as a child of the first block B1's columns parent, in the ordinal position after P. If block B1 is a rows block, add the second block B2 as a child of the first block B1, and also add the second block B1 as a child of the first block B1's columns parent, in the ordinal position after P. For a link in the below direction between two blocks, a first block B1 and a second block B2 (e.g., B1 is above B2), in the adjacency graph, if block B1 is an inline block, add the second block B2 as a child of the first block B1's rows parent, in the ordinal position after the first block B1, and also add the second block B1 as a child of the first block B1's columns parent, sharing the same ordinal position occupied by the first block B1. If block B1 is a columns block, add the second block B2 as a child of the first block B1, and also add the second block B1 as a child of the first block B1' s rows parent, in the ordinal position after P.

In some embodiments, a textual description 3055 of the parent-child relationships of the parent-child graph 3050 is shown in FIG. 3C.

The rows and columns assignment process 390 starts with building the rows tree and the columns tree from a parent-child graph generated based on the blocks built in the blocks user interface. For example, a rows tree 3060 and a columns tree 365 are built from parent-child graph 3050 for blocks user interface 3010, including block cards 3002-3008. In some embodiments, a rows tree is built from a parent-child graph by only considering links from Rows Blocks to their children, excluding any other links. The blocks interface 3010 ensures that this tree exists, is connected, and has a single root at the implicit Rows root Block. For example, the root node for the rows tree is the implicit root node, where the first link that is added is the link from the implicit root node to the child block R. Next, the children blocks B and C are added in the same ordinal position (e.g., tuples for B and C are displayed in the same row as each). Also, the child block G is added as a child of block R. Since there is no specified parent for block G that is a rows block, block G is assigned the parent row block of block C, which is block R, since block B is an inline block. In some embodiments, a columns tree is built from a parent-child graph by only considering links from Columns Blocks to their children, excluding any other links. The blocks interface 3010 ensures that this tree exists, is connected, and has a single root at the implicit Columns root Block. Block C is the only columns block in parent-child graph 3050. Blocks R, B, and C are child blocks of the implicit columns root block. Since only block C is a columns block, the only other child that is added to the columns tree is the child of block C, which is block G.

At the next phase of the rows and columns assignment process, a rows tuples tree and a columns tuples tree is produced where each tuple is a node. Since each block in the blocks user interface contains multiple tuples, the dimension are used to connect each tuple from the child block to a specific tuple in the parent block. For example, the process adds a tuple identifier for each tuple the parent Block in the Rows tree that has the same dimension value and a tuple identifier for each tuple in the parent Block in Columns.

For example, Tables 6-9 below illustrates how each tuple from a child block is connected to each tuple in the parent block based on rows tree 3060 and columns tree 3065 to produce the rows tuples tree and the columns tuple tree, in accordance with some embodiments. In the case of parent-child graph 3050, Block R is a child of only the Rows Root and Columns root, so every tuple has the Rows Root and Columns Root as its parent. Table 6 below illustrates connecting the block R to its parent blocks the Root Rows and Root Columns implicit (not shown) blocks in the rows tree 3060 and columns tree 3065, respectively.

TABLE 7

| Region | GDP | Tuple ID | Rows Parent | Columns Parent |
|---|---|---|---|---|
| Europe & Central Asia | 229003 | R1 | RowsRoot | ColumnsRoot |
| America | 150329 | R2 | RowsRoot | ColumnsRoot |
| America | 150329 | B1 | R2 | ColumnsRoot |
| East Asia & Pacific | 144803 | B2 | R3 | ColumnsRoot |
| Europe & Central Asia | 229003 | B3 | R1 | ColumnsRoot |
| Middle East & North Africa | 83136 | B4 | R4 | ColumnsRoot |
| South Asia | 15031 | B5 | R6 | ColumnsRoot |
| Sub-Saharan Africa | 23121 | B6 | R5 | ColumnsRoot |

TABLE 6

| East Asia & Pacific | 144803 | R3 | RowsRoot | ColumnsRoot |
|---|---|---|---|---|
| Middle East & North Africa | 83136 | R4 | RowsRoot | ColumnsRoot |
| Sub-Saharan Africa | 23121 | R5 | RowsRoot | ColumnsRoot |
| South Asia | 15031 | R6 | RowsRoot | ColumnsRoot |

Table 7 below illustrates connecting the block B to its rows parent block R in the rows tree 3060 and its columns parent the Root Column (not shown) block in the columns tree 3065. For example, in the Rows tree 3060, block B is a child of block R. Thus, the Rows parent for each tuple from block B is the identifier of the tuple from block R that has the same value for Region. In the Columns tree 3065, block B is a child of the Columns Root, so all tuples have Columns Root as their parent, as illustrated in Table 7 below.

Table 8 below illustrates connecting the block C to its rows parent block R in the rows tree 3060 and its columns parent the Root Column (not shown) block in the columns tree 3065. For example, in the Rows tree 3060, block C is a child of rows block R. Thus, the Rows parent for each tuple in block C is the identifier of the tuple from block R that has the same value for Region. In the Columns tree 3065, block C is a child of the Columns Root, so all tuples have the Columns Root as their parent columns block, as illustrated in Table 8 below.

TABLE 8

| Region | Country | GDP | Tuple ID | Rows Parent | Columns Parent |
|---|---|---|---|---|---|
| America | United States | 45986 | C1 | R2 | ColumnsRoot |
| America | Canada | 37314 | C2 | R2 | ColumnsRoot |
| America | Mexico | 14704 | C3 | R2 | ColumnsRoot |
| America | Venezuela | 14461 | C4 | R2 | ColumnsRoot |
| America | Argentina | 11504 | C5 | R2 | ColumnsRoot |
| America | Brazil | 11461 | C6 | R2 | ColumnsRoot |
| America | Colombia | 8414 | C7 | R2 | ColumnsRoot |
| America | Peru | 6485 | C8 | R2 | ColumnsRoot |
| East Asia & Pacific | Australia | 35253 | C9 | R3 | ColumnsRoot |
| East Asia & Pacific | Taiwan | 34205 | C10 | R3 | ColumnsRoot |
| East Asia & Pacific | Japan | 32193 | C11 | R3 | ColumnsRoot |
| East Asia & Pacific | Malaysia | 15695 | C12 | R3 | ColumnsRoot |
| East Asia & Pacific | Thailand | 8939 | C13 | R3 | ColumnsRoot |
| East Asia & Pacific | Indonesia | 5878 | C14 | R3 | ColumnsRoot |
| East Asia & Pacific | Philippines | 4243 | C15 | R3 | ColumnsRoot |
| East Asia & Pacific | China | 3678 | C16 | R3 | ColumnsRoot |
| East Asia & Pacific | Vietnam | 2650 | C17 | R3 | ColumnsRoot |
| East Asia & Pacific | Myanmar | 2069 | C18 | R3 | ColumnsRoot |
| Europe & Central Asia | Germany | 36953 | C19 | R1 | ColumnsRoot |
| Europe & Central Asia | Italy | 36073 | C20 | R1 | ColumnsRoot |
| Europe & Central Asia | France | 34774 | C21 | R1 | ColumnsRoot |
| Europe & Central Asia | United Kingdom | 32543 | C22 | R1 | ColumnsRoot |
| Europe & Central Asia | Spain | 30647 | C23 | R1 | ColumnsRoot |
| Europe & Central Asia | Poland | 14565 | C24 | R1 | ColumnsRoot |
| Europe & Central Asia | Russia | 13173 | C25 | R1 | ColumnsRoot |
| Europe & Central Asia | Turkey | 13025 | C26 | R1 | ColumnsRoot |
| Europe & Central Asia | Romania | 9970 | C27 | R1 | ColumnsRoot |
| Europe & Central Asia | Ukraine | 4809 | C28 | R1 | ColumnsRoot |
| Europe & Central Asia | Uzbekistan | 2471 | C29 | R1 | ColumnsRoot |
| Middle East & North Africa | Saudi Arabia | 37531 | C30 | R4 | ColumnsRoot |
| Middle East & North Africa | Iraq | 11764 | C31 | R4 | ColumnsRoot |
| Middle East & North Africa | Iran | 11719 | C32 | R4 | ColumnsRoot |
| Middle East & North Africa | Algeria | 9885 | C33 | R4 | ColumnsRoot |
| Middle East & North Africa | Egypt | 7807 | C34 | R4 | ColumnsRoot |
| Middle East & North Africa | Morocco | 4430 | C35 | R4 | ColumnsRoot |
| South Asia | SriLanka | 4946 | C36 | R6 | ColumnsRoot |
| South Asia | Pakistan | 3366 | C37 | R6 | ColumnsRoot |
| South Asia | India | 2548 | C38 | R6 | ColumnsRoot |
| South Asia | Bangladesh | 1632 | C39 | R6 | ColumnsRoot |
| South Asia | Nepal | 1577 | C40 | R6 | ColumnsRoot |
| South Asia | Afghanistan | 962 | C41 | R6 | ColumnsRoot |
| Sub-Saharan Africa | South Africa | 9927 | C42 | R5 | ColumnsRoot |
| Sub-Saharan Africa | Nigeria | 2836 | C43 | R5 | ColumnsRoot |
| Sub-Saharan Africa | Ghana | 2273 | C44 | R5 | ColumnsRoot |
| Sub-Saharan Africa | Sudan | 2258 | C45 | R5 | ColumnsRoot |
| Sub-Saharan Africa | Kenya | 2143 | C46 | R5 | ColumnsRoot |
| Sub-Saharan Africa | Tanzania | 1488 | C47 | R5 | ColumnsRoot |
| Sub-Saharan Africa | Uganda | 1042 | C48 | R5 | ColumnsRoot |
| Sub-Saharan Africa | Ethiopia | 623 | C49 | R5 | ColumnsRoot |
| Sub-Saharan Africa | Dem. Rep. Congo | 531 | C50 | R5 | ColumnsRoot |

Table 9 below illustrates connecting the block G to its rows parent block R in the rows tree 3060 and its columns parent column Block C in the columns tree 3065. For example, in the Rows tree 3060, block G is a child of block R. Thus, the Rows parent for each tuple in block G is the identifier of the tuple from block R that has the same value for Region. In the Columns tree 3065, block G is a child of block C. Thus, the Rows parent for each tuple in block G is the identifier of the tuple from block C that has the same values for Region and Country, as illustrated in Table 9 below.

TABLE 9

| Region | Country | GDP | Tuple ID | Rows Parent | Columns Parent |
|---|---|---|---|---|---|
| America | Argentina | 11504 | G1 | R2 | C5 |
| America | Brazil | 11461 | G2 | R2 | C6 |
| America | Canada | 37314 | G3 | R2 | C2 |
| America | Colombia | 8414 | G4 | R2 | C7 |
| America | Mexico | 14704 | G5 | R2 | C3 |
| America | Peru | 6485 | G6 | R2 | C8 |
| America | United States | 45986 | G7 | R2 | C1 |
| America | Venezuela | 14461 | G8 | R2 | C4 |
| East Asia & Pacific | Australia | 35253 | G9 | R3 | C9 |
| East Asia & Pacific | China | 3678 | G10 | R3 | C16 |
| East Asia & Pacific | Indonesia | 5878 | G11 | R3 | C14 |
| East Asia & Pacific | Japan | 32193 | G12 | R3 | C11 |
| East Asia & Pacific | Malaysia | 15695 | G13 | R3 | C12 |
| East Asia & Pacific | Myanmar | 2069 | G14 | R3 | C18 |
| East Asia & Pacific | Philippines | 4243 | G15 | R3 | C15 |
| East Asia & Pacific | Taiwan | 34205 | G16 | R3 | C10 |
| East Asia & Pacific | Thailand | 8939 | G17 | R3 | C13 |
| East Asia & Pacific | Vietnam | 2650 | G18 | R3 | C17 |
| Europe & Central Asia | France | 34774 | G19 | R1 | C21 |
| Europe & Central Asia | Germany | 36953 | G20 | R1 | C19 |
| Europe & Central Asia | Italy | 36073 | G21 | R1 | C20 |
| Europe & Central Asia | Poland | 14565 | G22 | R1 | C24 |
| Europe & Central Asia | Romania | 9970 | G23 | R1 | C27 |
| Europe & Central Asia | Russia | 13173 | G24 | R1 | C25 |
| Europe & Central Asia | Spain | 30647 | G25 | R1 | C23 |
| Europe & Central Asia | Turkey | 13025 | G26 | R1 | C26 |
| Europe & Central Asia | Ukraine | 4809 | G27 | R1 | C28 |
| Europe & Central Asia | United Kingdom | 32543 | G28 | R1 | C22 |
| Europe & Central Asia | Uzbekistan | 2471 | G29 | R1 | C29 |
| Middle East & North Africa | Algeria | 9885 | G30 | R4 | C33 |
| Middle East & North Africa | Egypt | 7807 | G31 | R4 | C34 |
| Middle East & North Africa | Iran | 11719 | G32 | R4 | C32 |
| Middle East & North Africa | Iraq | 11764 | G33 | R4 | C31 |
| Middle East & North Africa | Morocco | 4430 | G34 | R4 | C35 |
| Middle East & North Africa | Saudi Arabia | 37531 | G35 | R4 | C30 |
| South Asia | Afghanistan | 962 | G36 | R6 | C41 |
| South Asia | Bangladesh | 1632 | G37 | R6 | C39 |
| South Asia | India | 2548 | G38 | R6 | C38 |
| South Asia | Nepal | 1577 | G39 | R6 | C40 |
| South Asia | Pakistan | 3366 | G40 | R6 | C37 |
| South Asia | SriLanka | 4946 | G41 | R6 | C36 |
| Sub-Saharan Africa | Dem. Rep. Congo | 531 | G42 | R5 | C50 |
| Sub-Saharan Africa | Ethiopia | 623 | G43 | R5 | C49 |
| Sub-Saharan Africa | Ghana | 2273 | G44 | R5 | C44 |
| Sub-Saharan Africa | Kenya | 2143 | G45 | R5 | C46 |
| Sub-Saharan Africa | Nigeria | 2836 | G46 | R5 | C43 |
| Sub-Saharan Africa | South Africa | 9927 | G47 | R5 | C42 |
| Sub-Saharan Africa | Sudan | 2258 | G48 | R5 | C45 |
| Sub-Saharan Africa | Tanzania | 1488 | G49 | R5 | C47 |
| Sub-Saharan Africa | Uganda | 1042 | G50 | R5 | C48 |

In some embodiments, the rows and columns assignment process 390 assigns a row index to each tuple by traversing in depth-first order the rows tuples tree, and a column index is assigned to each tuple by traversing in depth-first order the columns tuples tree. Leaf tuples in the rows or the columns tuples trees are assigned a single row index, where interior nodes record the minimum and maximum row indexes of all their leaves into the tuple. In some embodiments, pre-sorting is performed before the process assigns the rows and column indexes. For example, the rows and columns assignment process 390 sorts the children of each tuple, first in the order their corresponding block appear as children in the Rows tree, and then in the order of the Rows dimensions and user-specified sorts, if any for each block. Similarly, for the Columns tree, process 390 sorts the children of each tuple, first in the order their corresponding block appear as children in the Columns tree, and then in their order of the Columns dimensions and user-specified sorts if any for each block. In some embodiments, rather than pre-sorting, the sorting is performed by controlling the order of the depth-first traversal in the rows and columns tuples tree, respectively. In other words, sorting is performed in parallel with assigning the rows and columns indexes.

For example, Table 10 illustrates pseudo-code for the process of assigning rows and columns index to each tuple in the rows tuples tree and the columns tuples, where no pre-sorting is performed.

TABLE 10

Function processTuple( block BLK, tuple TUP, int curIndex, direction ("Rows" or "Columns") )
If TUP is a leaf (i.e. has no children)
    Set TUP's min direction index and max direction index to curIndex
    If BLK's layout type is the same as direction
        Return curIndex + 1
    Else
        Return curIndex
    Endif
Else (i.e. T has children)
    Set TUP's min direction index to curIndex (shown as 'start' in Tables 11 and 12)
    For each group GRP of children of BLK
        Remember curIndex as restartIndex
        For each child block cBLK in the group GRP
            Set curIndex to restartIndex
            Set prevParent to null
            For each tuple cTUP that is from block cBLK and has TUP as its direction parent
                If cTUP's other parent (i.e. columns if direction is rows, and vice versa) is different from prevParent
                    Set curIndex to restartIndex
                    Set prevParent to cTUP's other parent
                Endif
                Set curIndex to the return value of processTuple( cBLK, cTUP, curIndex, direction)
            Endfor
        Endfor
        Set TUP's max direction index to curIndex (shown as 'end' in the Tables 11 and 12)
        Return curIndex + 1
    Endif
Endfunction
The RowsRoot block is considered to have a single "tuple" called RowsRootTuple, and similarly for columns.
Computing the row and column indices for all of the tuples uses two calls to the processTuple( ) function:
Call processTuple( RowsRoot, RowsRootTuple, 1, "Rows" )
Call processTuple( ColumnsRoot, ColumnsRootTuple, 1, "Columns")

Table 11 illustrates the assigned indexes of each tuple in the rows tuples tree, in accordance with the rows and columns assignment process 390 (e.g., in accordance with the process in Table 10 described above). For example, columns "Row Min' and "Row Max" represent the index assigned to each tuple that is traversed using depth-first search in the rows tuples tree. For brevity reasons, Table 11 includes data for "Europe & Central Asia" and "America", and omits data for other regions.

TABLE 11

| Tuple ID | Step | Row Min | Row Max |
|---|---|---|---|
| RowsRoot | start | 1 | |
| R1 | start | 1 | |
| B3 | leaf | 1 | 1 |
| C19 | leaf | 1 | 1 |
| C20 | leaf | 1 | 1 |
| C21 | leaf | 1 | 1 |
| C22 | leaf | 1 | 1 |
| C23 | leaf | 1 | 1 |
| C24 | leaf | 1 | 1 |
| C25 | leaf | 1 | 1 |
| C26 | leaf | 1 | 1 |
| C27 | leaf | 1 | 1 |
| C28 | leaf | 1 | 1 |
| C29 | leaf | 1 | 1 |
| G19 | leaf | 2 | 2 |
| G20 | leaf | 2 | 2 |
| G21 | leaf | 2 | 2 |
| G22 | leaf | 2 | 2 |
| G23 | leaf | 2 | 2 |
| G24 | leaf | 2 | 2 |
| G25 | leaf | 2 | 2 |
| G26 | leaf | 2 | 2 |
| G27 | leaf | 2 | 2 |
| G28 | leaf | 2 | 2 |
| G29 | leaf | 2 | 2 |
| R1 | end | | 2 |
| R2 | start | 3 | |
| B1 | leaf | 3 | 3 |
| C1 | leaf | 3 | 3 |
| C2 | leaf | 3 | 3 |
| C3 | leaf | 3 | 3 |
| C4 | leaf | 3 | 3 |
| C5 | leaf | 3 | 3 |
| C6 | leaf | 3 | 3 |
| C7 | leaf | 3 | 3 |
| C8 | leaf | 3 | 3 |
| G1 | leaf | 3 | 3 |
| G2 | leaf | 4 | 4 |
| G3 | leaf | 4 | 4 |
| G4 | leaf | 4 | 4 |
| G5 | leaf | 4 | 4 |
| G6 | leaf | 4 | 4 |
| G7 | leaf | 4 | 4 |
| G8 | leaf | 4 | 4 |
| R2 | end | | 4 |
| RowsRoot | end | | 4 |

Table 12 illustrates the assigned indexes of each tuple in the columns tuples tree, in accordance with the rows and columns assignment process 390. For example, columns "Row Min' and "Row Max" represent the index assigned to each tuple that is traversed using depth-first search in the columns tuples tree. For brevity reasons, Table 12 includes data for "Europe & Central Asia" and "America", and omits data for other regions.

TABLE 12

| Tuple ID | step | Columns Min | Columns Max |
|---|---|---|---|
| ColumnsRoot | start | 1 | |
| R1 | leaf | 1 | 1 |
| R2 | leaf | 1 | 1 |
| B3 | leaf | 2 | 2 |
| B2 | leaf | 2 | 2 |
| C1 | start | 3 | |
| G7 | leaf | 3 | 3 |
| C1 | end | | 3 |
| C2 | start | 4 | |
| G3 | leaf | 4 | 4 |
| C2 | end | | 4 |
| C3 | start | 5 | |
| G5 | leaf | 5 | 5 |
| C3 | end | | 5 |
| C4 | start | 6 | |
| G8 | leaf | 6 | 6 |
| C4 | end | | 6 |
| C5 | start | 7 | |
| G19 | leaf | 7 | 7 |
| C5 | end | | 7 |
| C6 | start | 8 | |
| G2 | leaf | 8 | 8 |
| C6 | end | | 8 |
| C7 | start | 9 | |
| G4 | leaf | 9 | 9 |
| C7 | end | | 9 |
| C8 | start | 10 | |
| G6 | leaf | 10 | 10 |
| C8 | end | | 10 |
| C19 | start | 3 | |
| G20 | leaf | 3 | 3 |
| C19 | end | | 3 |
| C20 | start | 4 | |
| G21 | leaf | 4 | 4 |
| C20 | end | | 4 |
| C21 | start | 5 | |
| G19 | leaf | 5 | 5 |
| C21 | end | | 5 |
| C22 | start | 6 | |
| G28 | leaf | 6 | 6 |
| C22 | end | | 6 |
| C23 | start | 7 | |
| G25 | leaf | 7 | 7 |
| C23 | end | | 7 |
| C24 | start | 8 | |
| G22 | leaf | 8 | 8 |
| C24 | end | | 8 |
| C25 | start | 9 | |
| G24 | leaf | 9 | 9 |
| C25 | end | | 9 |
| C26 | start | 10 | |
| G26 | leaf | 10 | 10 |
| C26 | end | | 10 |
| C27 | start | 11 | |
| G23 | leaf | 11 | 11 |
| C27 | end | | 11 |
| C28 | start | 12 | |
| G27 | leaf | 12 | 12 |
| C28 | end | | 12 |
| C29 | start | 13 | |
| G29 | leaf | 13 | 13 |
| C29 | end | | 13 |
| ColumnsRoot | end | | 13 |

User Interfaces and Associated Processes

Attention is now directed towards embodiments of user interfaces ("UP") and associated processes that may be implemented on an electronic device, such as electronic device 200.

FIGS. 4A-4J illustrate example user interfaces for building and displaying a data visualization using an interactive user graphical user interface based on Blocks formalism, in accordance with some embodiments. FIGS. 5A-5G illustrates example user interfaces for building and displaying two data visualizations on the same interactive user graphical user interface based on the Blocks formalism, in accordance with some embodiments.

Figure 4A:
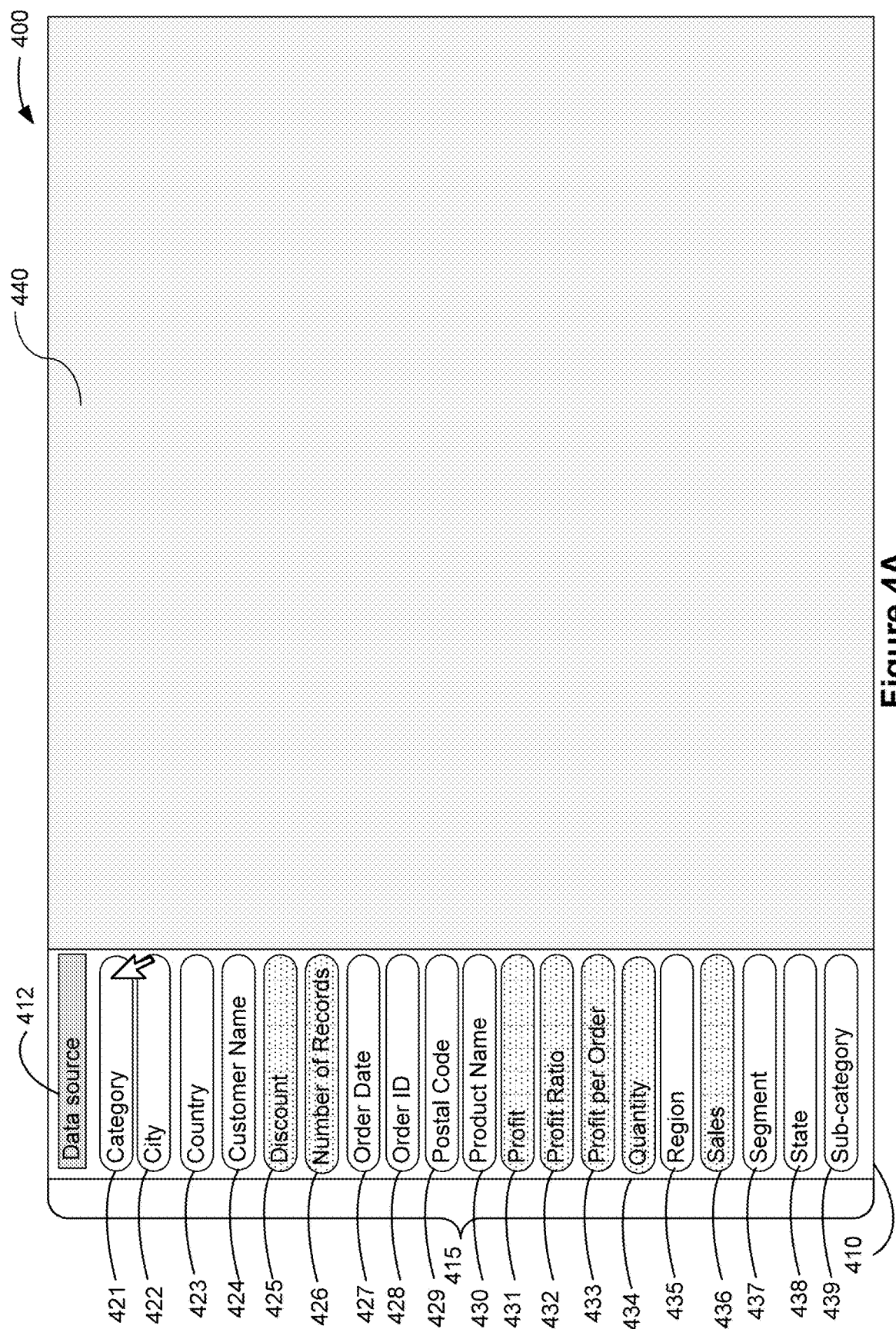
FIGS. 4A-4J illustrate example user interfaces for building and displaying a data visualization using an interactive graphical user interface, in accordance with some embodiments.

FIG. 4A illustrates an interactive graphical user interface 400 for interactive data analysis and chart creation through direct manipulation. Similar to Tableau, the graphical user interface 400 includes a data pane region 410 (or schema region) in which a number of data fields representations of a selected data source are included. For example, the data pane region 410 includes a selected data source 412 and a collection 415 of data field representations (e.g., name data fields represented in the form of selectable user interface elements such as pills). Each of data field representations 421-429 is a user interface element or user interface affordance that can be selected and used to build a data visualization. In some embodiments, data field representation 421-429 are also referred to pills or data field icons. In some embodiments, interactive graphical user interface 400 provides a visual, drag-and-drop technique for encoding data fields, e.g., consistent with a direct manipulation model that is used in Tableau. In some embodiments, instead of graphical user interface 100, which is based on fixed shelves, such as column shelf 120 and row shelf 122 in FIG. 1A, interactive graphical user interface 400 has an analytical canvas region 440 that supports the creation of an arbitrary number of connected block objects.

In some embodiments, the data field representations or pills included in collection 415 are based on or derived from a data model from a connected data source 412. In some embodiments, similar to Tableau, collection 415 of data field representations includes a number of data fields that are dimensions, e.g., data fields 421-434, 427, 428, 429, 430, 435, 437-439, and a number of data fields that are measures, e.g., data fields 425-426, 431-434, and 436). The interactive user interface 400 further includes an analytical canvas region 440. One or more data field representations 421-439 are selected from data pane region 410 and placed on to the analytical canvas region 440 to query data source 412 and to build data visualizations. In some embodiments, dimensions 421-434, 427, 428, 429, 430, 435, 437-439 can be used to define the level of detail (or groups to be aggregated at), and measures 425-426, 431-434, and 236 can be calculated by aggregating at the level of detail (also referred to as LOD) defined by respective dimensions. In some embodiments, dimensions 421-434, 427, 428, 429, 430, 435, 437-439 are visually distinguished from measures 425-426, 431-434, e.g., using a different color to indicate which data field representation is a measure and which data field representation is a dimension.

Figure 4B:
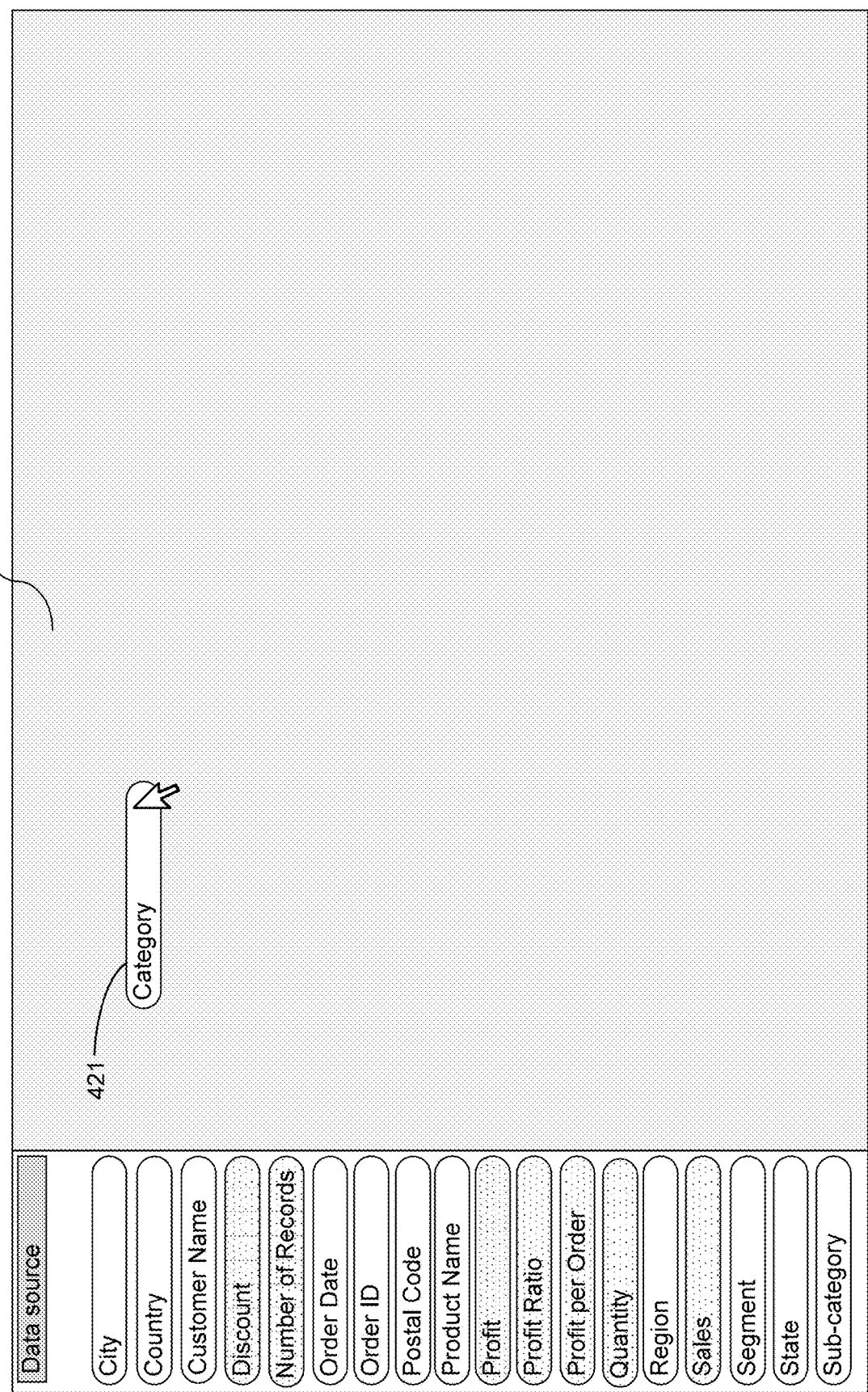

In some embodiments, dragging out a pill data 410 to unoccupied location on the analytical canvas region 440 creates a block object represented by a block card on the graphical user interface 400. In some embodiments, the computer system assigns default values for encoding, mark type and layout type of the block object based on metadata of the corresponding data field that the pill represents. For example, pill 421, which represents dimension named Category, is selected in FIG. 4A and dragged across the analytical canvas region 440, as illustrated in FIG. 4B. FIG. 4B illustrates pill 421 being dragged over analytical canvas region 440, and before pill 421 is placed or dropped onto the analytical canvas region 440.

Figure 4C:
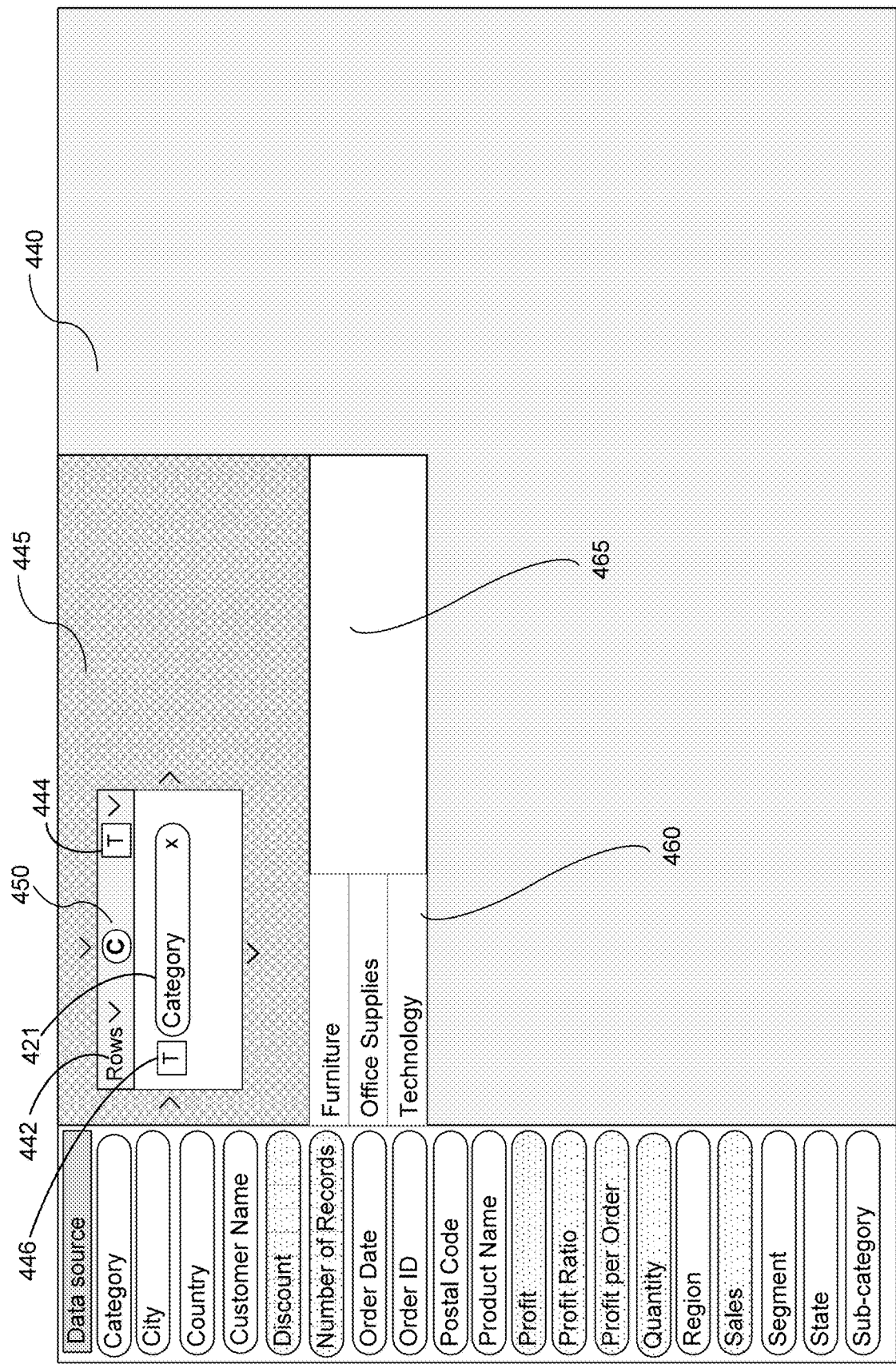

In some embodiments, FIG. 4C illustrates that upon dropping pill 421, the computer system automatically (without further user input) generates block card 450, which in turn is translated into a block object specification that is used to generate and execute query, where a visual component 460 is generated based on the results of the query. In some embodiments, the system by default will generate a block object specification with the layout type of Rows, mark type of Text, and encoded the data field Category on Text. In some embodiments, layout type 442 and mark type 444 of the corresponding block object are displayed at the top band of block card 450. In some embodiments, layout type 442 is a user interface affordance that can be used to designate a layout type, including a row-based arrangement, a column-based arrangement, or an inline arrangement. In some embodiments, mark type 444 is user interface affordance that can be used to designate mark type that specifies a shape for visual data marks displayed in the final visualization. Respective encodings of the block object are illustrated within or inside the block card 450. For example, encoding of the data field Category on Text is illustrated with user interface element 446 (also referred to as user interface affordance) that shows that the encoding is on Text, and pill 421 illustrates the particular data field that is being encoded. Accordingly, a visual component 460 is generated that include a row for each value in the domain Category, where each value is illustrated by a textual description or string, such as values "Furniture," "Office Supplies," and "Technology" are all the discrete values that belong to the domain Category. In some embodiments, visual component 460 is substantially instantaneously generated as soon as the user places the pull 421 on the analytical canvas. Block card 450 is included in blocks user interface 445 and visual component is included in region 465 that includes the final data visualization.

In some embodiments, when an additional pill is dragged to a blank (or unoccupied) space on the analytical canvas region 440, a new, unrelated block object is created, e.g., a new block object that has no relationship to block C is created. In some embodiments, when an additional pill is dragged over block card 450, an additional encoding can be added to block object C. In some embodiments, when an additional pill dropped adjacent to block card 450 (e.g., when the pill is dropped within blocks interface 445) a new block object is created that is related to block object C. In some embodiments, the process of creating related block objects and the process of adding further encodings to already existing block objects is facilitated or assisted by displaying possible drop targets in the blocks user interface. Accordingly, the blocks system and interface enable a data driven experience by allowing users to start with an empty analytical canvas and interact primarily with pills that represent their data and block cards that represent queries and visual encodings instead of forcing a user to decide what visualization type to create before exploring the data. Thus, the blocks system allows for more interactive and iterative analytical flow.

Figure 4D:
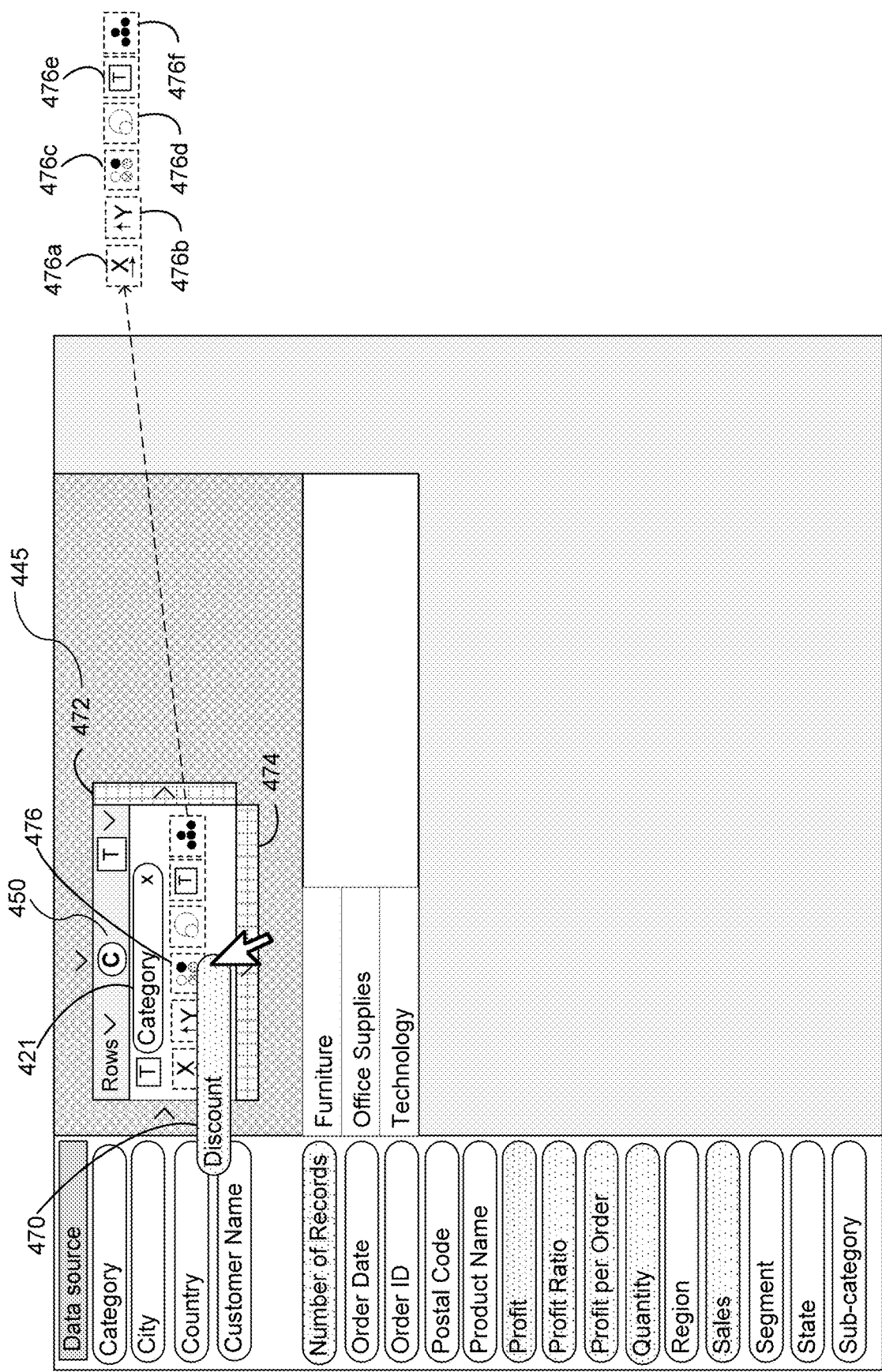

FIG. 4D illustrates that when a new pill 470 is dragged over block card 450, a number of drop targets are displayed, in accordance with some embodiments. For example, when the new pill 470 hovers within the block card 450, a number of icons 476a-476f representing visual encodings are displayed, e.g., icons 476a-476f are illustrated with dashed lines within block card 450 that are located below pill 470. For example, icon 476c represent the color encoding, icon 476d, icon 476d represents the shape encoding, icon 476e represents encoding on text, icon 476a represents encoding on x-axis, icon 476b represents encoding on y-axis, and icon 476f represents or level of detail. Further, drop targets 472 and 472 are also displayed to provide visual feedback that another block object can be created by dropping the pill 470 adjacent to the block card 450. In some embodiments, drop targets 472 is displayed to the right side and drop target 472 are below block card 450 and represent drop targets for creating child block objects.

Figure 4E:
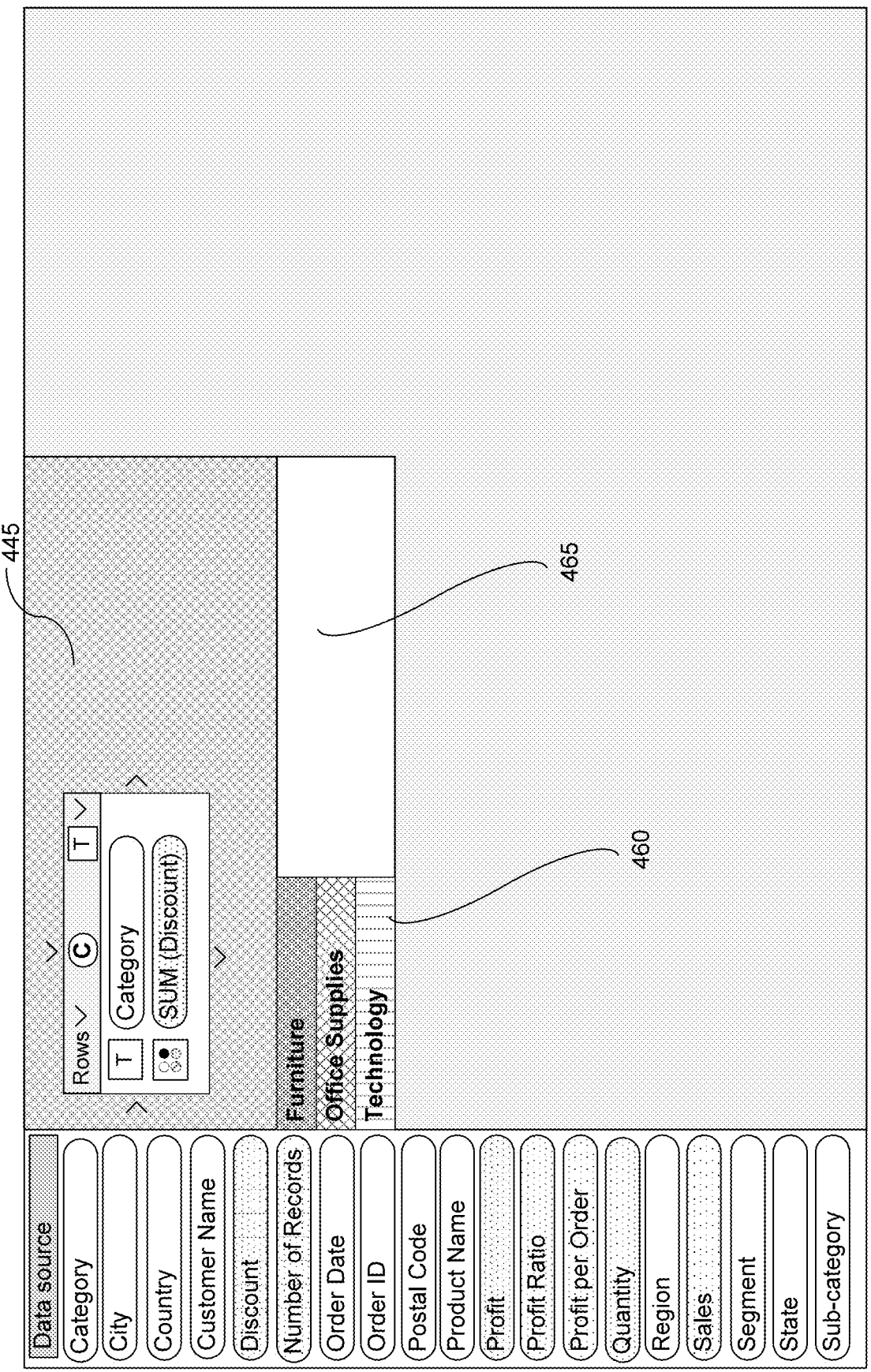

FIG. 4D shows that a measure Discount represented by pill 470 is hovering over color encoding 476c (such as color encoding 186a in FIG. 1B). FIG. 4E illustrates updated blocks interface 445 and updated data visualization region 465 in response to dropping pill 470 over color encoding 476c. For example, when pill 470 representing the measure Discount is dropped over the color encoding 476c, visual component 460 is updated by displaying a different color for aggregated Discount measure at the level of Category. In other words, the measure Discount is aggregated per category and the result aggregation value is visually represented with a different color for each category, as illustrated in visual component 460.

In some embodiments, when the pill that is being dragged represents a dimension field, the system provides options to create a new block object with either the Rows layout type or the Column layout type. The dimension field is encoded on Text by default. In other embodiments, when the pill that is being dragged represents a measure field, the system provides the option to encode the measure on X-axis, Y-axis or Text on a block object that is defaulted to the Inline layout type. Once the new, related block object is created, the layout type, mark type, and encoding can all be customized.

Figure 4F:
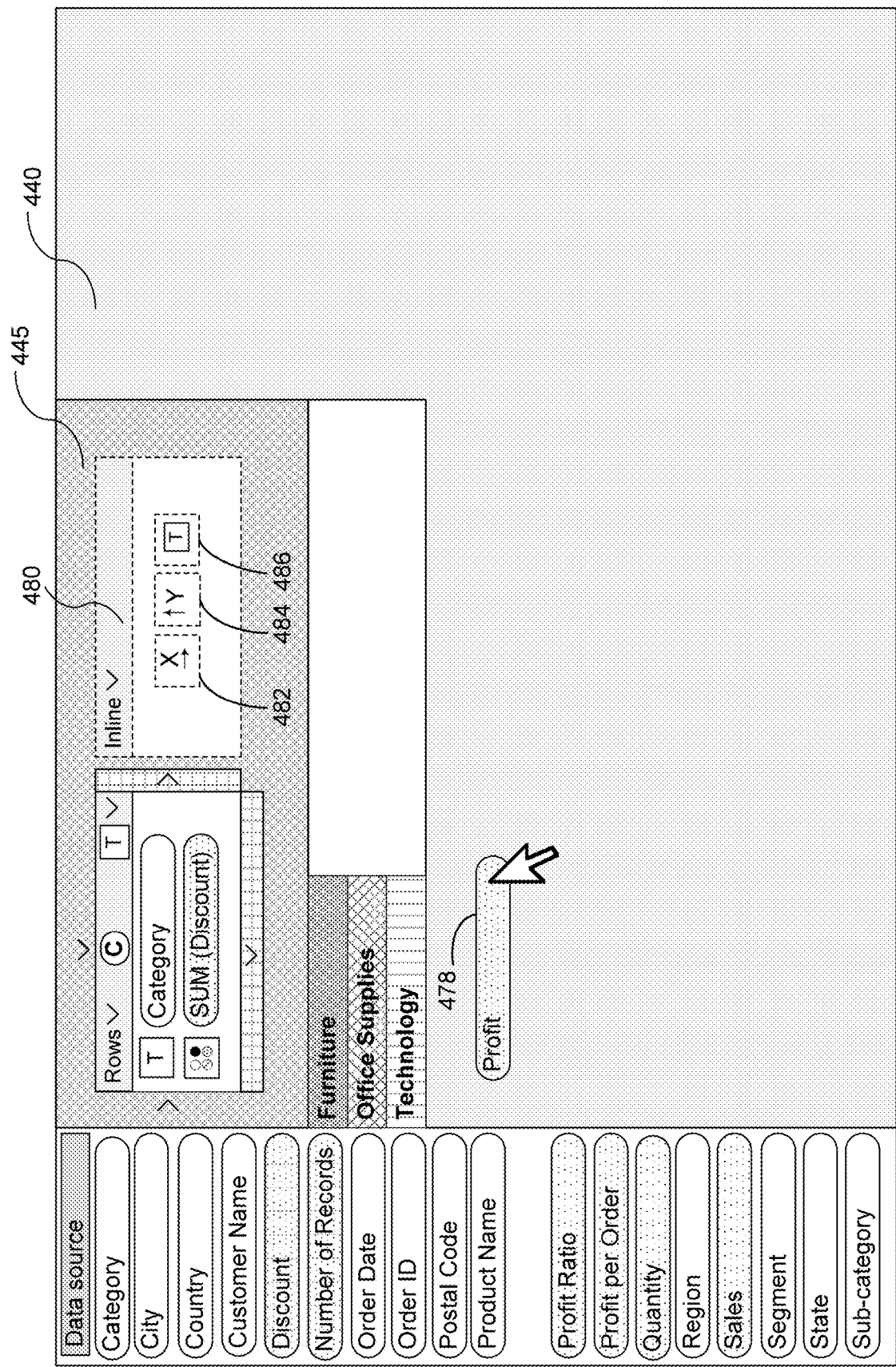

FIG. 4F shows drop target 480 for creating a child block object that is displayed when a measure field Profit represented by pill 478 is being dragged over analytical canvas region 440, in accordance with some embodiments. Since pill 478 represents the measure Profit, the system provides an option to encode the measure Profit on X-axis, Y-axis or Text on a block object that is defaulted to the Inline layout type. Drop target 480 represents an optional block card (represented with a dashed line) with selected default encodings, such as encoding 482 on X-axis, encoding 484 on Y-axis, and encoding 486 on Text. Dropping pill 476 over drop target 480 generates a new child block of block "C".

Figure 4G:
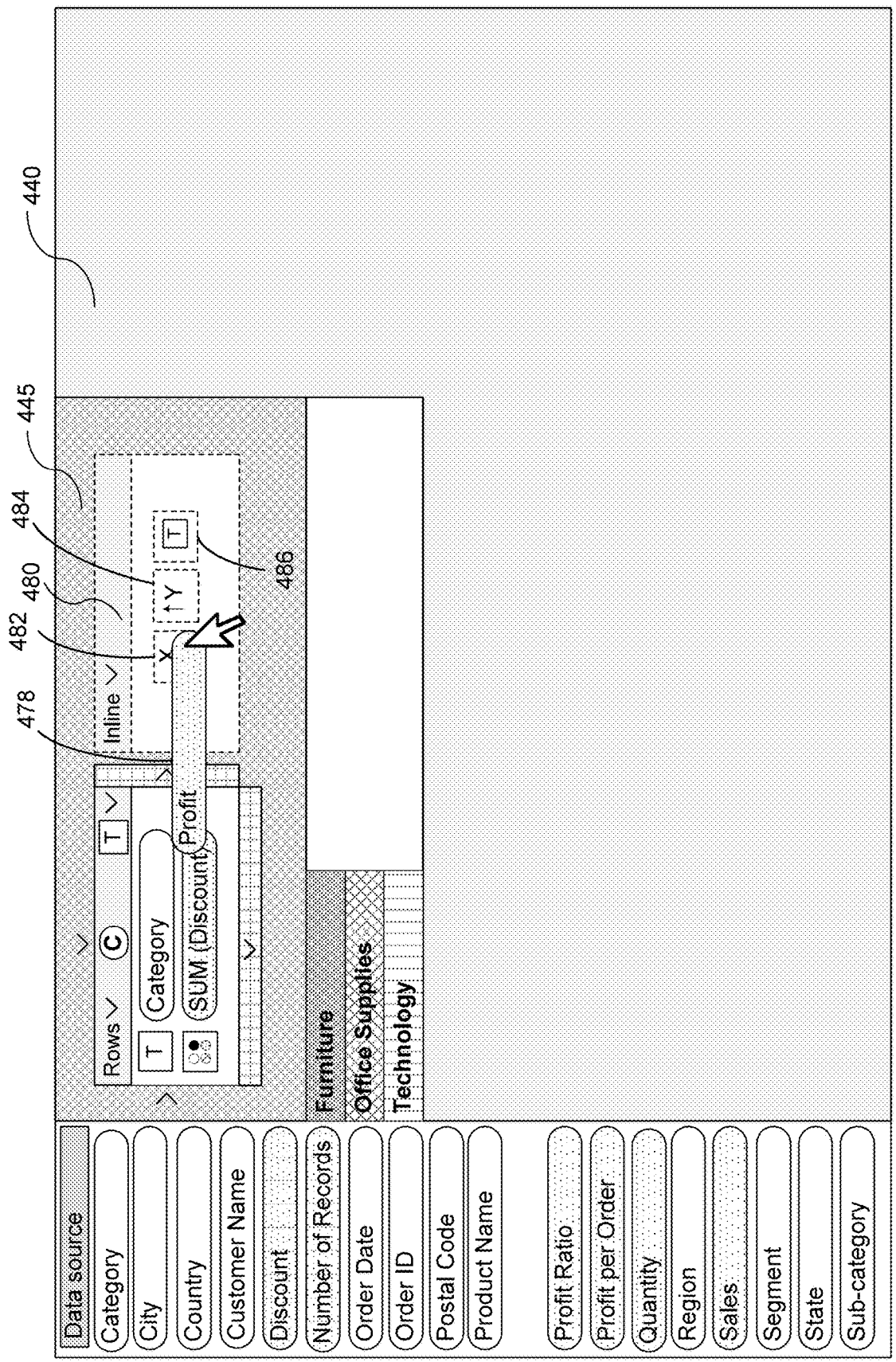

As the user continuous to drag pill 478 over analytical canvas region 440, FIG. 4G shows pill 478 is hovering over encoding 482 on X-axis, which is within drop target 480, in accordance with some embodiments.

Figure 4H:
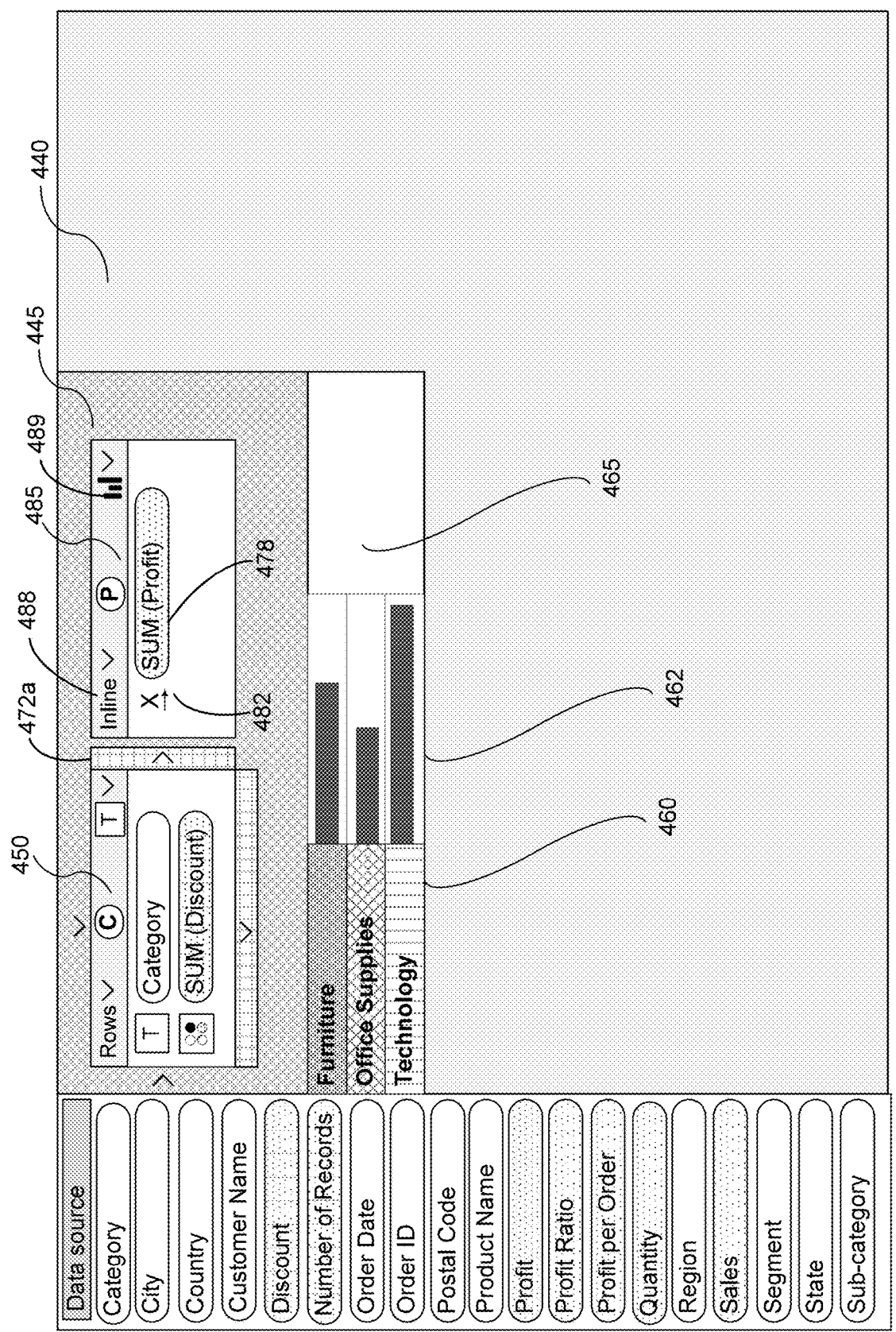

FIG. 4H illustrates updated blocks interface 445 and updated data visualization region 465 in response to dropping pill 478 over drop target 480 displayed in FIG. 4G, in accordance with some embodiments. Upon dropping pill 478 over the X-axis encoding 482, a new block object "P" is created, where the new block object "P" is a child of block object "C." Visual indicator 472a illustrates the parent-child relationship between the two block cards 450 and 485. In some embodiments, child block object "P" is represented by block card 485. By default, the computer system assigns Inline layout type 488 to block object "P", as pill 478 represents a data field Profit, which is a measure. Further, the computer system assigns by default mark type "Bar" 489, e.g., assigns value 185e to mark type 166 of corresponding block specification for block object "P" as illustrated in FIG. 1B. Thus, the computer system creates a new visual component 462 displayed in data visual region 465. Since block object "P" is an Inline block object that inherits the dimensionality of block object "P', the system creates one bar per each row in visual component 460, which is defined by block object "C." Since no additional dimensions are added to block object "P". the measure Profit is aggregated at the level of detail defined by dimension Category, and a single bar is rendered in visual component 462 per each Category value. In other words, profit is calculated for each different Category and a single bar is displayed that represents the aggregated Profit for each Category. It should be noted that each bar is represented with the same color as there is no color encoding added to block object "P".

Figure 4I:
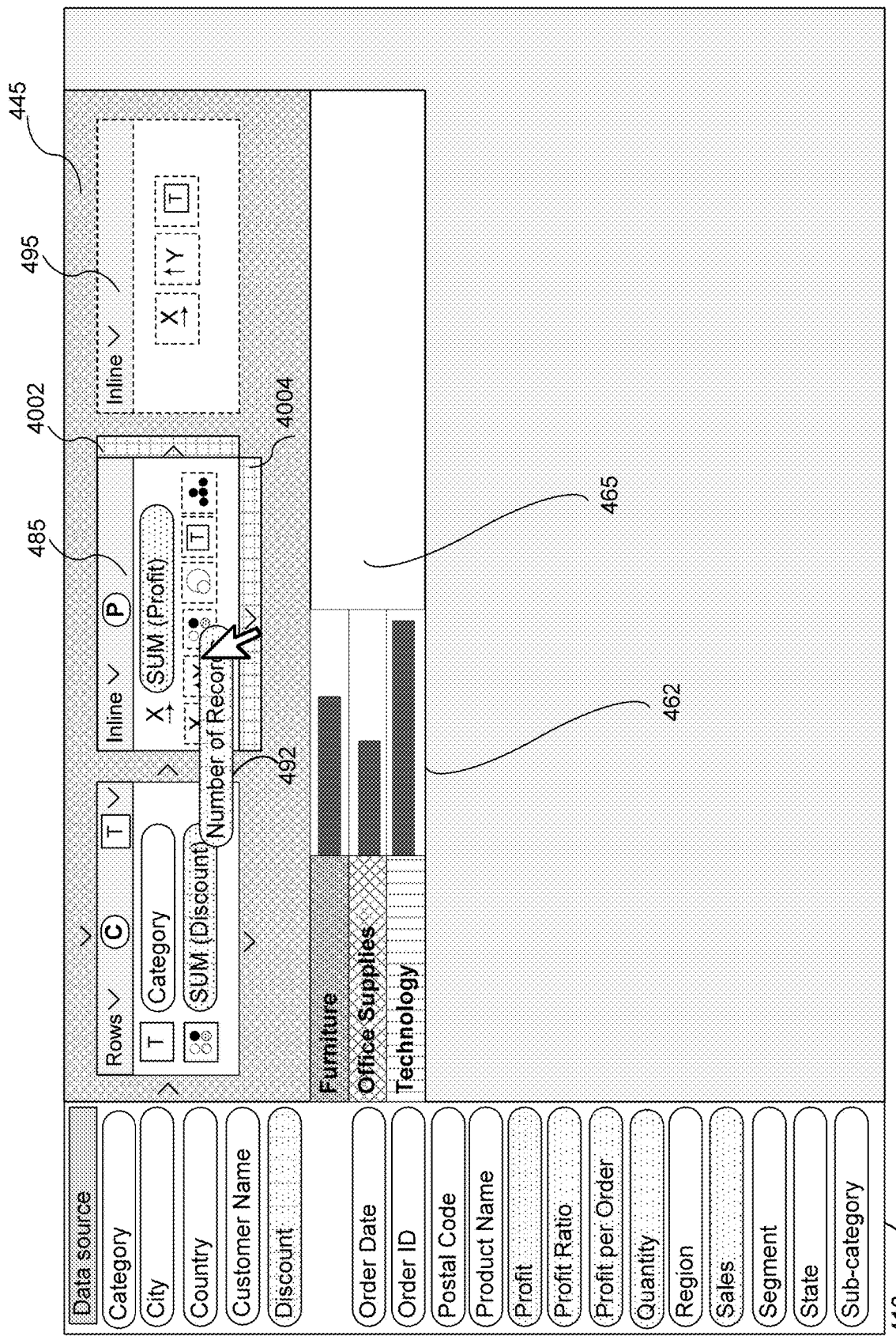

FIG. 4I shows a user dragging selected pill 492, which represents a measure data field "Number of Records", in accordance with some embodiments. In some embodiments, in response to a user selection of a data field representation from a data pane 410 (or schema region) appropriate drop targets are displayed in blocks user interface 445. For example, in response to selecting pill 492, a number of drop targets are displayed within block card 485. Each drop target within block card 485 represents a respective visual encoding that conforms to encoding type specification 186, illustrated in FIG. 1B. Further, user interface elements 4002 and 4004 are displayed to indicate that a new block object can be added by placing the selected pill 492 in the area to the right or below block card 485. Further, since pill 492 represents a measure data filed, the computer system further displays drop target 495, which would create a block object of the Inline layout type if selected. For example, in response to placing pill 492 onto drop target 495, a block object of the Inline layout type is created. Further, since pill 478 represents the measure "Number of Records", the system by default provides an option to encode the measure "Number of Records" on X-axis, Y-axis or Text on a block object that would be assigned Inline layout type by default.

Figure 4J:
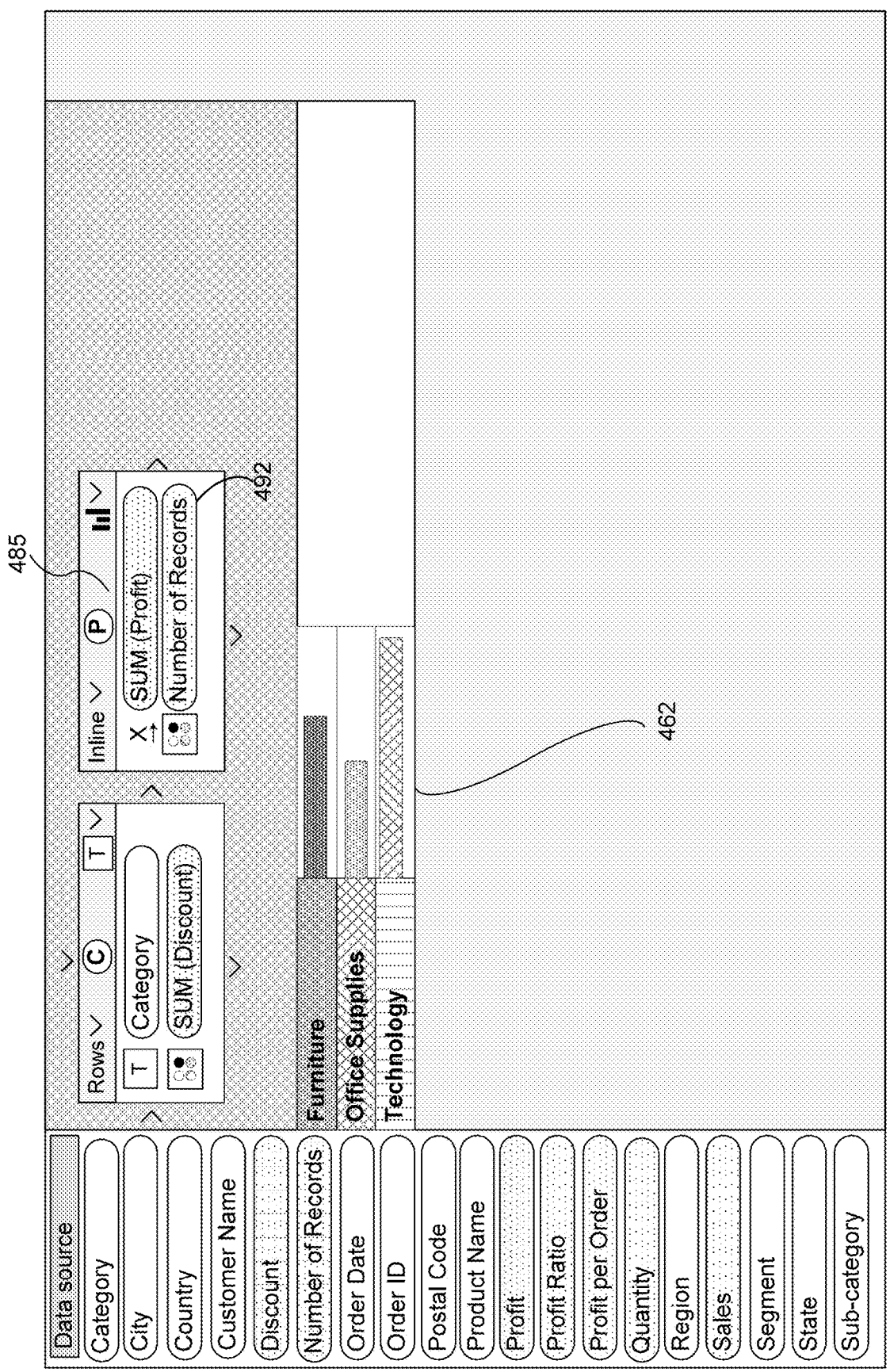

FIG. 4I shows pill 492 hovering over color encoding (such as color encoding 186a in FIG. 1B) within block card 485, in accordance with some embodiments. In response to dropping or placing pill 492 over the color encoding within block card 485, visual component 462 is updated in accordance with the selected color encoding, as illustrated in FIG. 4J. For example, visual component 462 is updated by displaying a different color for aggregated measure "Number of Records" at the level of detail of Category. In other words, since block object "P" does not define further dimensions, the measure "Number of Records" is aggregated per Category, as defined by the parent block "C", and the resulting aggregation value is visually represented with a different color for each category.

FIGS. 5A-5G illustrate building a second data visualization on analytical canvas 440, in accordance with some embodiments.

Figure 5A:
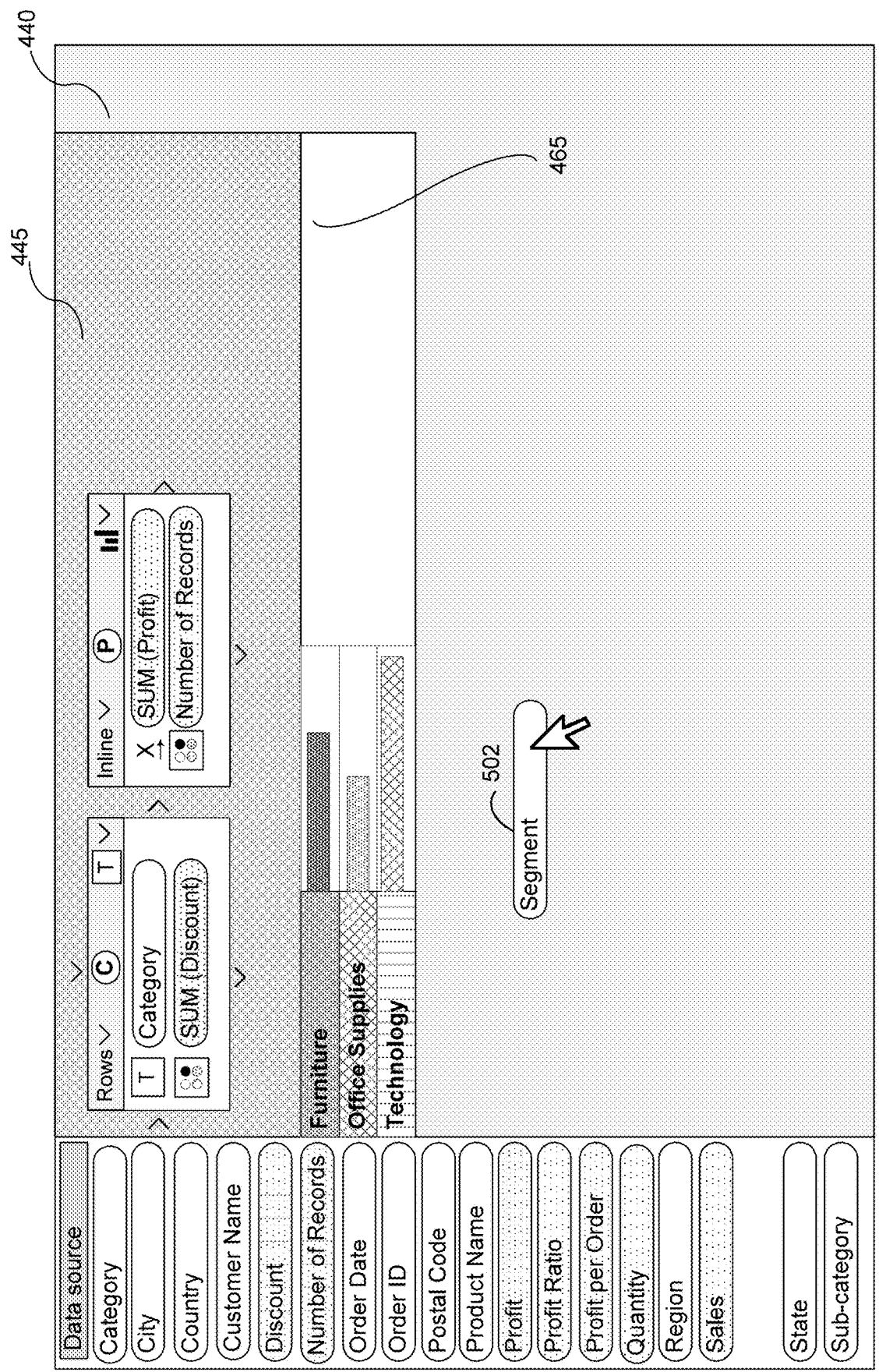

FIG. 5A shows a user dragging pill 502 over analytical canvas 440 and outside blocks interface 445, where pill 502 represents a dimension data field "Segment", in accordance with some embodiments. In some embodiments, since pill 502 is dragged to a blank (or unoccupied) space on the analytical canvas region 440, a new, unrelated block object is created, e.g., a new block object that has no relationship to block objects "C" and no relationship to block object "P".

Figure 5B:
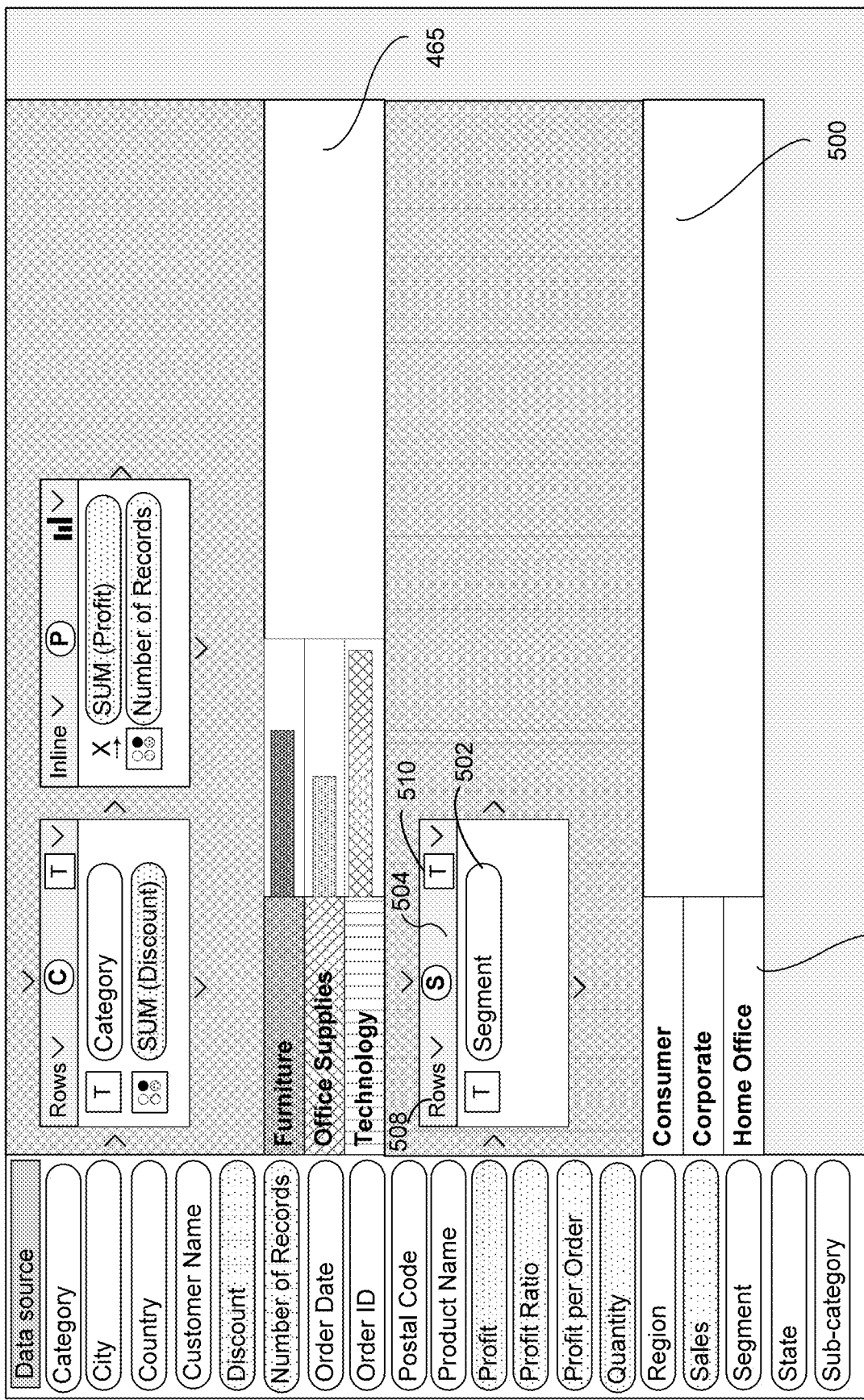

FIG. 5B shows that a new data visualization is built and displayed in data visualization region 500 in response to placing pill 502 on analytical canvas 440 and outside blocks interface 445, in accordance with some embodiments. In response to placing pill 502 on unoccupied area of analytical canvas 440, a new block object "S" is created and a corresponding block card 504 is displayed. Further, in response to placing pill 502 on unoccupied area of analytical canvas 440 and a corresponding visual component 506 is built and displayed in data visualization region 500. In some embodiments, data visualization regions 456 and 500 display two data visualizations that are not related. In other words, block object "S" does not form any parent-child relationship with block objects "C' and "P', and thus does not inherit any dimensionality or encodings from block objects "C' and "P'. Accordingly, a user is able to build two data visualization on the same analytical canvas using the same drag-and-drop technique and without the need to interrupt the analytical flow, such as without the need to create a new separate sheet or tab that would require the user to alternate between the two sheets or tabs.

The computer system assigns default values for encoding, mark type and layout type of block object "S" based on metadata of the corresponding data field that pill 502 represents. For example, since pill 502 represents dimension "Segment", the computer system automatically assigns Rows layout type (e.g., Rows layout type 175a shown in FIG. 1B) to block object "S", as illustrated by user interface element 508. Further, the computer system assigns Text as mark type Text 185a as illustrated in FIG. 1B) since data field "Segment" is a dimension that has discrete (as opposed to continuous) values, as illustrated by icon 510. In some embodiments, values that are already assigned for mark type and layout type can be modified by interacting with a block card displayed in the interactive user interface.

Figure 5C:
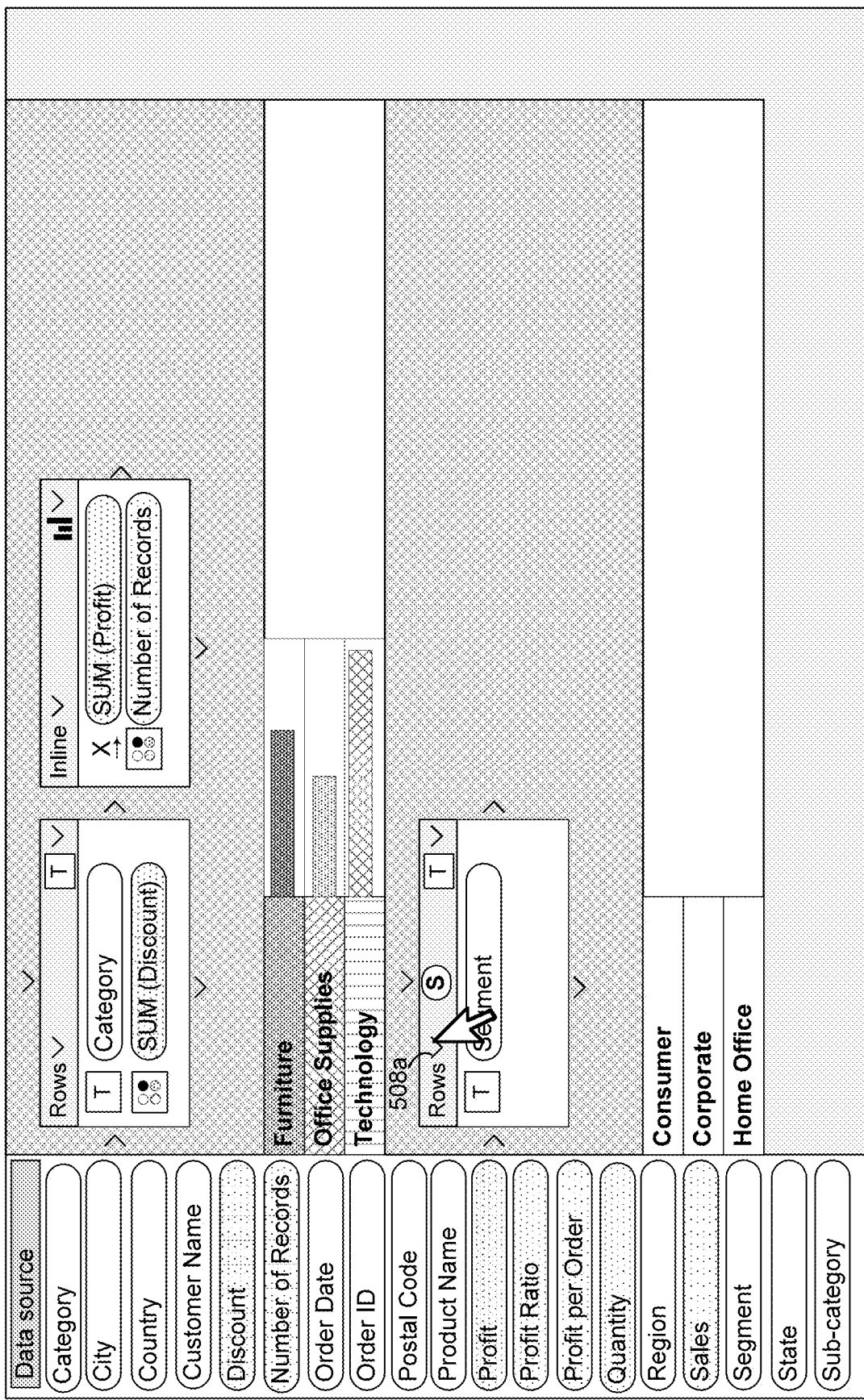
Figure 5D:
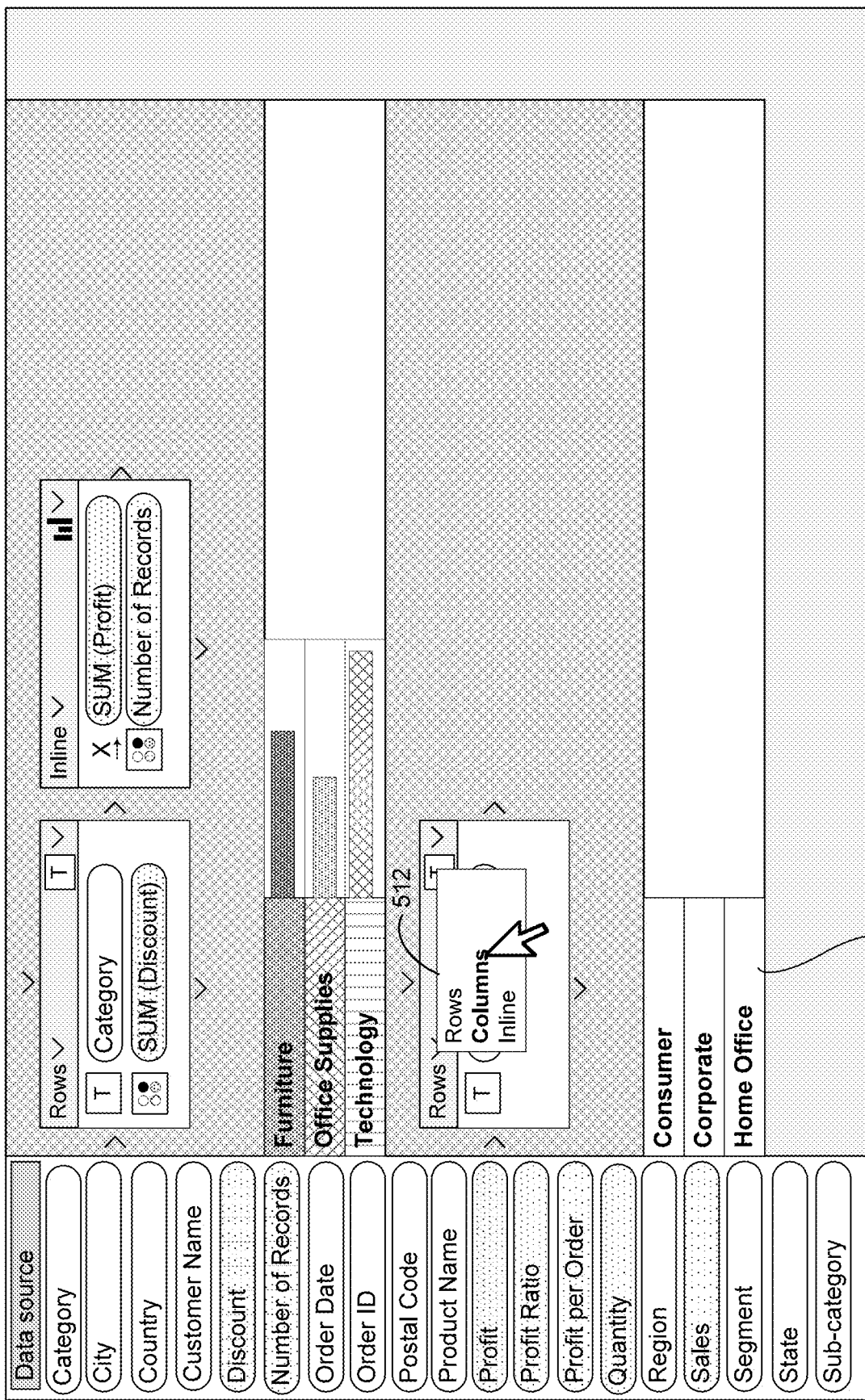
Figure 5E:
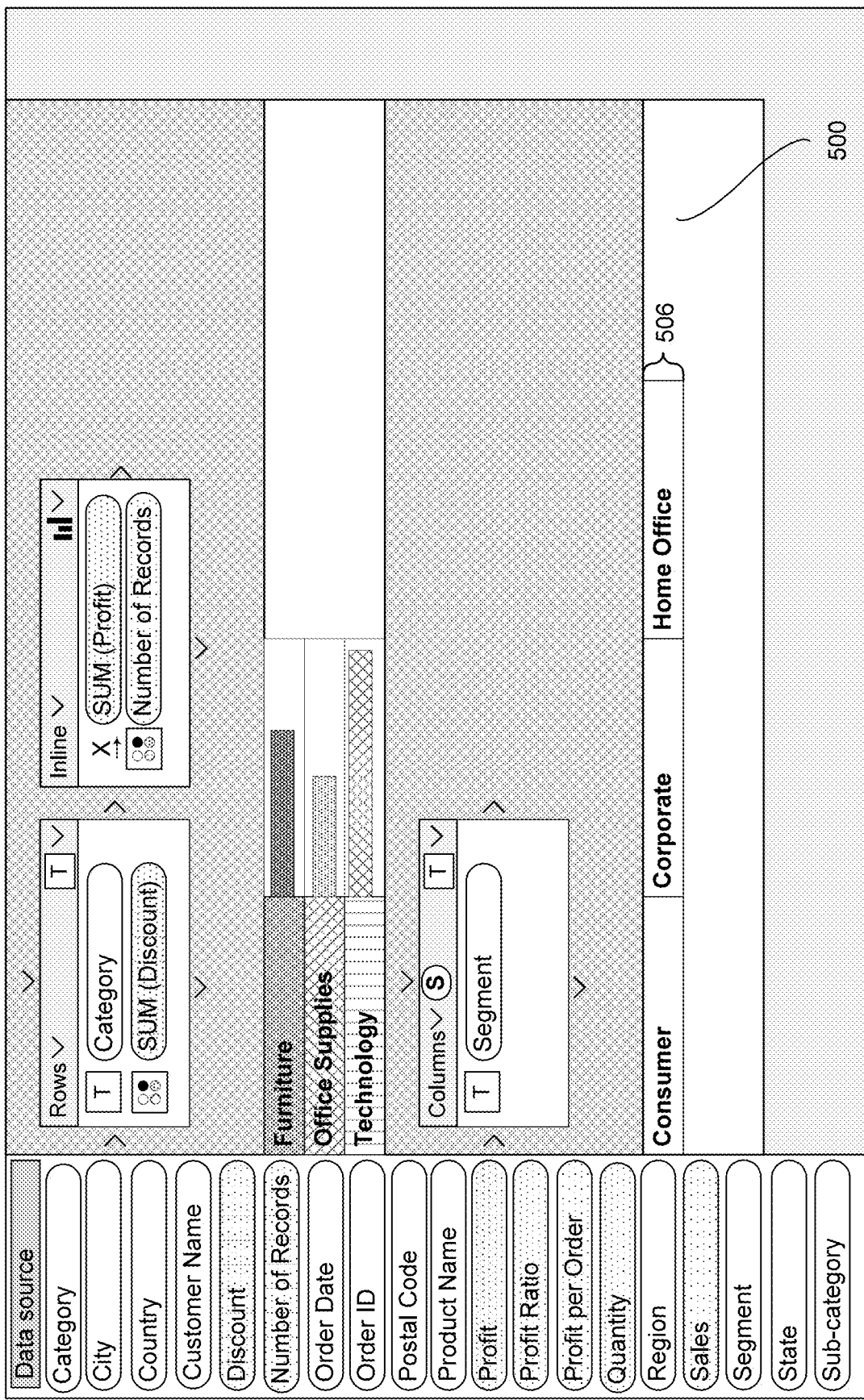

FIG. 5C illustrates a cursor selecting user interface element 508a for changing the default layout type of block object "S", in accordance with some embodiments. When user interface element 508a is selected, a drop-down menu is displaying listing the possible options for layout types that a user can select, including Rows, Columns, and Inline layout type, as illustrated in FIG. 4D, in accordance with some embodiments. FIG. 5D illustrates that Columns layout type is selected as the new layout type for block object "S". In response to changing the layout type from Rows layout type to Columns layout type, visual component 506 is updated accordingly to reflect the Columns layout type, as illustrated in FIG. 5E. For example, updated visual component 506 displays one column per each value in the domain Segment.

Figure 5F:
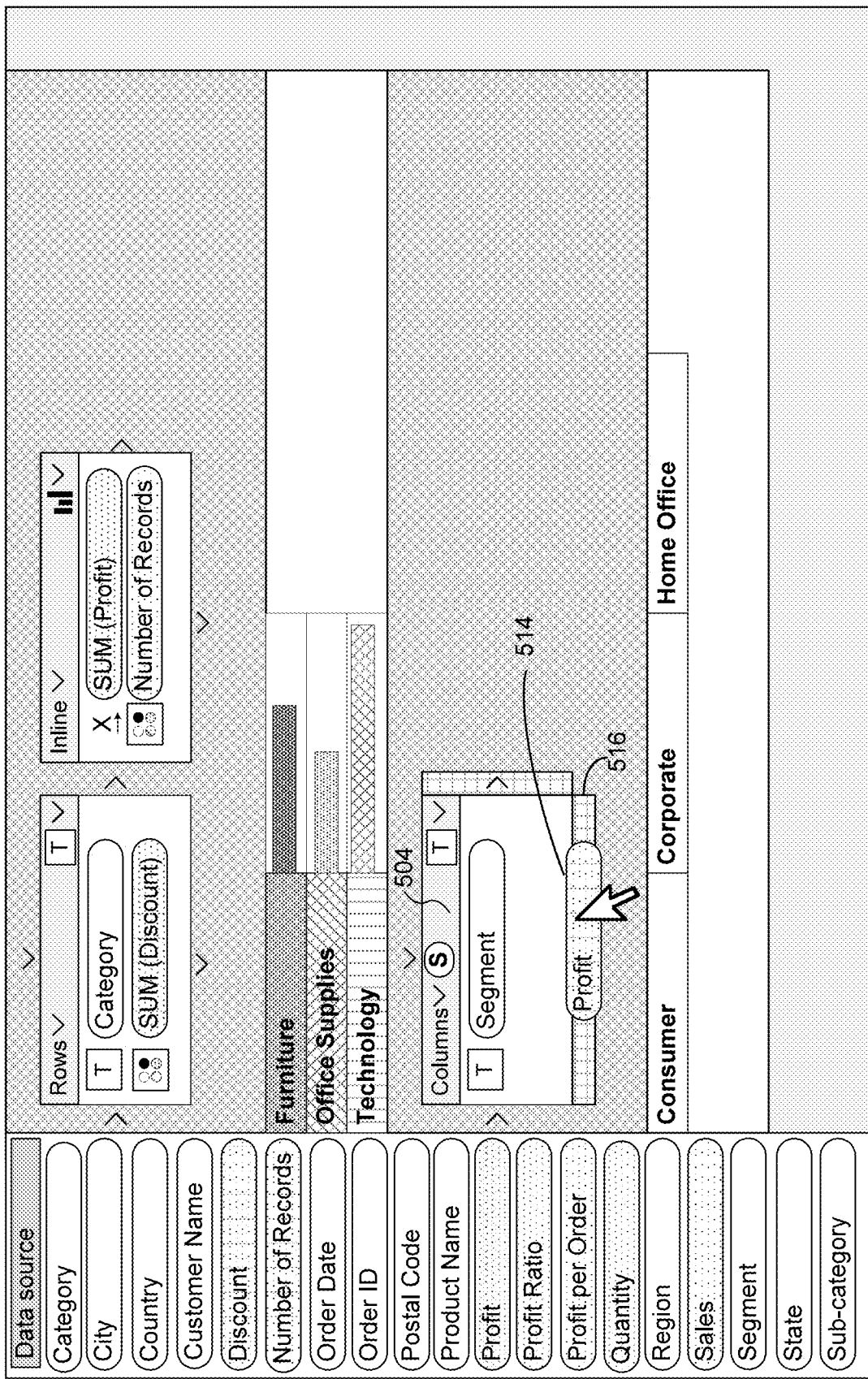
Figure 5G:
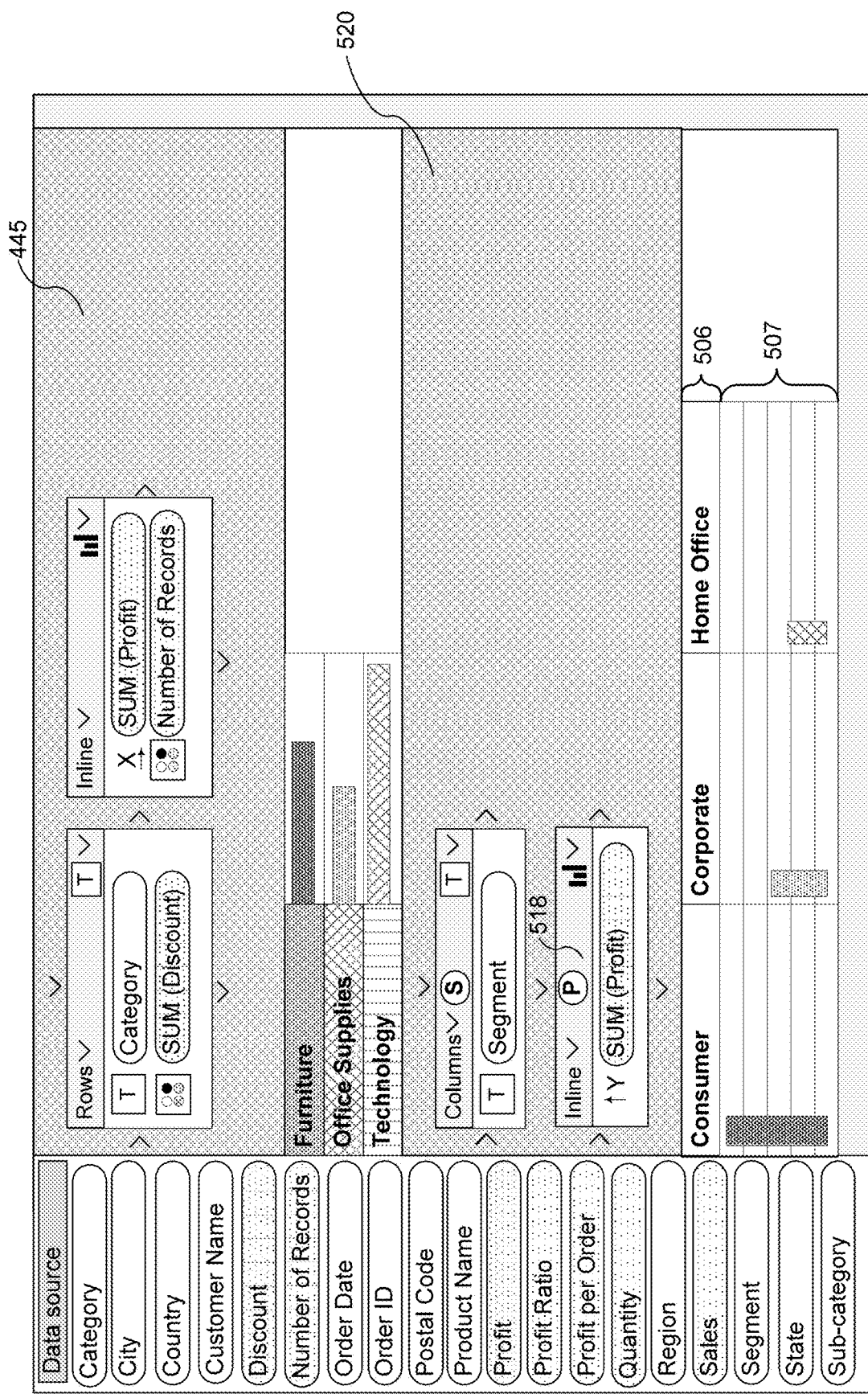

FIG. 5F shows that a pill 514, representing measure "Profit" is selected and being placed over drop target 516, in accordance with some embodiments. Upon placing pill 514 over drop target 516, a child block "P" is automatically created and a corresponding block card 518 representing block object "P" is displayed in blocks user interface 520. Since pill 514 represents a measure and the layout type is Column based, block object "P" is defaulted to a bar chart as mark type with value of the profit for the particular segment defaulted to Y-axis. In response to building block object "P", visual component 507 is added that displays profit by segment as a bar chart mark type.

In some embodiments, blocks user interface 520 is different from blocks user interface 445, each used to build a separate data visualization. In some embodiments, block cards are automatically resized to accommodate data field representations placed within them. Similarly, data visualizations are automatically resized to accommodate additional block cards or additional data visualization that are added to the analytical canvas, in accordance with some embodiments.

Figure 5H:
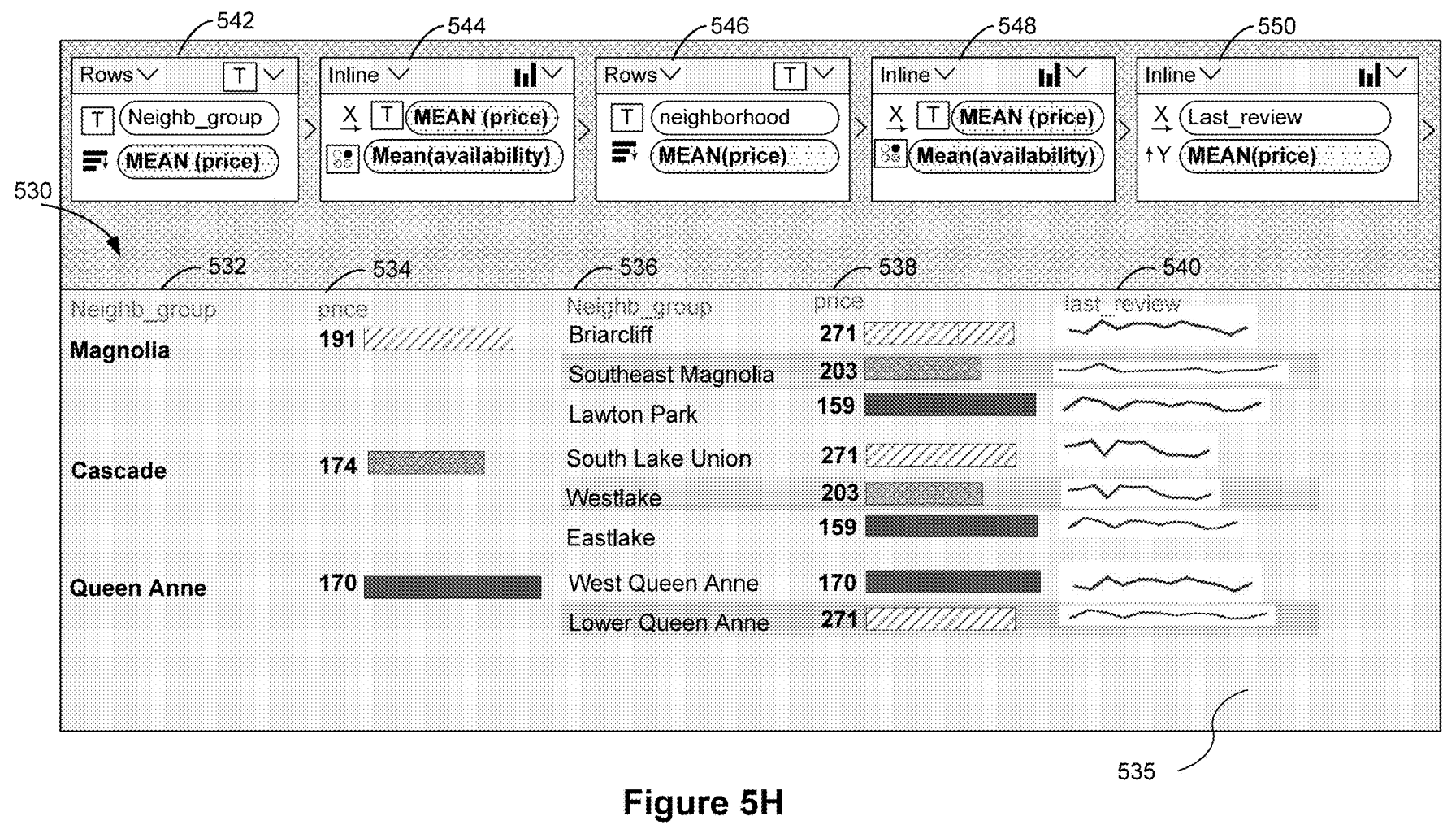

FIG. 5H illustrates a rich table 530 showing data about Airbnb listings in Seattle that is creating using Blocks system and Blocks user interface, in accordance with some embodiments. FIG. 5H shows a variety of mark types and measures at several levels of detail combined into a single visualization, displayed in data visualization region 535. Each column of columns 532-540 (or visual components) of the rich table 530 is defined by a block object with its own set of encoding and field mappings. For example, block cards 542-550, each correspond to block object specification based on which visual components 532-540 are built, respectively. The columns 532-540 from left to right show rows for each neighborhood group, sorted by average listing price, a labeled bar chart showing average price, colored by availability, rows for each neighborhood within each neighborhood group, the same labeled bar chart, but showing average price per neighborhood, and a spark line showing average price over time, in accordance with some embodiments.

Figure 5I:
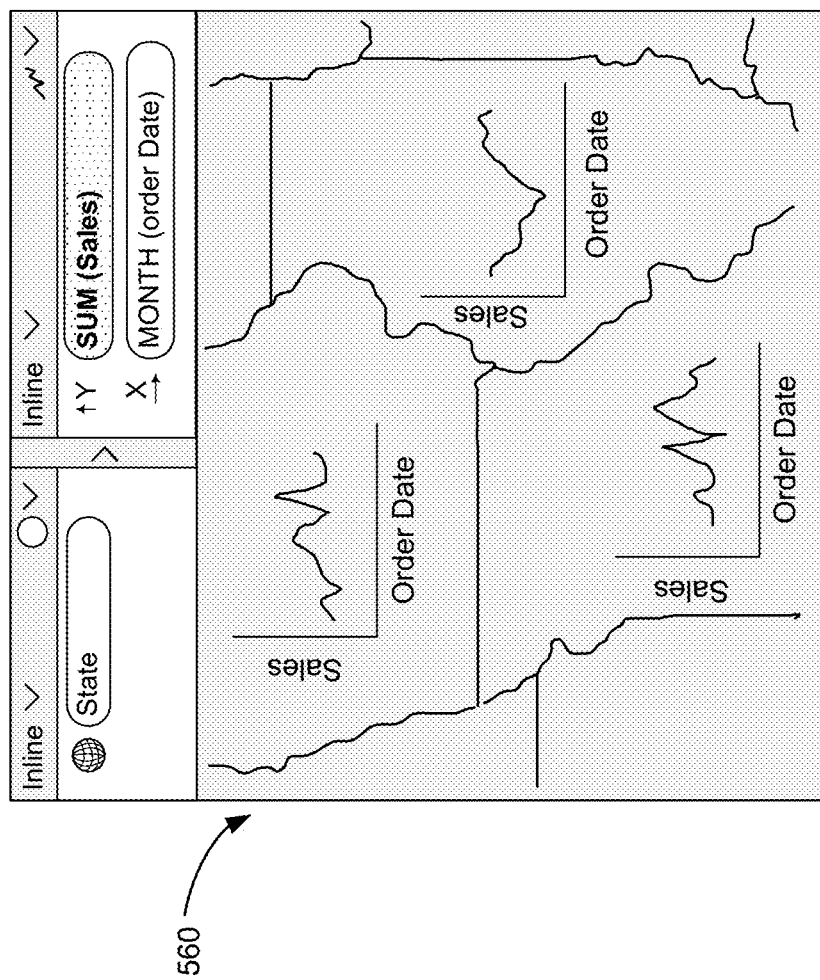

While the Blocks system and formalism can be used to create complex rich tables, such as rich table 530, the Blocks formalism can be extended to support other visualizations such as treemaps, bubble charts and non-rectangular charts with additional layout algorithms. Further, the Blocks formalism that is used to define rich tables at multiple LODs can be applied to support other visualization types such as Sankey diagrams and composite maps FIG. 5I shows a composite map visualization 530 and respective block cards used to build map visualization 530 in block user interface, in accordance with some embodiments. The composite map visualization 530 shows State polygons as parent Blocks and sparkline charts containing Sales by Order Date nested within them. The map visualization 530 is constructed using a block object of the Inline layout type for the map with a sparkline block object as a child block, in accordance with some embodiments.

Figure 5J:
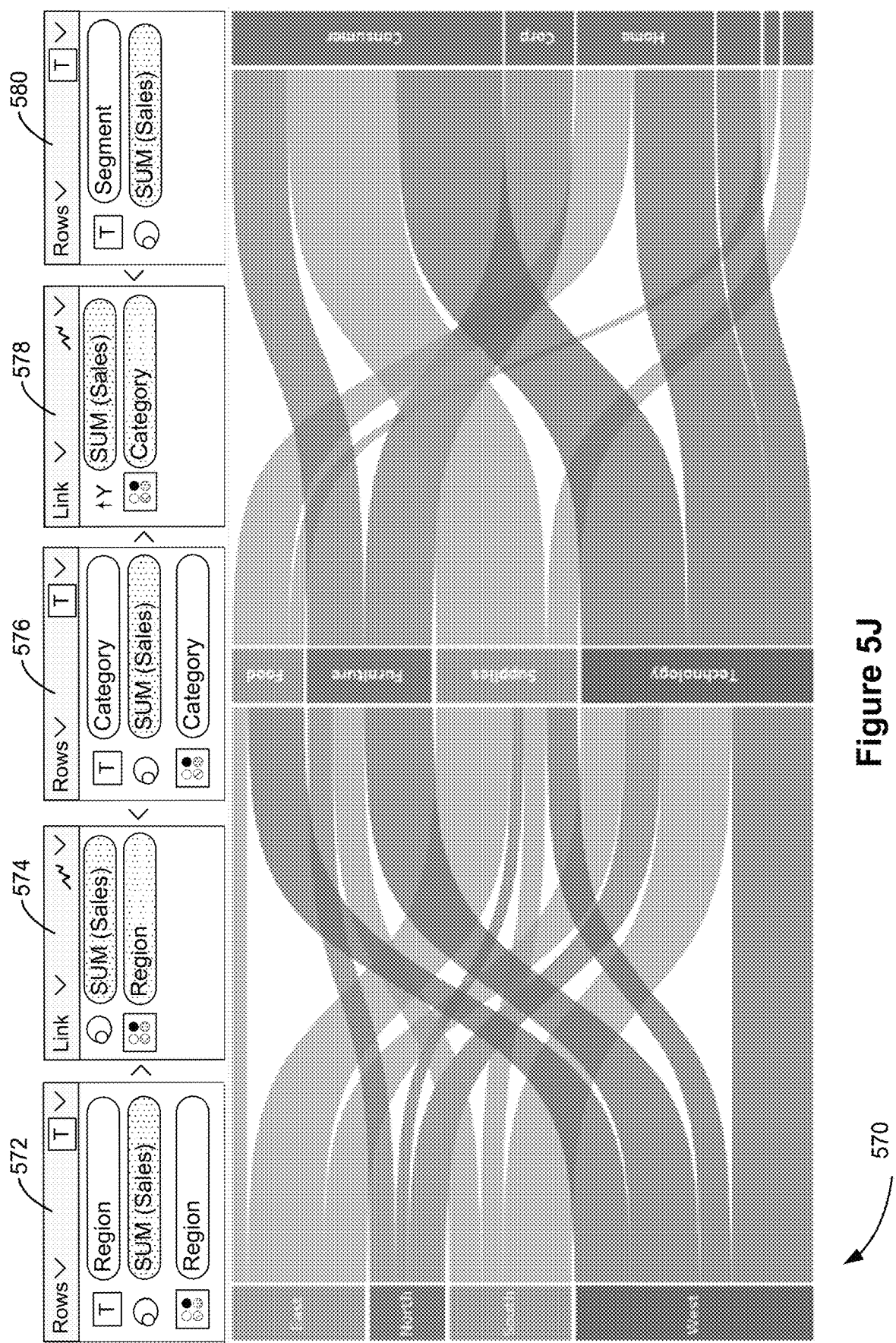

Sankey diagrams are a common type of chart created in Tableau, but the creation is a multi-step process involving partitioning the view, densifying the data, indexing the values across different visual dimensions, and several table calculations. With the Blocks system, an n-level Sankey diagram could be built with 2n−1 block objects as shown in FIG. 5J, in accordance with some embodiments. For example, in FIG. 5J, the block objects of the row type, represented by block cards 572, 576, and 580, are used to generate the nodes of the Sankey diagram 570 for "Region," "Category," and "Segment" attributes or data fields, while block objects of a link type, represented by block objects 574 and 578, represent connections between levels. The block objects of the Link layout type inherit their LOD from the neighboring block objects and render the curves between pairs of marks. The links are encoded by color and size based on the sum of sales, e.g., illustrated by aggregation function SUM on measure Sales SUM(Sales).

FIGS. 6A-6D are flow diagrams illustrating a method 600 for generating layout and components of a data visualization by interacting with data field representations, in accordance with some embodiments. Method 600 is performed at an electronic device (e.g., device 200, FIG. 2). In some embodiments, the electronic device is portable multifunction device with a display, and optionally, a touch-sensitive surface. In some embodiments, the display is a touch-screen display, and the touch-sensitive surface is on or integrated with the display. In some embodiments, the display is separate from the touch-sensitive surface. Some operations in method 600 are, optionally, combined and/or the order of some operations is, optionally, changed.

As described herein, method 600 enables the building of visualizations by specifying layout, data relationships, and level of detail ("LOD") for specific portions of the visualization as opposed to the data visualization as a whole. Users can create block objects by direct manipulation of or interaction with data field representations by using, e.g., drag and drop interaction. The method allows for controlling the LOD of the data attributes for tabular style visualizations. The method provides the ability to use visual encodings and a drag and drop interaction to evaluate measures at any LOD. The method allows for creation of expressive and rich charts through a drag and drop interaction. The method provides a visual analysis interface, where a user can build an analytical workflow iteratively without the need to learn any grammar or low-level embodiment details. Further, the method assists the user by providing recommendations and different visual indicators while the user is creating the chart, making the chart creation process more efficient and flexible at the same time.

At a computer system having one or more processors, a display, and memory storing one or more programs configured for execution by the one or more processors, display (602) a graphical user interface (e.g., graphical user interface 400 in FIG. 4A, and graphical user interface 206 in FIG. 2) on the display, including (a) a schema region (e.g., data pane or schema region 410 in FIG. 4A) displaying a plurality of data field icons, each data field icon representing a respective data field from a user-selected data source, and (b) a canvas region (e.g., a canvas region 440 in FIGS. 4A-4B). The computer system receives (604) a first user input to select a first data field icon from the schema region and to place the first data field icon onto the canvas region (e.g., FIG. 4B illustrates the user selected user interface element 421 that represents a data field Category, which is a dimension). In response to receiving the first user input, the computer system displays (608) a block card (e.g., a block card 450 in FIG. 4C) on the canvas region (e.g., a canvas region 440 in FIGS. 4A-4B), the block card including a plurality of user interface affordances to designate (i) a layout type that specifies a row-based arrangement, a column-based arrangement, or an inline arrangement (e.g., user interface element or affordance 442, which is currently assigned the row-based arrangement in FIG. 4C), (ii) a mark type that specifies a shape for visual data marks (e.g., user interface element or affordance 444 for designating and displaying mark type in FIG. 4C), and (iii) one or more visual encodings that specify one or more of color (e.g., icon 476c in FIG. 4D), size, shape (e.g., icon 476d in FIG. 4D), text (e.g., icon 476e in FIG. 4D), x-axis (e.g., icon 476a in FIG. 4D), y-axis (e.g., icon 476b in FIG. 4D), ascending sort, descending sort, or level of detail (e.g., icon 476f in FIG. 4D), according to data values for a first data field represented by the first data field icon. In response to receiving the first user input, the computer system further generates and displays (610) a data visualization for the data source according to the layout type, the mark type, and the visual encodings specified on the block card (e.g., the data visualization displayed in region 465 in FIGS. 4C-4J).

In some embodiments, generating and displaying the data visualization for the data source according to the layout type, the mark type, and the visual encodings specified on the block card comprises (612) defining a level of detail according to dimension data fields specifying the visual encodings on the block card; generating a query, for the block card, which specifies aggregation of each measure data field according to the dimension data fields in the level of detail; executing the query to retrieve a set of tuples from the data source, each tuple including each of the data fields whose data field icon specifies a visual encoding, wherein each of the measure data fields is aggregated according to the level of detail; and generating the data visualization in which each visual mark corresponds to a retrieved tuple.

In some embodiments, the block card is a first block card. The computer system receives (614) a second user input selecting a second data field icon from the schema region (e.g., FIG. 4D illustrates a cursor select icon 470 which represents the Discount measure). In response to receiving the second user input, the computer system displays drop targets on the first block card (e.g., icons 476a-476f representing visual encodings are displayed to the user as options to be selected, e.g., as a drop target, as shown in FIG. 4D), each drop target on the first block card specifying a respective visual encoding that may be selected for association with the second data field icon. In response to receiving the second user input, the computer system displays drop targets adjacent to the first block card (e.g., in response to user input selecting icon 478 that represents the Profit measure, drop target 480 is displayed for a block object of the inline based arrangement, as illustrated in FIG. 4F), each adjacent drop target specifying a distinct option to create a child block card or parent block card related to the block card. In response to user placement of the second data field icon onto (i) one of the drop targets for the first block card or (ii) one of the adjacent drop targets, the computer system generates and displays an updated data visualization (e.g., FIG. 4E illustrates updated vizualization displayed in region 465 in FIG. 4D after the ser encodes the measure Discount onto color, thereby making each row in the visual component 460 a distinct color), wherein layout type, mark type, and visual encodings are determined according to the user placement of the second data field icon (e.g., depending on whether the user places the data field icon onto a drop target within the block card for visually encoding currently displayed visual component of the data visualization, adjacent to the block card, such as below or to the right for child block and above and to the left for parent block, onto unoccupied area for independent data visualization). In some embodiments, the second data field icon is placed on one of the drop targets for the first block card, visual encodings of a visual component corresponding to the first block card are updated (e.g., a second visual component 462 is created in FIG. 4H after the user places the data field icon 478 representing the measure Profit, as illustrated in FIGS. 4G-4H). In some embodiments, when the second data field is placed on one of the adjacent drop targets, a second block card is created and default layout type, mark type and/or visual encodings are assigned in accordance with data values of a data field that corresponds to the second data field icon (e.g., since data field icon 478 representing the measure Profit, an inline layout type is automatically assigned). Providing drop targets, optionally within a specific block card or adjacent to a block card, assists the user in building the data visualization. In some embodiments, the drop targets have default preselected values for layout type and/or mark type based on whether the data field associated with the data field representation that is selected is a dimension or a measure. The drop targets assist the user in the iterative and interactive process of building the data visualization. In some embodiments, the drop targets are displayed as soon as the user drags a data field representation from a schema region (e.g., dynamically), thereby providing the user with an ability to encode data fields and aggregate measures at any level of detail via a drag and drop operation. The drop targets also provide mechanism for the user to build relationships between block objects by placing data field representations onto suggested targets. In some embodiments, a user can manually change default selection by the system.

In some embodiments, the second data field icon is (616) placed onto one of the drop targets on the first block card, thereby adding a visual encoding based on a second data field corresponding to the second data field icon. In some embodiments, when a measure data field is encoded on color, aggregation of values of the measure data field in accordance with corresponding dimensions specified on the first block card is assigned a different color that indicates respective aggregation value for a particular level of detail as determined by the dimensions fields specified on the first block card. For example, when dimension field Category is encoded on the first block card, and a Discount measure is encoded on color, each aggregation value determined for each Category data field values is assigned different color (e.g., FIG. 4E shows that a distinct color is displayed for each aggregated Discount value for each Category, where the measure Discount is encoded on color). The method provides drop targets (e.g., drop targets for visual encodings

476a-476f that allow to visually encode data fields associated with a block object for which a block card is displayed in blocks user interface. The drop targets assist the user by providing available encodings for a selected target data field representation. The method reduces the number of inputs necessary to encode data fields on a particular block card.

In some embodiments, the second data field icon is (618) placed onto one of the adjacent drop targets, thereby forming a second block card that is a parent or a child of the first block card and generating the updated data visualization comprises generating a data visualization according to the layout type, the mark type, and the visual encodings specified on the first block card and a layout type, a mark type, and visual encodings specified on the second block card. The method assists the user in building parent-child relationships between block objects. For example, all that is required for a user to build a child block is to place the selected data field representation at one of two drop targets that are used for building child block objects (drop targets for adjacent child block cards/objects such as 472 and 474 in FIG. 4D, and drop target for adjacent block object 480 in FIG. 4F).

In some embodiments, the drop targets displayed adjacent to the block card are (620) determined based on whether the second data field icon represents a dimension data field or a measure data field (e.g., block card 480 displays a block card with the inline based arrangement since the user selected data field icon represents the measure Profit). Adjusting the drop targets based on whether the selected data field is dimension or measure assists the user by providing preselected block specification suitable for the selected data field. The visual recommendation assists the user in the process of building the data visualization and reduces the number of inputs and/or reduces the user mistakes of selecting unsuitable block specifications.

In some embodiments, in accordance with a determination that the second data field icon represents a dimension data field, the computer system includes (622) a first drop target that specifies a row layout type and a second drop target that specifies a column layout type in the drop targets adjacent to the block card include. The method 600 automatically provides the user with a suitable layout type, such as one of the row or column layout types, upon determination that the selected data field is a dimension. Providing the user with a suitable layout type assists the user in building the block card specification. The preselected recommendation for layout type assists the user in the process of building the data visualization and reduces the number of inputs and/or reduces the user mistakes of selecting unsuitable block specifications.

In some embodiments, in accordance with a determination that the second data field icon represents a measure data field, the computer system displays (624) a drop target that specifies an inline layout type. The method 600 automatically provides the user with a suitable layout type, such as the row and column layout types, upon determination that the selected data field is a dimension. Providing the user with a suitable layout type assists the user in building the block card specification. The preselected recommendation for layout type assists the user in the process of building the data visualization and reduces the number of inputs and/or reduces the user mistakes of selecting unsuitable block specifications.

In some embodiments, where the second block card is a child of the first block card, generating the updated data visualization comprises (626) defining a first level of detail according to (i) dimension data fields specifying the visual encodings on the first block card. The method further comprises, defining a second level of detail according to (i) dimension data fields specifying the visual encodings on the first block card and (ii) dimension data fields specifying the visual encodings on the second block card. Further, the method comprises generating a first query, for the first block card, which specifies aggregation of each measure data field associated with the first block card according to the dimension data fields in the first level of detail. Further, the method comprises generating a second query, for the second block card, which specifies aggregation of each measure data field associated with the second block card according to the dimension data fields in the second level of detail. Further, the method comprises executing the first query to retrieve a first set of tuples from the data source. Further, the method comprises executing the second query to retrieve a second set of tuples from the data source, and generating the updated data visualization, including a respective first visual mark representing each of the first set of tuples and a respective second visual mark representing each of the second set of tuples. The full LOD of a block object is the union of its local LOD and the local LOD of all of its ancestors. Inheriting the level of detail from parent block objects provides the ability to build nested relationships in the data visualization. The method provides a user with a visually expressive way to handle nested relationships during chart generation by using drag and drop as an interaction modality.

In some embodiments, upon user placement of the second data field icon onto one of the adjacent drop targets, the computer system displays (628) a visual indicator representing a hierarchical relationship between the first block card and the second block card. Displaying a visual indicator that represents the hierarchical relationship, which as a parent-child relationship between two block cards (and associated block objects) provides visual feedback to the user regarding the layout of block cards and their relationship to one another (e.g., visual indicator 472a in FIG. 4H illustrates the parent-child relationship between the two block cards 450 and 485).

In some embodiments, visual positioning of the first block card and the second block card in relation to one another on the canvas region determines (630) relative placement of visual marks for the first and second block cards in the data visualization. In some embodiments, layout of block cards in the canvas region directly determines a layout of corresponding visual components in the data visualization (e.g., visual component 460 is displayed on the left of visual component 462 corresponding to block card 450 displayed on the left of block card 485, as illustrated in FIG. 4H). For example, when Block A is placed above Block B, a visual component of the data visualization that corresponds to block A will be displayed above a visual component that corresponds to block B. The method allows the user to build the layout and structure of the data visualization based on placement of block cards on the canvas region via a direct interaction with a drag and drop operation. This allows the user to build more expressive charts while maintain ease of use through the drag and drop interaction modality.

In some embodiments, in accordance with a determination that the adjacent drop target onto which the second data field icon was placed is located to the right of the first block card or below the first block card, the computer system automatically aggregates (632) measure data fields associated with the second block card according to (i) dimension data fields associated with the first block card and (ii) dimension data fields associated with the second block card. For example, a level of detail for the second block card is defined according to (i) dimension data fields specifying the visual encodings on the first block card and (ii) dimension data fields specifying the visual encodings on the second block card, and a query for the second block card is generated, where the query specifies aggregation of each measure data field associated with the second block card according to the dimension data fields in the level of detail for the second block card. In some embodiments, when a data field icon that is placed to the right or below of a block card that corresponds to a block object with inline arrangement layout type, a new block object is generated that is a child block object of the parent block objects of the block object with the inline arrangement layout type (e.g., the new block object is not a child of the block object with the inline layout type). Inheriting the dimensions from the parent block cards by a particular block, and aggregating at the level of detail of both the particular block object and its parent block object allows the user to aggregate at any level of detail in the data visualization. Using the claimed method, the user can build visualizations that query and aggregate data at various levels of granularity without the need to build complex calculation.

In some embodiments, in accordance with a determination that the adjacent drop target onto which the second data field was placed is located to the left of the first block card or above the first block card, the computer system automatically aggregates (634) measure data fields associated with the first block card according to (i) dimension data fields associated with the second block card and (ii) dimension data fields associated with the first block card. For example, a level of detail for the first block card is defined according to (i) dimension data fields specifying the visual encodings on the second block card and (ii) dimension data fields specifying the visual encodings on the first block card, and a query for the first block card is generated, where the query specifies aggregation of each measure data field associated with the first block card according to the dimension data fields in the level of detail for the first block card.

In some embodiments, the computer system generates (636) the updated data visualization comprises generating a first data visualization portion (e.g., visual component 460 in FIG. 4H) based on the first block card (e.g., block card 450 in FIG. 4H) and generating a second data visualization portion (e.g., visual component 462 in FIG. 4H) based on the second block card (e.g., block card 485 in FIG. 4H), the updated data visualization comprising a concatenation of the first data visualization portion and the second data visualization portion (e.g., the data visualization displayed in region 465 in FIG. 4H is a concatenation of visual components 460 and 462). In some embodiments, each block card is associated with a different visual component that may be updated independently from other visual components in the data visualization in accordance with user interactions with the block card that corresponds to the visual component (e.g., visual component 460 can be updated by modifying the block card 450 without updating visual component 462, and visual component 462 can be updated without updating visual component 460 by modifying the block card 485, respectively, as shown in FIGS. 4A-4J). The method allows updating different portions in the data visualization separately, where users can set different LOD and encoding properties to each block card through a drag and drop operation. Ability to provide different levels of details and encoding properties at the level of data visualization component as opposed to the whole data visualization provides the user with more expressiveness while maintaining ease of use through a drag and drop operation.

In some embodiments, the first user input (638) is a drag-and-drop gesture.

In some embodiments, the first user input includes (640) a first portion and a second portion, the first portion selects the first data field icon, and the second portion places the first data field icon onto the canvas region.

In some embodiments, the block card is (642) automatically assigned a default layout type, a default mark type, and one or more default visual encodings. In some embodiments, the layout type, the mark type, and the one or more visual encodings can be modified by the user; in some embodiments, values that are assigned by default for layout type, the mark type, and visual encodings is based on data values of a corresponding data field that is being encoded, e.g., an inline layout type is assigned by default for data fields that are measures; row or column layout type are assigned by default for data fields that are dimensions. Automatically assigning a layout type to a block card assists the user in building the data visualization by providing the user with defaults while at the same time allow the user to modify the defaults.

In some embodiments, the plurality of user interface affordances include (644) a first user selectable user interface element indicating the layout type of the block card (e.g., user selectable element 442 indicting that currently selected layout is row based arrangement, as illustrated in FIG. 4C); a second user selectable user interface element indicating the mark type of the block card (e.g., user selectable element 444 indicating that currently selected mark is text, as illustrated in FIG. 4C); and a plurality of additional user interface elements, each indicating a respective visual encoding (e.g., icons 476a-476f). In some embodiments, the layout type and the mark type are displayed at the top of block. In some embodiments, the layout is expressed textually, and the mark type is represented by a pre-determined symbol. In some embodiments, the one or more visual encodings are represented as a list of symbols or icons that represent drop targets inside the block card. Providing user selectable elements that indicate layout type provide the user with an ability to change the layout type, and also provide visual of current layout type to the user. Further, providing user selectable elements that indicate mark type provide the user with an ability to change the mark type, and also provide visual indication of the current mark type to the user. Further, providing user interface elements that indicate visual encodings provide visual feedback of the user of the currently selected encodings.

In some embodiments, where the block card is a first block card, the computer system receives (646) a third user input selecting a third data field icon from the schema region (e.g., input selecting data field icon 502 that represents the dimension Segment in FIG. 5A). In response to receiving the third user input, the computer system displays drop targets on the first block card, each drop target on the first block card specifying a respective visual encoding that may be selected for association with the third data field icon. In response to receiving the third user input, the computer system displays drop targets adjacent to the first block card, each adjacent drop target specifying a distinct option to create a child block card or parent block card related to the block card. In response to user placement of the third data field icon onto an unoccupied area on the canvas region, outside of any of the displayed drop targets (in canvas region 440 outside block user interface 445 and outside data visualization display region 465, as illustrated in FIG. 5A), the computer system generates a third block card (e.g., block card 504 in FIG. 5B), which is independent of other block cards, according to data values for a third data field represented by the third data field icon. In some embodiments, when the third data field is a measure, the block card is assigned an inline arrangement for the layout type, and when the third data field is a dimension, the block card is assigned row-based or column-based arrangement. In response to user placement of the third data field icon onto an unoccupied area on the canvas region, outside of any of the displayed drop targets, the computer system further generates and displaying a second data visualization according to a layout type, a mark type, and visual encodings specified on the third block card, wherein the second data visualization is separate from the first data visualization, and is displayed concurrently with the first data visualization. The method allows the user to build two or more separate and independent data visualizations on the same canvas region, using the same data sources and data fields, without the need for workarounds such as composing multiple visualizations on a dashboard, so they appear as one, e.g., without the need to align multiple sheets together on a single dashboard to fit desired formatting and layout. Generating two or mode independent data visualization in the same analytical canvas region reduces the number of user inputs necessary to build composite data visualization and makes the interaction with the blocks user interface more efficient.

FIGS. 7A-7C are flow diagrams illustrating a method 700 for computing a respective two-dimensional grid position in a data visualization for each retrieved tuple in accordance with a process for assigning a row and column index, in accordance with some embodiments. Method 700 is performed at an electronic device (e.g., device 200, FIG. 2). In some embodiments, the electronic device is portable multi-function device with a display, and optionally, a touch-sensitive surface. In some embodiments, the display is a touch-screen display, and the touch-sensitive surface is on or integrated with the display. In some embodiments, the display is separate from the touch-sensitive surface. Some operations in method 700 are, optionally, combined and/or the order of some operations is, optionally, changed.

As described herein, method 700 assigns tuples retrieved from multiple queries generated based on multiple block object specifications to a computed grid position in a data visualization, in accordance with some embodiments. The method allows a user to build in a user interface a block object specification via a simple drag and drop technique. The method translates the UI block cards to block object specifications that are used to build queries, where each block card generates a single query. The method 700 further computes the position of each result (e.g., tuple) for each query in the final data visualization. The method 700 improves the process of creating charts via a drag and drop interaction. The method 700 provides a user with more flexibility for building different layouts and with more formatting options through the direct manipulation of block objects in the interface. The method 700 provides a visual analysis interface, where a user can build an analytical workflow iteratively without the need to learn any grammar or low-level embodiment details. The method 700 is illustrated in FIGS. 7A-7C, in accordance with some embodiments.

In some embodiments, at a computer system having one or more processors, a display, and memory storing one or more programs configured for execution by the one or more processors, a graphical user interface is (702) displayed on the display. The graphical user interface includes (a) a schema region displaying a plurality of data field icons, each data field icon representing a respective data field from a user-selected data source, and (b) a canvas region including a plurality of block cards, each block card specifying a respective layout type that is one of (i) a row-based arrangement, (ii) a column-based arrangement, or (iii) an inline arrangement, wherein each block card is generated in response to user placement of one or more respective data field icons onto the canvas region. In some embodiments, when the user places a data field on the canvas region, a block specification is created by the computer system. In some embodiments, based on the data field that is placed on the canvas region, the data system assigns a default layout type, mark-type, and/or visual encodings that can, optionally, be modified later by the user via a selection of one or more user interface elements (or affordances).

For each block card, the computer system generates and executes (704) a respective database query to retrieve tuples of data for data fields associated with the respective block card. For each retrieved tuple, the computer system computes (706) a respective two-dimensional grid position, including a respective row index and a respective column index. The computer system generates and displays (708) a data visualization in which each retrieved tuple is represented as a visual mark displayed at the respective computed grid position (see in FIG. 7B).

In some embodiments, the computer system computes (710) the respective two-dimensional grid position for each retrieved tuple comprises forming a directed acyclic graph of block objects, each block object corresponding to (i) a respective displayed block card, (ii) a root row object, or (iii) a root column object, and each link in the graph represents either a respective hierarchical relationship between a respective pair of block cards, as determined by spatial positions of the respective pair of block cards on the canvas region, or a relationship between a block card and the root row object or the root column object. Using the spatial positions of block cards on the canvas region to determine respective hierarchical relationships between the block objects enables the user to build nested relationships between attributes in the data visualization. This simplifies the process while at the same time increases the expressiveness in the chart creation for the user.

In some embodiments, the computer system computes (712) the respective two-dimensional grid position for each retrieved tuple further comprises generating a row block tree from the directed acyclic graph by removing the root column object and retaining only links from the root row object and links from block objects corresponding to block cards having the row-based arrangement. In some embodiments, the root row block object is implicitly created specification and is not visually represented in the data canvas region. The computer system further generates a row tuple tree whose nodes include a single root row node and a respective node corresponding to each of the retrieved tuples, and forms a respective link between each pair of nodes $N_1$ and $N_2$ in the row tuple tree when $N_1$ is the root row node and $N_2$ corresponds to a tuple retrieved for a block object that is a child of the root row object or: $N_1$ and $N_2$ correspond to retrieved tuples $T_1$ and $T_2$; the tuples $T_1$ and $T_2$ are retrieved for block objects $B_1$ and B2; block object B1 is a parent of block object B2 in the row block tree; and the tuples T1 and T2 have the same data values for each of their shared dimension data fields. In some embodiments, the parent child relationships between the nodes are determined based on the row block tree, e.g., by traversing the row block tree. The computer system further assigns a row index to each tuple by traversing the row tuple tree structure in a depth-first order. For example, each tuple may be assigned an index such as 0, 1, 2, etc., for a header, first row, second row, etc. Automatically assigning row index positions in the grid for each tuple that is retrieved allows the user to build data visualizations by a simple drag and drop technique, where the method computes an accurate position of each mark in the data visualization that corresponds to each tuple. The method automatically translates the block cards into queries that retrieve tuples, where the tuples are automatically assigned positions in the final data visualizations based on the parent-child relationship formed by the block cards in the block user interface. The method allows to build complex and rich data visualizations via a simple drag and drop technique without the need to learn complex grammar or to create functions and calculate aggregate values separately from the regular drag and drop iterative workflow.

In some embodiments, traversing the row tuple tree in the depth-first order further comprises (714) sorting the retrieved tuples according to ordering of block objects in the row block tree, ordering of data values for dimension data fields within each tuple, and any user-specified sort-order.

In some embodiments, computing the respective two-dimensional grid position for each retrieved tuple further comprises (716) generating a column block tree from the directed acyclic graph by removing the root row object and retaining only links from the root column object and links from block objects corresponding to block cards having the column-based arrangement. In some embodiments, the root row block object is implicitly created specification and is not visually represented in the data canvas region. Further, it comprises generating a column tuple tree whose nodes include a single root column node and a respective node corresponding to each of the retrieved tuples, and forming a respective link between each pair of nodes $N_1$ and $N_2$ in the column tuple tree when $N_1$ is the root column node and $N_2$ corresponds to a tuple retrieved for a block object that is a child of the root column object or: $N_1$ and $N_2$ correspond to retrieved tuples $T_1$ and $T_2$; the tuples $T_1$ and $T_2$ are retrieved for block objects $B_1$ and $B_2$; block object $B_1$ is a parent of block object $B_2$ in the column block tree; and the tuples $T_1$ and $T_2$ have the same data values for each of their shared dimension data fields. Further, it comprises assigning a column index to each tuple by traversing the column tuple tree in a depth-first order. For example, each tuple may be assigned an index such as 0, 1, 2, etc., for a first column, second column, etc., in the grid. Automatically assigning column index position in the grid for each tuple that is retrieved allows the user to build data visualization by a simple drag and drop technique, where the method computes an accurate position of each mark in the data visualization that corresponds to each tuple. The method automatically translates the block cards into queries that retrieve tuples, which are automatically assigned positions in the final data visualization based on the parent-child relationship formed by the block cards in the block user interface. The method allows to build complex and rich data visualizations via a simple drag and drop technique without the need to learn complex grammar or to create functions and calculate aggregate values separately from the regular drag and drop iterative workflow.

In some embodiments, traversing the column tuple tree in the depth-first order further comprises (718) sorting the retrieved tuples according to ordering of block objects in the column block tree, ordering of data values for dimension data fields within each tuple, and any user-specified sort-order.

In some embodiments, generating the data visualization in which each tuple is represented as a visual mark further comprises (720) for each block card with a layout type of the row-based arrangement or the column-based arrangement, assigning each tuple retrieved, for the respective block card, to a different grid position. In some embodiments generating the data visualization in which each tuple is represented as a visual mark further comprises (722) for each block card with a layout type of the inline arrangement, assigning all of the tuples retrieved, for the respective block card, to a respective single grid position. For example, all the tuples are displayed within a single cell in a tabular data visualization, such as a sparkline corresponding to multiple tuples that is displayed within a single cell.

In some embodiments, each block card generates (724) a query that retrieves data for one respective visual component of the data visualization. The method allows layout flexibility by providing different layout options for each block object that respectively determines the spatial layout of marks to be displayed in the final data visualization, where each mark corresponds to a respective tuple returned based on the respective query for the respective block object. Thus, a user can control the layout of the marks at the level of each individual component in the data visualization, which is built based on the respective block object.

In some embodiments, the computer system receives (726) user input to place (e.g., by a drag-and-drop operation) a data field icon onto the canvas region, thereby updating or creating a first block card. And, in response to the user input, executing a generated query corresponding to the first block card, without executing queries corresponding to block cards other than the first block card. Executing queries for each block card allows to update separate visual portions in the data visualization without executing queries for other existing block cards in the user interface. This allows the user to make changes to the data visualization more efficiently, and, also, allows the user to encode different visual properties and to assign different marks to separate components in the data visualization.

In some embodiments, in response to executing the generated query corresponding to the first block card, the computer system generates (728) a new visual component in the data visualization or updating a currently displayed visual component in the data visualization without updating visual components that have already been generated for block cards other than the first block card. In some embodiments, the data visualization components can be updated independently of each other. Generating a separate visual component for each executed query that is generated based on a respective block card specification allows updating separate visual portions in the data visualization without updating other portions of the data visualization (e.g., where a user can do this by simply updating the block card specification in the user interface). This allows the user to make more efficiently changes to the data visualization, and also to encode different visual properties to separate components and marks in the data visualization.

In some embodiments, a first block card specifies (730) a mark-type and one or more visual encodings that specify color (e.g., icon 476c in FIG. 4D), size, shape (e.g., icon 476d in FIG. 4D), text (e.g., icon 476e in FIG. 4D), x-axis (e.g., icon 476a in FIG. 4D), y-axis (e.g., icon 476b in FIG. 4D), ascending sort, descending sort, or level of detail (e.g., icon 476f in FIG. 4D), and each retrieved tuple for the first block card corresponds to a visual mark that has the specified mark-type. Mark types for each block object can be specified by a simple drag and drop technique. Further, encoding different mark types for each separate visual portion in the data visualization allows the user more flexibility and expressiveness in the chart creation process, e.g., a mark type can be specified at the level of each visual component by a simple drag and drop technique as opposed to applying the same type of mark for the entire visualization.

In some embodiments, for each block card of the plurality of block cards, the computer system determines (732) a first level of detail for the block card (e.g., local LOD) according to dimension data fields specifying the one or more visual encodings in the block card, and the computer system determines a second level of detail (e.g., complete LOD) for the block card according to (i) dimension data fields specifying the one or more visual encodings in the block card and (ii) dimension data fields specifying visual encodings in any ancestor block card of the block card. Inheriting the level of detail of ancestor block objects allows the user to query the data sources at different levels of detail and displaying measure aggregates at different levels of granularity within a single data visualization. Further, the user does not have to make separate calculations or understand complex syntax structure of formulae, and instead can continue to use a simple drag and drop technique.

In some embodiments, executing the respective database query for each block card comprises (734) aggregating each measure data field associated with the respective block card according to the dimension data fields in the second level of detail.

In some embodiments, placement of the plurality of block cards in relation to one another on the canvas determines (736) hierarchical relationships between the plurality of block cards. In some embodiments, placement of the plurality of block cards in relation to one another on the canvas causes the computer system to form (738) an adjacency graph, and where the directed acyclic graph of block objects is based on the adjacency graph.

FIGS. 8A and 8B provide a flow diagram illustrating a method 800 for generating layout and components of a data visualization by interacting with data field representations, in accordance with some embodiments. Method 800 is performed at an electronic device (e.g., device 200, FIG. 2). In some embodiments, the electronic device is portable multifunction device with a display, and optionally, a touch-sensitive surface. In some embodiments, the display is a touch-screen display, and the touch-sensitive surface is on or integrated with the display. In some embodiments, the display is separate from the touch-sensitive surface. Some operations in method 900 are, optionally, combined and/or the order of some operations is, optionally, changed.

As described herein, method 800, provides the user with an ability for query execution and encoding at different levels of granularity by providing the ability to aggregate measures according to a level of detail for both ancestor block objects and the level of detail local for the block object. Inheriting the level of detail of ancestor block objects allows the user to query the data sources at different levels of detail and displaying measure aggregates at different levels of granularity within a single data visualization. Further, the user does not have to make separate calculations or understand complex syntax structure of formulae, and instead can continue to use a simple drag and drop technique.

In some embodiments, at a computer system having one or more processors, a display, and memory storing one or more programs configured for execution by the one or more processors, a plurality of interrelated block object specifications are generated (802) according to user placement of data field icons on a canvas region, wherein each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons. For each block object specification, the computer system (804): (1) generates a respective query according to the user-selected data field icons that specify the visual encodings for the respective block object specification; and (2) executes the respective query to retrieve a respective set of tuples from the data source, each tuple comprising data values for data fields corresponding to the user-selected data field icons that specify the visual encodings for the respective block object specification. Further, the computer system generates (806) a data visualization in accordance with the layout type, the mark type, and the visual encodings specified in each of the block object specifications, wherein each tuple in each of the respective set of tuples is represented as a visual mark in the data visualization.

In some embodiments, generating the respective query comprises (808) defining a level of detail according to dimension data fields that are associated with visual encodings in the respective block object specification. And, executing the respective query comprises aggregating each measure data field in the respective block object specification according to the dimension data fields in the level of detail.

In some embodiments, a first query corresponds (810) to a first block object specification. A second query corresponds to a second block object specification. The first block object specification corresponds to a first block object that is a parent block object of a second block object that corresponds to the second block object specification. Generating a respective query for each of the first and second block object specifications comprises: defining a first level of detail according to dimension data fields that are associated with visual encodings in the first block object specification; defining a second level of detail according to (i) dimension data fields that are associated with visual encodings in the first block object specification and (ii) dimension data fields that are associated with visual encodings in the second block object specification; generating a first query, for the first block object specification, which specifies aggregation of each measure data field associated with the first block object specification according to the dimension data fields in the first level of detail; and generating a second query, for the second block object specification, which specifies aggregation of each measure data field associated with the second block object specification according to the dimension data fields in the second level of detail.

In some embodiments, generating the plurality of interrelated block object specifications comprises (812) generating a first block object specification according to user placement of a first data field icon onto the canvas region, wherein the layout type, mark type, and the one or more visual encodings specified in the first block object specification are initially determined by the computer system according to values of a first data field associated with the first data field icon; and generating a second block object specification according to user placement of a second data field icon onto the canvas region, wherein the layout type, mark type, and the one or more visual encodings specified in the second block object specification are initially determined by the computer system according to values of a second data field associated with the second data field icon.

In some embodiments, each block object specification is (814) represented by a respective user interface block card in the canvas region, and the respective user interface block card displays: a selectable user interface element to designate a layout type of the respective user interface block card; a selectable user interface element to designate a mark type of the respective user interface block card; and/or a plurality of user interface elements indicating the one or more visual encodings of the respective block object specification.

In some embodiments, each block object specification determines (816) a respective visual component in the data visualization, wherein the respective visualization component can be updated independently from other visual components in the data visualization. In some embodiments, each user interface block card in the canvas region is translated into a block object specification based on which a corresponding query is generated, where a single visual component is determined in accordance with tuples and encodings that are retrieved in response to executing the corresponding query. The block card specification can be updated by interacting or manipulating the corresponding user interface block card, which in turn would cause an update in the corresponding visual component in the data visualization.

In some embodiments, for each block object specification, the computer system determines (818): a first level of detail for the block object specification (e.g., local LOD) according to dimension data fields specifying one or more visual encodings in the block object specification, and a second level of detail for the block object specification according to (i) dimension data fields specifying the one or more visual encodings in the block object specification and (ii) dimension data fields specifying visual encodings in any ancestor block object specification.

In some embodiments, identifying each measure data field that specifies (820) one or more visual encodings in the respective block object specification; wherein executing the respective query comprises aggregating each of the identified measure data fields according to the dimension data fields in the second level of detail. In some embodiments, the data visualization has (822) a type selected from the group consisting of a table-based chart, a Sankey diagram, and a map-based diagram.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for visual exploration of data, comprising:
at a computer system having one or more processors, a display, and memory storing one or more programs configured for execution by the one or more processors:
generating a plurality of interrelated block object specifications according to user placement of data field icons on a canvas region, wherein each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons;
for each block object specification:
generating a respective query according to the user-selected data field icons that specify the visual encodings for the respective block object specification; and
executing the respective query to retrieve a respective set of tuples from the data source, each tuple comprising data values for data fields corresponding to the user-selected data field icons that specify the visual encodings for the respective block object specification; and
generating a data visualization in accordance with the layout type, the mark type, and the visual encodings specified in each of the block object specifications, wherein each tuple in each of the respective set of tuples is represented as a visual mark in the data visualization.

2. The method of claim 1, wherein:
generating the respective query comprises defining a level of detail according to dimension data fields that are associated with visual encodings in the respective block object specification; and
executing the respective query comprises aggregating each measure data field in the respective block object specification according to the dimension data fields in the level of detail.

3. The method of claim 1, wherein a first query corresponds to a first block object specification, a second query corresponds to a second block object specification, the first block object specification corresponds to a first block object that is a parent block object of a second block object that corresponds to the second block object specification, and generating a respective query for each of the first and second block object specifications comprises:
defining a first level of detail according to dimension data fields that are associated with visual encodings in the first block object specification;
defining a second level of detail according to (i) dimension data fields that are associated with visual encodings in the first block object specification and (ii)

dimension data fields that are associated with visual encodings in the second block object specification;

generating a first query, for the first block object specification, which specifies aggregation of each measure data field associated with the first block object specification according to the dimension data fields in the first level of detail; and generating a second query, for the second block object specification, which specifies aggregation of each measure data field associated with the second block object specification according to the dimension data fields in the second level of detail.

4. The method of claim 1, wherein generating the plurality of interrelated block object specifications comprises:

generating a first block object specification according to user placement of a first data field icon onto the canvas region, wherein the layout type, mark type, and the one or more visual encodings specified in the first block object specification are initially determined by the computer system according to values of a first data field associated with the first data field icon; and generating a second block object specification according to user placement of a second data field icon onto the canvas region, wherein the layout type, mark type, and the one or more visual encodings specified in the second block object specification are initially determined by the computer system according to values of a second data field associated with the second data field icon.

5. The method of claim 1, wherein each block object specification is represented by a respective user interface block card in the canvas region, and the respective user interface block card displays:

a selectable user interface element to designate a layout type of the respective user interface block card;

a selectable user interface element to designate a mark type of the respective user interface block card; and a plurality of user interface elements indicating the one or more visual encodings of the respective block object specification.

6. The method of claim 1, wherein each block object specification determines a respective visual component in the data visualization, and each visualization component can be updated independently from other visual components in the data visualization.

7. The method of claim 1, further comprising for each block object specification:

determining a first level of detail for the block object specification according to dimension data fields specifying one or more visual encodings in the block object specification; and determining a second level of detail for the block object specification according to (i) dimension data fields specifying the one or more visual encodings in the block object specification and (ii) dimension data fields specifying visual encodings in any ancestor block object specification.

8. The method of claim 7, further comprising identifying each measure data field that specifies one or more visual encodings in the respective block object specification;

wherein executing the respective query comprises aggregating each of the identified measure data fields according to the dimension data fields in the second level of detail.

9. The method of claim 1, wherein the data visualization has a type selected from the group consisting of a table-based chart, a Sankey diagram, and a map-based diagram.

10. A computer system, comprising:
a display generation component;
one or more input devices;
one or more processors; and
memory storing one or more programs, wherein the one or more programs are configured to be executed by the one or more processors, the one or more programs including instructions for:

generating a plurality of interrelated block object specifications according to user placement of data field icons on a canvas region, wherein each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons;

for each block object specification:
generating a respective query according to the user-selected data field icons that specify the visual encodings for the respective block object specification; and executing the respective query to retrieve a respective set of tuples from the data source, each tuple comprising data values for data fields corresponding to the user-selected data field icons that specify the visual encodings for the respective block object specification; and generating a data visualization in accordance with the layout type, the mark type, and the visual encodings specified in each of the block object specifications, wherein each tuple in each of the respective set of tuples is represented as a visual mark in the data visualization.

11. The computer system of claim 10, wherein:
generating the respective query comprises defining a level of detail according to dimension data fields that are associated with visual encodings in the respective block object specification; and executing the respective query comprises aggregating each measure data field in the respective block object specification according to the dimension data fields in the level of detail.

12. The computer system of claim 10, wherein a first query corresponds to a first block object specification, a second query corresponds to a second block object specification, the first block object specification corresponds to a first block object that is a parent block object of a second block object that corresponds to the second block object specification, and generating a respective query for each of the first and second block object specifications comprises:

defining a first level of detail according to dimension data fields that are associated with visual encodings in the first block object specification;

defining a second level of detail according to (i) dimension data fields that are associated with visual encodings in the first block object specification and (ii) dimension data fields that are associated with visual encodings in the second block object specification;

generating a first query, for the first block object specification, which specifies aggregation of each measure data field associated with the first block object specification according to the dimension data fields in the first level of detail; and generating a second query, for the second block object specification, which specifies aggregation of each measure data field associated with the second block object specification according to the dimension data fields in the second level of detail.

13. The computer system of claim 10, wherein generating the plurality of interrelated block object specifications comprises:

generating a first block object specification according to user placement of a first data field icon onto the canvas region, wherein the layout type, mark type, and the one or more visual encodings specified in the first block object specification are initially determined by the computer system according to values of a first data field associated with the first data field icon; and generating a second block object specification according to user placement of a second data field icon onto the canvas region, wherein the layout type, mark type, and the one or more visual encodings specified in the second block object specification are initially determined by the computer system according to values of a second data field associated with the second data field icon.

14. The computer system of claim 10, wherein each block object specification is represented by a respective user interface block card in the canvas region, and the respective user interface block card displays:

a selectable user interface element to designate a layout type of the respective user interface block card;

a selectable user interface element to designate a mark type of the respective user interface block card; and a plurality of user interface elements indicating the one or more visual encodings of the respective block object specification.

15. The computer system of claim 10, wherein each block object specification determines a respective visual component in the data visualization, and each visualization component can be updated independently from other visual components in the data visualization.

16. The computer system of claim 10, wherein the one or more programs further comprise instructions for:

for each block object specification:

determining a first level of detail for the block object specification according to dimension data fields specifying one or more visual encodings in the block object specification; and determining a second level of detail for the block object specification according to (i) dimension data fields specifying the one or more visual encodings in the block object specification and (ii) dimension data fields specifying visual encodings in any ancestor block object specification.

17. The computer system of claim 16, wherein the one or more programs further comprise instructions for identifying each measure data field that specifies one or more visual encodings in the respective block object specification;

wherein executing the respective query comprises aggregating each of the identified measure data fields according to the dimension data fields in the second level of detail.

18. The computer system of claim 10, wherein the data visualization has a type selected from the group consisting of a table-based chart, a Sankey diagram, and a map-based diagram.

19. A non-transitory computer readable storage medium storing one or more programs, the one or more programs comprising instructions, which, when executed by a computer system with a display generation component, and one or more input devices, cause the device to:

generate a plurality of interrelated block object specifications according to user placement of data field icons on a canvas region, wherein each data field icon is selected from a schema region displaying a plurality of data field icons, each data field icon represents a respective data field from a user-selected data source, and each block object specification includes (i) a layout type that specifies a row-based arrangement, a column-based arrangement, or an inline arrangement, (ii) a mark type that specifies a shape for visual data marks, and (iii) one or more visual encodings that specify one or more of color, size, shape, text, x-axis, y-axis, ascending sort, descending sort, or level of detail according to data values of user-selected data field icons;

for each block object specification:

generate a respective query according to the user-selected data field icons that specify the visual encodings for the respective block object specification; and execute the respective query to retrieve a respective set of tuples from the data source, each tuple comprising data values for data fields corresponding to the user-selected data field icons that specify the visual encodings for the respective block object specification; and generate a data visualization in accordance with the layout type, the mark type, and the visual encodings specified in each of the block object specifications, wherein each tuple in each of the respective set of tuples is represented as a visual mark in the data visualization.

20. The computer readable storage medium of claim 19, wherein:

generating the respective query comprises defining a level of detail according to dimension data fields that are associated with visual encodings in the respective block object specification; and executing the respective query comprises aggregating each measure data field in the respective block object specification according to the dimension data fields in the level of detail.

* * * * *